(12) United States Patent
Tojo et al.

(10) Patent No.: US 6,845,830 B2
(45) Date of Patent: Jan. 25, 2005

(54) METHOD OF CLIMBING UP/DOWN A STEP, BOGIE AND WHEELCHAIR

(75) Inventors: Naoto Tojo, Ikoma (JP); Kazushige Kakutani, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 10/401,668

(22) Filed: Mar. 31, 2003

(65) Prior Publication Data

US 2003/0183427 A1 Oct. 2, 2003

(30) Foreign Application Priority Data

Apr. 1, 2002 (JP) ........................................ 2002-099177
Feb. 28, 2003 (JP) ........................................ 2003-054985

(51) Int. Cl.$^7$ ...................... B62D 57/024; B62D 57/032
(52) U.S. Cl. ................................ 180/8.3; 280/DIG. 10
(58) Field of Search ...................... 280/DIG. 10; 901/1; 180/8.1–8.6, 21; 701/58

(56) References Cited

U.S. PATENT DOCUMENTS

| | | | | |
|---|---|---|---|---|
| 3,664,448 A | * | 5/1972 | Hudis | 180/9.46 |
| 4,265,326 A | * | 5/1981 | Lauber | 180/8.3 |
| 4,321,976 A | * | 3/1982 | Reinke et al. | 180/8.5 |
| 4,395,191 A | * | 7/1983 | Kaiser | 414/694 |
| 4,558,758 A | * | 12/1985 | Littman et al. | 180/8.1 |
| 5,219,412 A | * | 6/1993 | Kubo | 180/246 |
| 5,351,773 A | * | 10/1994 | Yanagisawa | 180/8.5 |
| 5,526,890 A | * | 6/1996 | Kadowaki | 180/8.3 |
| 6,267,196 B1 | * | 7/2001 | Wilcox et al. | 180/347 |
| 6,311,795 B1 | * | 11/2001 | Skotnikov et al. | 180/8.3 |
| 2003/0127259 A1 | * | 7/2003 | Logstrup | 108/23 |

FOREIGN PATENT DOCUMENTS

| | | |
|---|---|---|
| JP | 11-321358 | 11/1999 |
| JP | 2001-63645 | 3/2001 |
| JP | 2001-191704 | 7/2001 |

OTHER PUBLICATIONS

Song et al. Machines that Walk: the Adaptive Suspension Vehicle, 1989, The MIT Press, Chapter 1.*

* cited by examiner

Primary Examiner—Avraham Lerner
(74) Attorney, Agent, or Firm—Armstrong, Kratz, Quintos, Hanson & Brooks, LLP

(57) ABSTRACT

A bogie is provided with a wheel mechanism that can move each wheel in a vertical direction, and a control unit to perform impedance control of moving force to be applied to a wheel supporting unit in which a motor provided in the wheel mechanism is supporting the wheel. When the third wheel is to climb up a step, the control unit controls output of each wheel mechanism to cause the third wheel to make contact with a wall face of the step, and facilitate the wheel to move upward so that it can climb up the step, and the other wheels can be immediately made to contact with the ground even when the climbing wheel irregularly moves in a vertical direction, so that the bogie remains in a stable posture.

36 Claims, 35 Drawing Sheets

METHOD OF CLIMBING UP/DOWN A STEP, BOGIE AND WHEELCHAIR

BACKGROUND OF THE INVENTION

1. Field of the Invention

The present invention relates to method of climbing up/down a step by a bogie provided with a plurality of wheels under the main body of the bogie, as well as to the bogie and a wheelchair provided with the bogie.

2. Description of the Related Art

A conventional bogie is provided with a plurality of wheels mounted under a main body thereof, a motor for traveling that drives the wheels and a control unit for controlling an output of the motor and a steering direction of the wheels.

Such bogie automatically travels on the ground under control by the control unit. Also, the bogie can climb up or down a step lower than a radius of the wheel, because of friction between the step and the wheel that has contacted with the step.

However, a conventional bogie has a problem that it cannot climb a step that is higher than a radius of the wheel.

Also, when a conventional bogie is climbing up/down a step, such situation often takes place that the wheel is not contacting with a wall face of the step, or other wheels than those in contact with the step lose contact with the ground and float in the air. In such a case a grip force necessary for traveling becomes unavailable. Also a greater impact is imposed on the main body of the bogie while climbing up/down the step or when the climbing action has been completed. Further, since the wheels cannot support the bogie, the bogie is prone to lose its balance.

Meanwhile, for controlling a motion of a robot arm (manipulator), an impedance control is performed wherein a position and force are simultaneously controlled by adjusting inertia, viscosity and rigidity of an object of control.

When a displacement vector x follows the following formula in relation to a driving force F, a coefficient matrix {M, D, K} is defined as impedance characteristics.

$$Mx''+D(x'-xd')+K(x-xd)=F$$

M stands for mass characteristic, D for damping characteristic, and K for rigidity characteristic.

Also, xd is a target position of the object of control. In case where xd is constant, the displacement vector x follows the following formula against the driving force under a condition of $\Delta x=(x-xd)$:

$$Mx''+Dx'+K\Delta x=F$$

By adopting a complex argument s as a differential operator and utilizing a Laplace transform of $\Delta x$ and F ($\Delta xL$ and FL), this formula can also be expressed as:

$$(s^2M+sD+K)\Delta xL=FL$$

Based on this, a formula of transfer function G(s) that represents input/output characteristics of the input F and output $\Delta x$ can be expressed as:

$$G(s)=1/(s^2M+sD+K)$$

FIG. 1 is a block diagram showing a system of impedance control. When a force F is applied from outside, $\Delta x$ is displaced according to the impedance characteristics {M, D, K}.

As described above, in the impedance control, a position of the object of control and/or a force acting between the object of control and environment is controlled according to an action of the object of control, by respectively adjusting mass characteristic, damping characteristic and rigidity characteristic of the object of control.

BRIEF SUMMARY OF THE INVENTION

The present invention has been accomplished based on the aforementioned impedance control method. It is an object of the invention to provide method for a bogie to smoothly climb up/down a step and a bogie that can smoothly climb up/down a step, wherein an output of an actuator to be applied to a wheel supporting unit of each wheel is controlled by adjusting mass characteristic, rigidity characteristic and damping characteristic, and a wheelchair provided with such bogie.

It is another object of the invention to provide method for climbing up/down a step wherein an external force applied to a wheel is detected and whether a wheel is climbing up/down a step or not can be determined according to the detected external force, and a bogie that can determine whether a wheel is climbing up/down or not according to the detected external force, and a wheelchair provided with such bogie.

It is another object of the invention to provide simplified method for a bogie to smoothly climb up/down a step and a bogie of a simple constitution that can smoothly climb up/down a step, wherein an output of an actuator to be applied to a wheel supporting unit of each wheel is controlled by exclusively adjusting rigidity characteristic under fixed mass characteristic and damping characteristic, and a wheelchair provided with such bogie.

It is another object of the invention to provide simplified method for a bogie to smoothly climb up/down a step and a bogie of a simple constitution that can smoothly climb up/down a step, wherein an output of an actuator to be applied to a wheel supporting unit of each wheel is controlled by utilizing rigidity characteristic K0, K1 and K2 (K1≦=K0≦K2), and a wheelchair provided with such bogie.

It is another object of the invention to provide method for a bogie to smoothly climb up/down a step and a bogie that can smoothly climb up/down a step, wherein an output of an actuator to be applied to a wheel supporting unit of each wheel is controlled based on a position of the wheel supporting unit of each wheel, and a wheelchair provided with such bogie.

It is another object of the invention to provide method for a bogie to smoothly climb up/down a step and a bogie that can smoothly climb up/down a step, wherein an output of an actuator to be applied to a wheel supporting unit of each wheel is controlled based on a position of the wheel supporting unit of each wheel when the wheel is in contact with the ground, and a wheelchair provided with such bogie.

It is still another object of the invention to provide method for a bogie to climb up/down a step more easily and a bogie that can climb up/down a step more easily, wherein an output of an actuator to be applied to a wheel supporting unit of a wheel climbing up/down the step is controlled based on a position of the wheel supporting unit of the wheel that has finished climbing up/down, and a wheelchair provided with such bogie.

It is still another object of the invention to provide method for a bogie to climb up/down a step more easily and a bogie that can climb up/down a step more easily, wherein an output of an actuator to be applied to a wheel supporting unit of a wheel climbing up/down the step is controlled based on a height of the step to be climbed up/down, and a wheelchair provided with such bogie.

It is still another object of the invention to provide method for a bogie to climb up/down a step more easily by appropriately moving a center of gravity of the bogie, and a bogie that can climb up/down a step more easily by appropriately moving its center of gravity, wherein an output of an actuator to be applied to a wheel supporting unit other than those supporting a wheel climbing up/down the step is controlled according to a required position or a inclination of the main body of the bogie, and a wheelchair provided with such bogie.

It is still another object of the invention to provide method for a bogie to climb up/down a step more easily and a bogie that can climb up/down a step more easily by obtaining an entrance angle to the step to be climbed up/down, and a wheelchair provided with such bogie.

It is still another object of the invention to provide a bogie comprising four wheel supporting units respectively supporting a wheel and capable of moving upward/downward, so that four actuators can cause a wheel to climb up/down a step while other wheels can support the main body of the bogie, and a wheelchair provided with such bogie.

It is still another object of the invention to provide a bogie comprising a wheel supporting unit on its right and left side that can rotate around a rotational shaft, respectively supporting a front wheel and a rear wheel, so that two actuators can cause a wheel to climb up/down a step while other wheels can support the main body of the bogie, and a wheelchair provided with such bogie.

The invention provides method of climbing up/down a step for a bogie comprising a plurality of wheel supporting units provided under a main body thereof for supporting one or a plurality of wheels and actuators for moving the wheel supporting units so that the wheel supported by the wheel supporting units moves upward or downward, comprising the steps of adjusting mass characteristic, rigidity characteristic and damping characteristic generated by an output of the actuator between the wheel supporting units and the main body of the bogie when the wheels climb up/down the step; and controlling an output of moving force of the actuators applied to the wheel supporting units.

The invention also provides method of climbing up/down a step, further comprising the steps of detecting an external force applied to each wheel; deciding that the wheel is climbing up/down the step in case where the external force is not smaller than a first predetermined external force, or not greater than a second external force that is smaller than the first external force; and deciding that the wheel is either in contact with the ground or has finished climbing up/down the step in case where the detected external force is in a predetermined range greater than the second external force and smaller than the first external force.

The invention also provides method for climbing up/down a step further comprising the steps of deciding whether each wheel is climbing up/down a step; and obtaining an output of each actuator based on rigidity characteristic predetermined according to whether the wheels are climbing up/down a step or not.

The invention also provides method for climbing up/down a step further comprising the steps of obtaining an output of an actuator corresponding to a wheel supporting unit that is supporting a wheel climbing up/down the step based on rigidity characteristic K1, and obtaining an output of the actuators corresponding to all other wheel supporting units based on rigidity characteristic K2 (K1<K2) when each wheel is to climb up/down the step; and obtaining an output of an actuator corresponding to each wheel supporting unit based on rigidity characteristic K0 (K1≦K0≦K2), when the wheels are not climbing up/down the step.

The invention also provides method of climbing up/down a step, further comprising the steps of detecting a position of each of the wheel supporting units; and obtaining an output of an actuator corresponding to the wheel supporting unit based on the detected position.

The invention also provides method of climbing up/down a step, further comprising the steps of detecting a position of each of the wheel supporting units when the wheels supported by the wheel supporting unit are in contact with the ground; and obtaining an output of an actuator corresponding to the wheel supporting unit based on the detected position.

The invention also provides method of climbing up/down a step, further comprising the steps of detecting a position of a wheel supporting unit of a wheel that has finished climbing up/down the step; and obtaining an output of an actuator corresponding to a wheel supporting unit that is supporting another wheel climbing up/down the step based on the detected position, in case another wheel is to climb up/down the step.

The invention also provides method of climbing up/down a step, further comprising the steps of detecting a height of a step to be climbed up/down; and obtaining an output of an actuator corresponding to a wheel supporting unit that is supporting a wheel climbing up/down the step based on the detected position, when climbing up/down the step.

The invention also provides method of climbing up/down a step, further comprising the steps of obtaining an output of an actuator corresponding to a wheel supporting unit other than those supporting the wheels climbing up/down the step based on a position or inclination of the main body of the bogie when the bogie is moved or inclined forward, backward, rightward or leftward from a traveling direction.

The invention also provides method of climbing up/down a step, further comprising the steps of detecting a step at two points respectively corresponding to each wheel and disposed with a predetermined interval therebetween; and obtaining an entrance angle to the step based on a travel distance of the wheel during a time since one of the points detected the step until the other point detected the step and the interval between the points.

The invention provides a bogie having a plurality of wheel supporting units for supporting one or a plurality of wheels provided under the main body of the bogie, comprising actuators for moving the wheel supporting unit so that the wheel supported by the wheel supporting unit moves upward or downward; and a control unit for adjusting mass characteristic, rigidity characteristic and damping characteristic generated by an output of the actuator between the wheel supporting units and the main body of the bogie when the wheels climb up/down the step, and controlling an output of moving force of the actuators applied to the wheel supporting units.

The invention also provides a bogie further comprising an external force detecting unit for detecting an external force applied to each wheel, wherein the control unit is further capable of deciding that the wheel corresponding to the external force detecting unit is climbing u/down the step in case where the external force is not smaller than a first predetermined external force or not greater than a second external force that is smaller than the first external force, and deciding that the wheel is either in contact with the ground or has finished climbing up/down the step in case where the detected external force is in a predetermined range greater than the second external force and smaller than the first external force.

The invention also provides a bogie wherein the control unit is further capable of deciding whether each wheel is climbing up/down a step, and obtaining an output of each actuator based on rigidity characteristic predetermined according to whether the wheels are climbing up/down a step or not.

The invention also provides a bogie further comprising a memory unit in which the rigidity characteristics K0, K1 and K2 (K1≦K0≦K2) are stored, wherein the control unit is further capable of obtaining an output of an actuator corresponding to a wheel supporting unit that is supporting a wheel climbing up/down the step based on the rigidity characteristic K1, and obtaining an output of the actuators corresponding to all other wheel supporting units based on the rigidity characteristic K2 when each wheel is to climb up/down the step; and obtaining an output of an actuator corresponding to each wheel supporting unit based on rigidity characteristic K0, when the wheels are not climbing up/down the step.

The invention also provides a bogie further comprising a position detecting unit for detecting a position of each of the wheel supporting units, wherein the control unit is further capable of obtaining an output of an actuator corresponding to the wheel supporting unit based on the position of the wheel supporting unit detected by the position detecting unit.

The invention also provides a bogie, wherein the control unit is further capable of obtaining an output of the actuators corresponding to each wheel supporting unit based on a position of the wheel supporting unit detected by the position detecting unit when the wheel supported by the wheel supporting unit is in contact with the ground.

The invention also provides a bogie wherein the control unit is further capable of detecting a position of a wheel supporting unit of a wheel that has finished climbing up/down the step by the position detecting unit; and obtaining an output of an actuator corresponding to a wheel supporting unit that is supporting another wheel climbing up/down the step based on the detected position, in case another wheel is to climb up/down the step.

The invention also provides a bogie further comprising a height detecting unit for detecting a height of a step to be climbed up/down, wherein the control unit is further capable of obtaining an output of an actuator corresponding to a wheel supporting unit that is supporting a wheel climbing up/down the step based on the detected position, when climbing up/down the step.

The invention also provides a bogie wherein the control unit is further capable of obtaining an output of an actuator corresponding to a wheel supporting unit other than those supporting the wheels climbing up/down the step based on a position or inclination of the main body of the bogie when the bogie is moved or inclined forward, backward, rightward or leftward from a traveling direction.

The invention also provides a bogie further comprising a pair of step detecting units disposed with a predetermined interval therebetween for detecting a step, wherein the control unit is further capable of obtaining an entrance angle to the step based on a travel distance of the wheel during a time since one of the step detecting units detected the step until the other step detecting unit detected the step and the interval between the step detecting units.

The invention also provides a bogie wherein four wheel supporting units capable of moving vertically to the ground respectively support a wheel, and the actuators can move the respective wheel supporting units vertically.

The invention also provides a bogie further comprising a rotational shaft disposed in a direction of side to side under the main body of the bogie; two wheel supporting units disposed side by side on its right and left side that can rotate around the rotational shaft, for respectively supporting a front wheel and a rear wheel, wherein the two actuators can rotate the respective wheel supporting units around the rotational shaft.

The invention provides a wheelchair comprising the foregoing bogie; an input unit for inputting information on speed and traveling direction of the bogie; and a wheel control unit for controlling the wheels of the bogie based on the information on speed and traveling direction input by the input unit.

According to the invention, displacement of the wheel supporting unit, which is an output against an input such as a moving force applied to the wheel supporting unit by an external force or the actuator etc., is controlled through adjustment of mass characteristic, damping characteristic and rigidity characteristic (impedance characteristics). In other words, a position of the wheel supporting unit, as well as a force acting between the wheel supporting unit and the ground or a step is controlled according to a motion of the wheel supporting unit. Therefore, for example when a wheel is separated from the ground or going to climb up a step, or when a wheel is pressed to the ground or going to climb down a step, the wheel can make contact with the ground or wall face of the step in a stable way, because of a damping force due to the damping characteristic or a restoring force due to the rigidity characteristic. Also, a grip force required for traveling can be firmly secured. In this way a bogie can climb up/down a step smoothly, and stably travel because an impact to a main body of the bogie or vibration of the bogie main body due to unevenness of the ground or steps can be alleviated.

According to the invention, the bogie may be provided with for example a load sensor on each wheel, as means for detecting an external force. An external force (load) detected by the load sensor when each wheel is stably in contact with a flat ground shall be denoted as F0. A load detected when each wheel has made contact with a step to be climbed up shall be denoted as a first external force F1. A load detected when each wheel has entered a step to be climbed down shall be denoted as a second external force F2 (F2<F0<F1).

In case where F≧F1 or F≦F2 is applicable to the load F detected by the load sensor, the control unit determines that the wheel corresponding to the load sensor is starting to climb up or down a step. Also, in case where F2<F<F1 is applicable to the load F, the control unit determines that the wheel is not climbing up or down but in contact with the ground. Further, in case where the load F detected by the load sensor was once defined by F≧F1 or F≦F2 and shifted to a range of F4≦F≦F3 (F2<F4<F3<F1), the control unit determines that the wheel corresponding to the load sensor has finished climbing up or down.

As described above, it can be determined whether the wheel is in contact with the ground or not, whether the wheel is climbing up/down a step or not and whether the wheel climbing up/down has finished the climbing motion or not, based on the detected external force.

According to the invention, the rigidity characteristic alone is adjusted among the impedance characteristics. Through such adjustment, displacement of the wheel supporting unit that is an output against an input such as a moving force applied to the wheel supporting unit by the external force or the actuator is controlled.

According to the invention, an output T of the actuator corresponding to each wheel supporting unit is obtained by the formula of $T=K\Delta x$, therein utilizing the rigidity characteristic K and displacement of the wheel supporting unit $\Delta x$. Each rigidity characteristic can be defined by $K1<K2$. With respect to the rigidity characteristic K0, $K0=K1$ or $K0=K2$ may be applied, while preferably K0 should satisfy $K1<K0<K2$.

In case where the rigidity characteristic K is defined by $K=K1$, since K1 is small an output of the actuator given to the wheel supporting unit for the wheel climbing up/down a step is small (low rigidity). As a result, the wheel easily changes its position when an external force is applied to the wheel, and the wheel can easily climb up/down a step because of friction between the wheel and the step. Also, the output for the wheel supporting unit can be turned off, considering as $K1=0$. However in case where $K1>0$ is applicable, since a small output is provided to the wheel supporting unit, a movement in an excessive amplitude or an abrupt position change (for example dropping) of the wheel climbing up/down the step can be prevented. Further, by employing a traveling motor to drive each wheel and driving the wheel that is going to climb up/down a step in a direction that the wheel is pressed to a wall face of the step, the wheel can be securely make contact with the wall face of the step.

In case where the rigidity characteristic K is defined by $K=K2$, since K2 is large an output of the actuator given to the wheel supporting units other than those supporting the wheel climbing up/down a step is large (high rigidity). Accordingly, the wheel supported by such other wheel supporting unit does not easily change its position when an external force is applied to the wheel. As a result, the wheel can stably remain in contact with the ground because of friction between the wheel and the ground. Consequently the wheel firmly supports the main body of the bogie, thus preventing the bogie from losing its balance.

In case where the rigidity characteristic K is defined by $K=K0$, since K0 is a moderate value an output of the actuator given to the wheel supporting unit for the wheel climbing up/down a step is moderate. Accordingly, the wheel performs a moderate change of its position when an external force is applied to the wheel, and the wheel remains in firm contact with the ground. For example when the wheel contacts with an uneven portion of the ground, an impact to the main body of the bogie can be alleviated. Consequently, the bogie can stably travel when the bogie is not climbing up or down, i.e. when the bogie is traveling on a flat ground, or during a time after a wheel has finished climbing until another wheel starts climbing.

According to the invention, an output T of the actuator corresponding to each wheel supporting unit is obtained by the formula of $T=K(xd-x)$, therein utilizing the rigidity characteristic K and displacement of the wheel supporting unit $(xd-x)$. xd is an equilibrium point of a virtual spring generated by the actuator, and is a target position to which the wheel supporting unit is to be moved. x is a position of the wheel supporting unit detected by the position detecting means. As the target position xd, an appropriate position is applied depending on conditions such as whether the wheel is climbing or traveling on the ground, etc.

The position x of the wheel supporting unit is detected in a certain cycle, and an output of $T=K(xd-x)$ in which the detected position x is utilized is applied to the wheel supporting unit from the actuator in the same cycle. When the rigidity characteristic K is defined by $K=K1$, the rigidity is low. Accordingly, a small moving force proportionate to a displacement of the wheel supporting unit is applied, in a direction toward the target position xd, to the wheel supporting unit that is supporting a wheel climbing up/down a step. This facilitates the movement of the wheel. Further, by appropriately setting and utilizing the target position xd, the bogie can climb up a step that is higher than a radius of the wheel. When the rigidity characteristic K is defined by $K=K2$, the rigidity is high. Accordingly, the wheel supporting units other than those supporting the wheels climbing up/down a step are fixed at the target position xd, thus preventing the respective corresponding wheels from moving. When the rigidity characteristic K is defined by $K=K0$, the rigidity is moderate. Accordingly, each wheel supporting unit is to move toward the target position xd at a moderate speed, so that an impact to the main body of the bogie can be alleviated.

According to the invention, while the bogie is not climbing up/down, i.e. while traveling on a flat ground or during a time after a wheel has finished climbing up/down until another wheel starts climbing up/down, an output T of the actuator corresponding to each wheel supporting unit is obtained by the formula of $T=K0(x0-x)$, therein utilizing the rigidity characteristic K0 and displacement of the wheel supporting unit $(x0-x)$. x0 is an equilibrium point of a virtual spring generated by the actuator. Also x0 is a target position to which the wheel supporting unit is to be moved, which is the position of the wheel supporting unit detected by the position detecting means when the wheel supported by the wheel supporting unit is stably in contact with the ground, or with an upper surface of a step or a lower surface of the step.

The position x of the wheel supporting unit is detected in a certain cycle, and an output of $T=K0(x0-x)$ in which the detected position x is utilized is applied to the wheel supporting unit from the actuator in the same cycle. In this case the rigidity characteristic K is defined by $K=K0$, which is a moderate rigidity. Accordingly, each wheel supporting unit moves toward the target position x0 at a moderate speed. The wheel supported by this wheel supporting unit moderately changes its position with respect to the ground when an external force is applied to the wheel, and makes secure contact with the ground. Therefore, for example when the wheel contacts with an uneven portion of the ground, an impact to the main body of the bogie can be alleviated.

When each wheel is climbing up/down a step but in case where information of a height of the step is unavailable, an output T of the actuator corresponding to a wheel supporting unit that is supporting a wheel climbing up/down the step is obtained by the formula of $T=K1(x0-x)$, therein utilizing the rigidity characteristic K1 and displacement of the wheel supporting unit $(x0-x)$.

The position x of the wheel supporting unit is detected in a certain cycle. An output of $T=K1(x0-x)$ in which the detected position x is utilized is applied to the wheel supporting unit from the actuator in the same cycle. The rigidity characteristic K is defined by $K=K1$, which is a low rigidity. Accordingly, the wheel supporting unit that is supporting the wheel climbing up/down the step moves very slowly toward the target position x0. Then, the wheel supporting unit easily moves the wheel to the upper or lower surface of the step, maintaining the contact of the wheel with the step. In this way, even when a height of the step is unknown, the wheel can achieve stable contact with a wall face of the step. Also, since a grip force required for climbing up/down the step is securely obtained, the bogie can smoothly climb up/down the step.

In case where each wheel is to climb up/down a step, an output T of the actuator corresponding to wheel supporting units other than those supporting a wheel climbing up/down the step is obtained by the formula of $T=K2(x0-x)$, therein utilizing the rigidity characteristic K2 and displacement of the wheel supporting unit $(x0-x)$.

The position x of the wheel supporting unit is detected in a certain cycle. An output of $T=K2(x0-x)$ in which the detected position x is utilized is applied to the wheel supporting unit from the actuator in the same cycle. In this case, similarly to a ratio control of a high gain, the rigidity is high. Accordingly, the wheel supporting units other than those supporting the wheels climbing up/down a step are fixed at the target position x0. Therefore the wheels supported by such other wheel supporting units cannot be easily moved on the ground when an external force is applied to the wheel, but remains in stable contact with the ground. Consequently the wheel firmly supports the main body of the bogie, thus preventing the bogie from losing its balance.

According to the invention, in case where a wheel has finished climbing up/down a step and another wheel is to climb up/down the step, an output T of the actuator corresponding to wheel supporting units that is supporting a wheel climbing up/down the step is obtained by the formula of $T=K1(x1-x)$, therein utilizing the rigidity characteristic K1 and displacement of the wheel supporting unit $(x1-x)$. x1 is an equilibrium point of a virtual spring generated by the actuator, and is a target position to which the wheel supporting unit is to be moved. In case where a wheel supporting unit for a wheel and another wheel supporting unit for another wheel have a corresponding structure, a position xt of the wheel supporting unit that is supporting a wheel that has finished climbing up/down a step detected by the position detecting means is utilized as the position x1. In case where the wheel supporting units are of different structures, a position of a wheel supporting unit that is supporting another wheel at the moment that it has finished climbing up/down the step is to be obtained utilizing the position xt, to utilize such position as x1.

The position x of the wheel supporting unit is detected in a certain cycle. An output of $T=K1(x1-x)$ in which the detected position x is utilized is applied to the wheel supporting unit from the actuator in the same cycle. In this case the rigidity is low. Accordingly, a small moving force proportionate to a displacement of the wheel supporting unit is applied, in a direction toward the target position x1, to the wheel supporting unit that is supporting a wheel climbing up/down a step. Then, the wheel supporting unit easily moves the wheel to the upper or lower surface of the step, maintaining the contact of the wheel with the step. In this way, even when a height of the step is unknown, the position xt can be utilized as information of the step height. After one of the wheels has once finished climbing up/down the step, the bogie can climb up/down the step even more easily.

According to the invention, when each wheel is to climb up/down a step, an output T of the actuator corresponding to wheel supporting units that is supporting the wheel climbing up/down the step is obtained by the formula of $T=K1(x1-x)$, therein utilizing the rigidity characteristic K1 and displacement of the wheel supporting unit $(x1-x)$. x1 is an equilib-rium point of a virtual spring generated by the actuator, and is a target position to which the wheel supporting unit is to be moved.

As means for detecting a height of a step, for example a distance sensor for measuring a distance utilizing infrared ray may be installed at an end portion in a traveling direction of the bogie, to detect a height of a step to be climbed up/down. With a detected height H of the step, a position xH of a wheel supporting unit at the time of finishing climbing up/down the step is obtained, which shall be utilized as x1.

The position x of the wheel supporting unit is detected in a certain cycle, and an output of $T=K1(x1-x)$ in which the detected position x is utilized is applied to the wheel supporting unit from the actuator in the same cycle. In this case the rigidity is low. Accordingly, the wheel supporting unit that is supporting the wheel climbing up/down the step moves very slowly toward the target position x1. Then, the wheel supporting unit easily moves the wheel to the upper or lower surface of the step, maintaining the contact of the wheel with the step. Therefore the bogie can climb up/down the step even more easily.

According to the invention, in case where each wheel is to climb up/down a step, an output T of the actuator corresponding to wheel supporting units other than those supporting a wheel climbing up/down the step is obtained by the formula of $T=K2(x2-x)$, therein utilizing the rigidity characteristic K2 and displacement of the wheel supporting unit $(x2-x)$. x2 is an equilibrium point of a virtual spring generated by the actuator, and is a target position to which the wheel supporting unit is to be moved.

When each wheel is to climb up/down, the main body of the bogie is moved or inclined forward, backward, rightward or leftward from a traveling direction. This shifts the center of gravity of the bogie, so that the wheel can be more easily moved. The x2 is obtained based on the position or inclination of the main body of the bogie under such state.

The position x of the wheel supporting unit is detected in a certain cycle. An output of $T=K2(x2-x)$ in which the detected position x is utilized is applied to the wheel supporting unit from the actuator in the same cycle. In this case, the rigidity is high. Accordingly, the wheel supporting units other than those supporting the wheels climbing up/down a step are fixed at the target position x2. At this moment, the main body of the bogie is moved or inclined forward, backward, rightward or leftward relatively to a traveling direction. Therefore, the center of gravity of the bogie is shifted to an appropriate position.

In this way the bogie can climb up/down a step even more easily.

Also, the actuator for moving a wheel supporting unit can be employed for shifting the center of gravity. Therefore, it is not necessary to provide an extra actuator for shifting the center of gravity, in addition to the aforementioned ones.

According to the invention, as a pair of means for detecting a step, for example two infrared ray sensors may be mounted with a predetermined interval b therebetween at an end portion in a traveling direction of the bogie, in such a manner that each of the sensors corresponds to different wheels. The pair of step detecting means respectively detects a step. Also, for example a rotary encoder may be employed, for detecting a travel distance of each wheel.

When one of the pair of the step detecting means has once detected a step, detection of traveling distance of the wheel corresponding to the step detecting means is started. When the other of the pair of the step detecting means has detected the step, the detection of traveling distance is finished. Then based on the detected traveling distance a and the interval of the sensors b, an entrance angle α of the wheel to the step is obtained. In case where the entrance angle α is constant during a time after one of the step detecting means has detected the step until the other step detecting means detects the step, the entrance angle α can be obtained by the formula of tan α=a/b. Also, in case where the detected traveling distance a has resulted in a=0 (a case where the pair of step detecting means has simultaneously detected the step), the entrance angle α of the wheel is 90 degrees. The wheels are traveling perpendicular to the step. On the other hand in case where the detected traveling distance a has resulted in a=∞ (only one of the step detecting means has detected the step but the other step detecting means has not detected the step after a predetermined time has elapsed), the entrance angle α of the wheel is 0 degrees, in other words the wheel is traveling in parallel to the step.

Based on an entrance angle obtained as above, it is possible to determine whether the entrance angle is acceptable to the wheel for climbing up/down the step or not. Then, if the entrance angle is determined to be possible to enter, the bogie starts climbing up/down the step. In case where the entrance angle has proved to be difficult, the bogie can either go around the step or change its steering direction so that an easier entrance angle is obtained. Consequently, the bogie can climb up/down the step in an entrance angle that allows easy climbing.

Also, one or both of the pair of step detecting means may be constituted of step height detecting means.

According to the invention, the bogie comprises, for example, four wheels located at both sides of a front and rear portion of the main body of the bogie respectively, four actuators and four wheel supporting units to be caused to move vertically to the ground by a moving force provided by the actuator. The wheel supporting units respectively support one of the wheels. In this case, four actuators may be employed to move up or down one of the wheels. Therefore it is possible to smoothly climb up/down a step, because normally the main body of the bogie can be sustained by three wheels.

According to the invention, the bogie comprises, for example, a rotational shaft disposed in a direction of side to side under the main body of the bogie, two pairs consisting of a front wheel and a rear wheel respectively located on the right and left sides of the main body, two actuators and two wheel supporting units disposed side by side on the right and left sides under the main body to be caused to rotate around the rotational shaft by a rotating force provided by the actuator. The wheel supporting units respectively support each pair of a front wheel and a rear wheel. In this case, the two actuators may be employed, for example, to move up or down the front wheel of a pair while the rear wheel of the same pair and the other pair of front and rear wheels remain in contact with the ground, thus supporting the main body of the bogie mainly by the rear wheel of a pair and the front and rear wheels of the other pair. Consequently, the bogie can smoothly climb up/down a step.

According to the invention, a rider of a wheelchair or a carer may input information on desired speed and traveling direction of the bogie through means for inputting. The input information is output to means for controlling a wheel. The wheel controlling means controls rotation speed and steering angle etc. of the wheel based on the input information on speed and traveling direction. Accordingly, the rider or carer can operate the bogie. Also, when climbing up/down a step, the impedance control can be employed for smoothly climbing up/down the step.

The above and further objects and features of the invention will more fully be apparent from the following detailed description with accompanying drawings.

DESCRIPTION OF THE PREFERRED EMBODIMENTS

Embodiment 1

Figure 1:
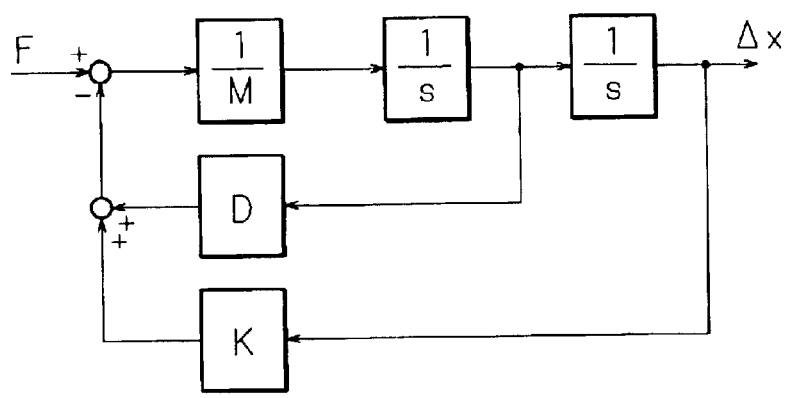
FIG. 1 is a block diagram showing an impedance control system.
Figure 2:
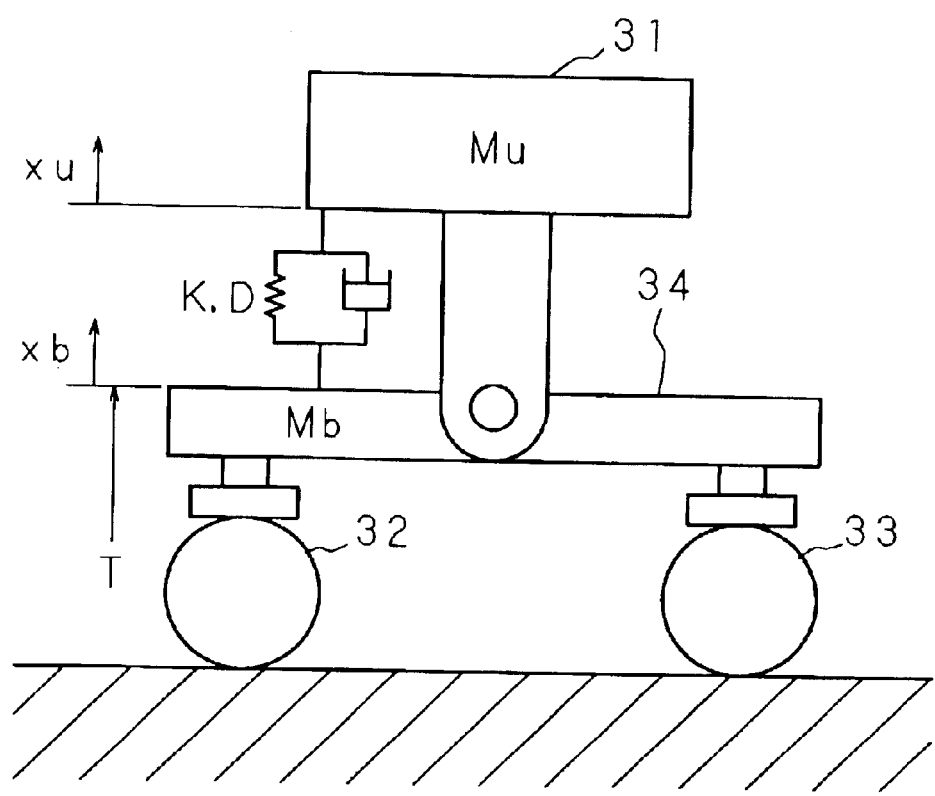
FIG. 2 is a schematic side view of a bogie according to the present invention.

FIG. 2 is a schematic drawing of a bogie according to the present invention. Referring to FIG. 2 the concept of the invention shall be briefly described.

The bogie is provided with a first wheel supporting unit 34 for supporting wheels 32, 33, and a second wheel supporting unit (not shown) for supporting in a similar manner to the wheel supporting unit 34 a plurality of wheels other than the wheels 32, 33, under the main body of the bogie 31. Each wheel supporting unit is caused to move or rotate by an actuator (not shown) so that a position of the wheels thereby supported is changed. Also, the bogie is provided with a traveling motor and a speed reducer (not shown), so that the traveling motor drives the respective wheels.

The bogie has a mass characteristic Mu of the main body 31 of the bogie between the first wheel supporting unit 34 (or the second wheel supporting unit) and the main body of the bogie 31, mass characteristic Mb between the wheels 32, 33 and the first wheel supporting unit 34 (between omitted wheels and the second wheel supporting unit), damping characteristic D and rigidity characteristic K, because of an output from the actuator. Here, a displacement vector of the main body 31 of the bogie shall be denoted by xu, and a displacement vector of the first wheel supporting unit 34 (or the second wheel supporting unit) shall be noted by xb.

When executing an impedance control with such bogie, the displacement vector xb of each wheel supporting unit against an external force T is controlled by adjusting the impedance characteristics {M, D, K}. Now for the sake of simplicity, it is assumed that the mass characteristic Mu is a very large value, by fixing the rigidity of the second wheel supporting unit as a very large value, so as to define as xu=0. Also, it shall be assumed that the mass characteristic Mb is fixed with the mass characteristic of the wheels 32, 33 and the first wheel supporting unit 34 (omitted wheels and the second wheel supporting unit), and that the damping characteristic D remains fixed as it is since the damping characteristic of the speed reducer is greater than that of the actuator.

In the above-described bogie, only the rigidity characteristic K (for instance a spring coefficient k of a virtual spring generated by the actuator) is to be adjusted. Also, a target position is set at an equilibrium point of the virtual spring. Accordingly, even in case where a wheel is separated from the ground because of an uneven portion of the ground, or a wheel has dropped from a step, a restoring force based on the spring coefficient k of the virtual spring creates a force to return to the target position. Therefore the wheel does not float or fall but makes contact with the ground or a wall face of the step. Consequently, an impact to the main body of the bogie due to an uneven portion of the ground or step can be alleviated.

Figure 3:
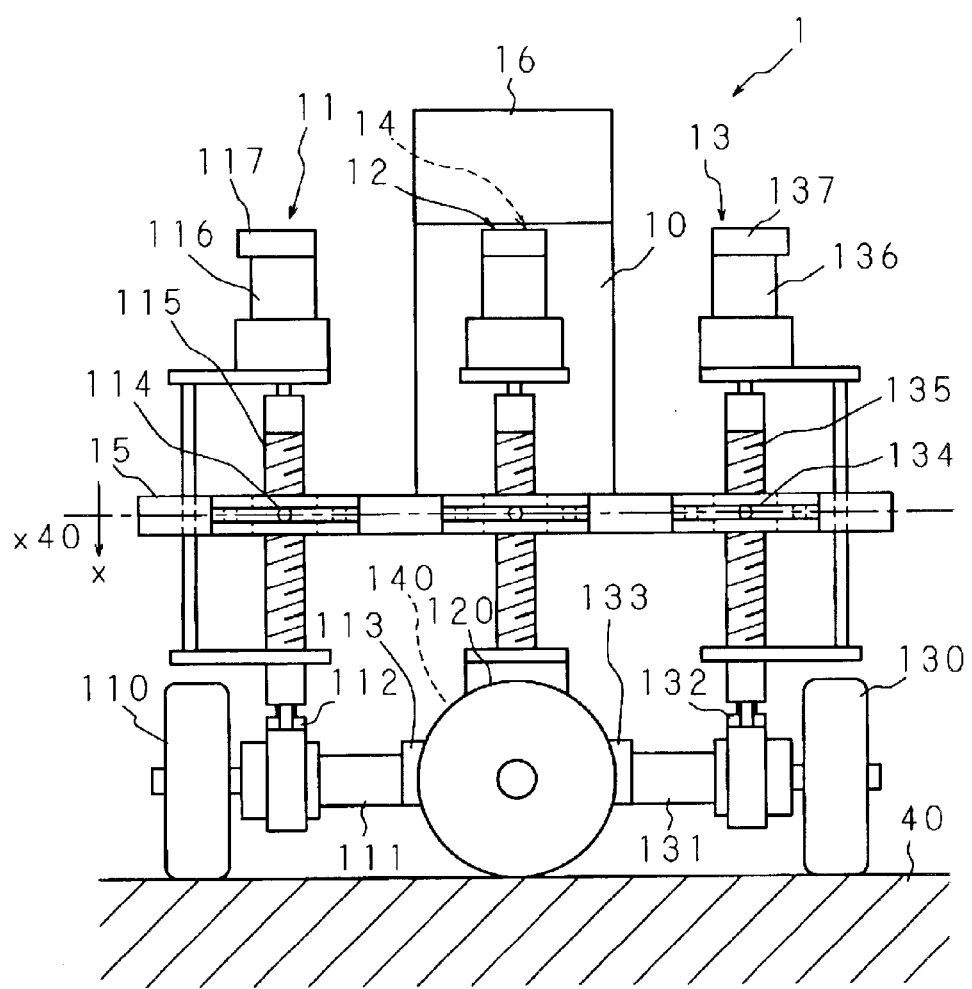
FIG. 3 is a schematic side view of a bogie according to the Embodiment 1 of the invention.
Figure 4:
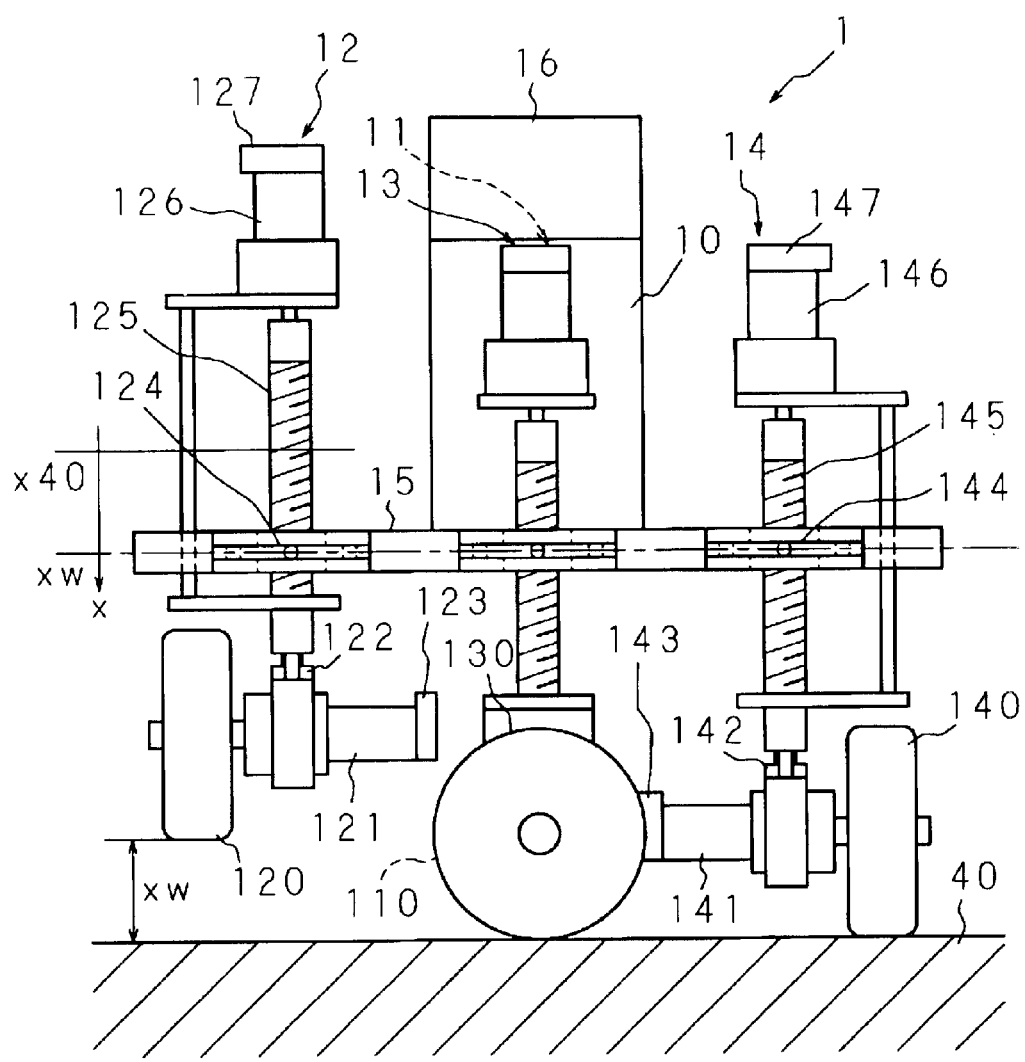
FIG. 4 is a schematic side view of a bogie according to the Embodiment 1 of the invention.
Figure 5:
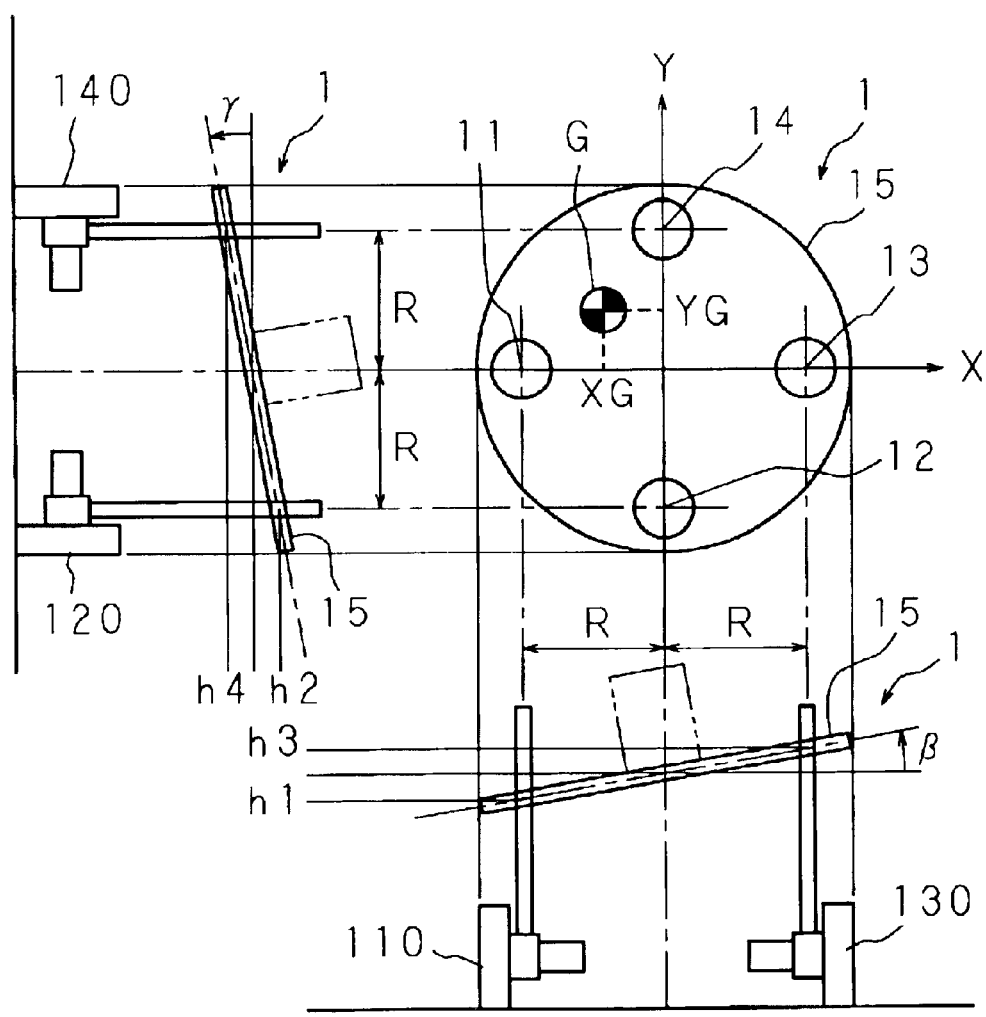
FIG. 5 is an explanatory drawing to explain a movement of the center of gravity in the bogie according to the Embodiment 1 of the invention.
Figure 6A:
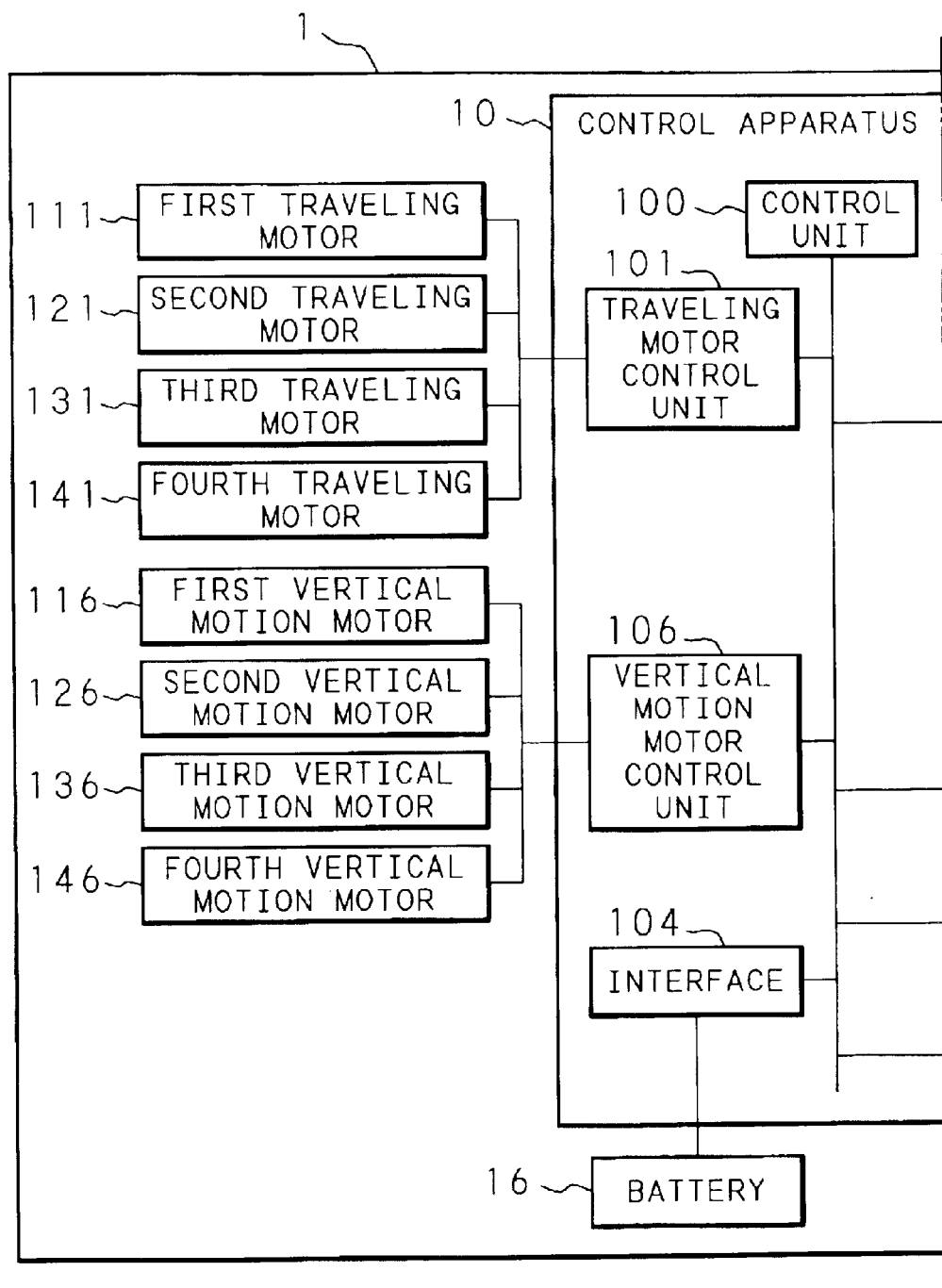
FIGS. 6A and 6B are a block diagram of the bogie according to the Embodiment 1 of the invention.
Figure 6B:
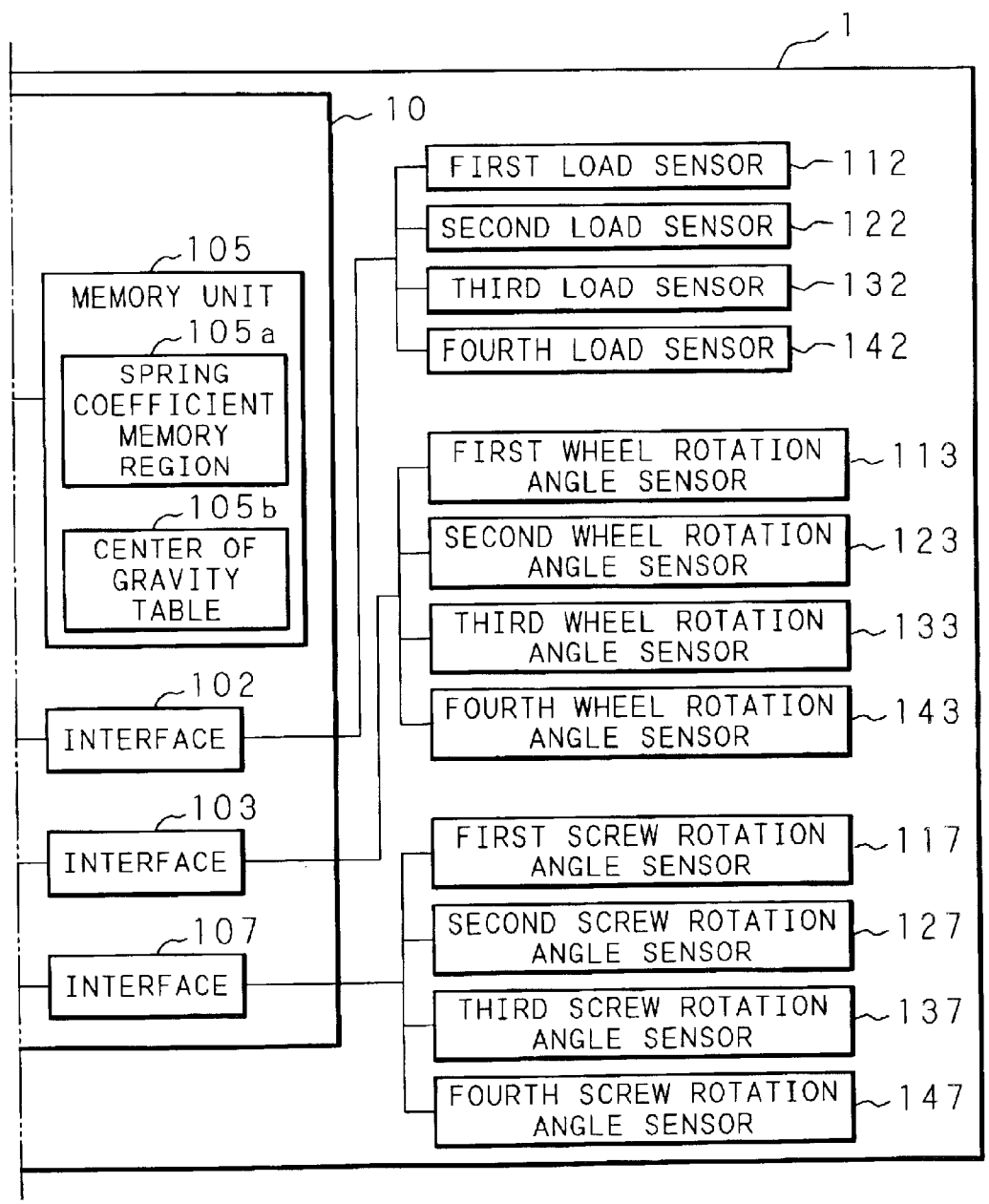

FIGS. 3 and 4 are schematic side views of a bogie 1 according to the Embodiment 1 of the invention. Also, FIG. 5 is an explanatory drawing showing a movement of the center of gravity of the bogie 1. FIGS. 6A and 6B are a block diagram of the bogie 1.

In these drawings, the reference numeral 15 stands for a disk-shape plate, and this plate 15, a control apparatus 10 installed on a central portion of an upper face of the plate 15 and a battery 16 mounted on the control apparatus 10 constitute a main body of the bogie 1.

The plate 15 is provided with four wheel mechanisms (a first wheel mechanism 11, a second wheel mechanism 12, a third wheel mechanism 13 and a fourth wheel mechanism 14) at a distance of R from its center point (radius of the plate 15 r>R) and disposed with an interval of 90 degrees between one another (Refer to FIG. 5).

The first wheel mechanism 11 is provided with a first nut 114 press-fitted in an opening provided on the plate 15 and a first wheel supporting screw 115, which is a ball screw engaged with the first nut 114. The first wheel supporting screw 115 is disposed perpendicular to the plate 15 and penetrating through it. Also, the first wheel mechanism 11 is disposed above the first wheel supporting screw 115 (above the plate 15), and is provided with a first motor for vertical motion 116 for moving the first wheel supporting screw 115 vertically to the plate 15 by rotating the first wheel supporting screw 115, and a first screw rotation angle sensor 117 disposed on the first vertical motion motor 116 for detecting a rotation angle of the first wheel supporting screw 115.

Further, the first wheel mechanism 11 is provided with a first wheel 110 for which a wheel for an omni-directional vehicle (for example a wheel for an omni-directional vehicle disclosed in JP-A No.2001-191704) is used, a first traveling motor 111 with a speed reducer for driving the first wheel 110. Also the first wheel mechanism 11 is provided with a first wheel rotation angle sensor 113 for detecting a rotation angle of the first wheel 110 and a first load sensor 112 for detecting a load imposed on the first wheel 110, both of which are disposed on the first traveling motor 111. The first wheel 110 (and the first traveling motor 111, first load sensor 112 and first wheel rotation angle sensor 113) is disposed under the first wheel supporting screw 115 (under the plate 15), and is caused to move vertically by a vertical motion of the first wheel supporting screw 115 (Refer to FIG. 4).

The second wheel mechanism 12 is, as the first wheel mechanism 11, provided with a second wheel 120, second traveling motor 121, second load sensor 122, second wheel rotation angle sensor 123, second nut 124, second wheel supporting screw 125, second vertical motion motor 126 and second screw rotation angle sensor 127. Like wise, the third wheel mechanism 13 is provided with a third wheel 130, third traveling motor 131, third load sensor 132, third wheel rotation angle sensor 133, third nut 134, third wheel supporting screw 135, third vertical motion motor 136 and third screw rotation angle sensor 137. The fourth wheel mechanism 14 is provided with a fourth wheel 140, fourth traveling motor 141, fourth load sensor 142, fourth wheel rotation angle sensor 143, fourth nut 144, fourth wheel supporting screw 145, fourth vertical motion motor 146 and fourth screw rotation angle sensor 147.

Each of the corresponding devices in the first wheel mechanism 11 through the fourth wheel mechanism 14 is constituted of components of generally the same dimensions and shape.

The control apparatus 10 comprises a control unit 100 in which a CPU is employed (Refer to FIGS. 6A & 6B). The control unit 100 is connected with the respective units in the control apparatus 10 through a bus. The control unit 100 controls the respective mechanical devices and executes various operational processing according to control program and data stored in a memory unit 105, or data to be input from an external source.

A part of the memory unit 105 is a spring coefficient memory region 105a, where spring coefficients k0, k1 and k2 (k1<k0<k2) are stored as data to be utilized for operational processing of the bogie 1. k0 is an ordinary spring coefficient given to the vertical motion motor in each wheel mechanism in an ordinary situation (none of the wheels is climbing up/down). k1 is a climbing spring coefficient to be given to the vertical motion motor in the wheel mechanism corresponding to the wheel in a climbing motion (hereinafter referred to as "climbing wheel mechanism"). k2 is a non-climbing spring coefficient to be given to the vertical motion motor of the wheel mechanism other than those corresponding to the wheel in a climbing motion (hereinafter referred to as "non-climbing wheel mechanism"). Each spring coefficient k is predetermined according to the impedance characteristics of the first wheel mechanism 11 through the fourth wheel mechanism 14, and to actions to be taken by the bogie 1.

A traveling motor control unit 101 controls the respective output of the first traveling motor 111 to the fourth traveling motor 141, under the control of the control unit 100. Also, a vertical motion motor control unit 106, which is also under the control of the control unit 100, respectively controls a rotating force T of the first wheel supporting screw 115 to the fourth wheel supporting screw 145 to be output by the first vertical motion motor 116 to the fourth vertical motion motor 146, i.e. a vertical moving force T to be given to the first wheel supporting screw 115 to the fourth wheel supporting screw 145 respectively. At this moment, the control unit 100 utilizes a calculation formula $T=k(x_d-x)$ to obtain the output T of the vertical motion motor stored in the memory unit 105 ($x_d$: target position, x: position of each wheel supporting screw).

To the control unit 100, data of load imposed on each of the first wheel 110 to the fourth wheel 140 respectively detected by the first load sensor 112 to the fourth load sensor 142 is input through an interface 102 in a prescribed cycle. Also, data of rotation angle of each wheel supporting screw respectively detected by the first wheel rotation angle sensor 113 to the fourth wheel rotation angle sensor 143 is input through an interface 103 in a prescribed cycle. Further, through an interface 107, data of a rotation angle of each wheel supporting screw respectively detected by the first screw rotation angle sensor 117 to the fourth screw rotation angle sensor 147 is input in a prescribed cycle.

The battery 16 supplies power for driving to each motor, sensor and so on through a wiring not shown in the drawings. For example, the control apparatus 10 is connected with the battery 16 through the interface 104, so that the driving power to be distributed to each device is supplied from the battery 16.

Now, a load detected by the first load sensor 112 to the fourth load sensor 142 respectively in a state that the first wheel 110 to the fourth wheel 140 are stably in contact with a flat ground 40 and the plate 15 is horizontally retained at a prescribed position shall be referred to as an equilibrium load F0. Also, a load detected by the first load sensor 112 to the fourth load sensor 142 respectively when the first wheel 110 to the fourth wheel 140 on the ground 40 have respectively made contact with a step to be climbed up 41 (Refer to FIGS. 8A and 8B) shall be referred to as a first load F1. A load detected when the first wheel 110 to the fourth wheel 140 on the ground 40 have respectively entered a step to be climbed down 42 (Refer to FIGS. 14A and 14B) shall be referred to as a second load F2 (F2<F0<F1). Also, a load detected when the wheel has finished climbing up the step 41 shall be referred to as F3 (F3<F1). A load detected when the wheel has finished climbing down the step 42 shall be referred to as F4 (F2<F4). Values respectively corresponding to F0, F1, F2, F3 and F4 measured in advance by the first load sensor 112 to the fourth load sensor 142 are stored in the memory unit 105.

The control unit 100 determines that the first wheel 110 to the fourth wheel 140 are going to climb up/down in case where the load F respectively detected by the first load sensor 112 to the fourth load sensor 142 is defined as $F \geq F1$ or $F \leq F2$. Also, when the load F respectively detected by the first load sensor 112 to the fourth load sensor 142 is defined as F2<F<F1, the control unit 100 determines that the first wheel 110 to the fourth wheel 140 are in contact with the ground 40. Also, if a load of $F \geq F1$ is once detected and then a load F of $F \leq F3$ is detected, the control unit 100 determines that the first wheel 110 to the fourth wheel 140 have climbed from the ground 40 up to an upper surface of the step 41 (now in contact with the upper level ground). Further, if a load of $F \leq F2$ is once detected and then a load F of $F \geq F4$ is detected, the control unit 100 determines that the first wheel 110 to the fourth wheel 140 have climbed from the ground 40 down to a lower surface of the step 42 (now in contact with the lower level ground).

Positions of the first wheel supporting screw 115 to the fourth wheel supporting screw 145 with respect to the plate 15 (positions at which the first wheel supporting screw 115 to the fourth wheel supporting screw 145 make contact with the first nut 114 to the fourth nut 144 respectively) in a state that the first wheel 110 to the fourth wheel 140 are stably in contact with a flat ground 40 and the plate 15 is horizontally retained at a prescribed position shall be referred to as x40. Positions of the first wheel supporting screw 115 to the fourth wheel supporting screw 145 with respect to the plate 15 when the first wheel 110 to the fourth wheel 140 have ascended by xW from the ground 40 shall be referred to as xW (>x40) (Refer to FIG. 4). Positions of the first wheel supporting screw 115 to the fourth wheel supporting screw 145 with respect to the plate 15 when the first wheel 110 to the fourth wheel 140 have descended by xW from the ground 40 shall be referred to as −xW (<x40). Accordingly, positions x of the first wheel supporting screw 115 to the fourth wheel supporting screw 145 in a state that the first wheel 110 to the fourth wheel 140 are in contact with the ground 40 can be defined as x=x40. When the first wheel 110 to the fourth wheel 140 have ascended from the ground 40 (for example when the wheels have climbed up a step), x is defined as x>x40. When the first wheel 110 to the fourth wheel 140 have descended from the ground 40 (for example when the wheels have climbed down a step), x is defined as x<x40.

The control unit 100 utilizes a conversion formula stored in advance in the memory unit 105, when rotation angles of the first wheel supporting screw 115 to the fourth wheel supporting screw 145 respectively detected by the first screw rotation angle sensor 117 to the fourth screw rotation angle sensor 147 are input in a predetermined cycle (for example the impedance control cycle). And the control unit 100 converts such rotation angle into positions x of the first wheel supporting screw 115 to the fourth wheel supporting screw 145. Also, the control unit 100 calculates an output T of the vertical motion motor along with each calculation of the position x. The control unit 100 controls so that the first vertical motion motor 116 to the fourth vertical motion motor 146 supply the output T to the first wheel supporting screw 115 to the fourth wheel supporting screw 145 respectively, through the vertical motion motor control unit 106.

The control unit 100 determines that the first wheel 110 to the fourth wheel 140 are stably in contact with the ground 40 and that the plate 15 is horizontally retained at a prescribed position, in case where the first screw rotation angle sensor 117 to the fourth screw rotation angle sensor 147 have detected x=x40, and the first load sensor 112 to the fourth load sensor 142 have detected F=F0. Therefore, x40 is the equilibrium point of the first wheel supporting screw 115 to the fourth wheel supporting screw 145 with respect to the ground 40.

Also, assuming that the control unit 100 has detected a load of F≧F1, in case where the control unit 100 then detects a load of F≦F3, it determines that the position x detected by the first screw rotation angle sensor 117 to the fourth screw rotation angle sensor 147 is the equilibrium point x41 of the first wheel supporting screw 115 to the fourth wheel supporting screw 145 with respect to the upper surface of the step 41. Likewise, assuming that the control unit 100 has detected a load of F≦F2, in case where the control unit 100 then detects a load of F≧F4, it determines that the position x detected by the first screw rotation angle sensor 117 to the fourth screw rotation angle sensor 147 is the equilibrium point x42 of the first wheel supporting screw 115 to the fourth wheel supporting screw 145 with respect to the lower surface of the step 42.

The control unit 100 calculates a travel distance and moving speed of each of the first wheel 110 to the fourth wheel 140, based on rotation angles of the first wheel 110 to the fourth wheel 140 detected by the first wheel rotation angle sensor 113 to the fourth wheel rotation angle sensor 143.

The control unit 100 inclines the plate 15 (and the control apparatus 10 and battery 16) in order to move the center of gravity G of the bogie 1 (Refer to FIG. 5). A inclination β around the Y-axis and a inclination γ around the X-axis of the plate 15 corresponding to positions of the center of gravity to be moved (XG, YG) are stored in advance with a cross-reference with the first wheel mechanism 11 to the fourth wheel mechanism 14 in the center of gravity table 105b which is a part of the memory unit 105.

In case where the plate 15 is inclined by β around the Y-axis and γ around the X-axis in a state that the position x of the first wheel supporting screw 115 to the fourth wheel supporting screw 145 is x=x40 i.e. on the equilibrium point (plate 15 is horizontal), the control unit 100 calculates a vertical movement h1 to h4 of the first wheel supporting screw 115 to the fourth wheel supporting screw 145 respectively utilizing the conversion formulas of h1=−Rtan β, h2=Rtan γ, h3=Rtan β and h4=−Rtan γ.

Figure 7:
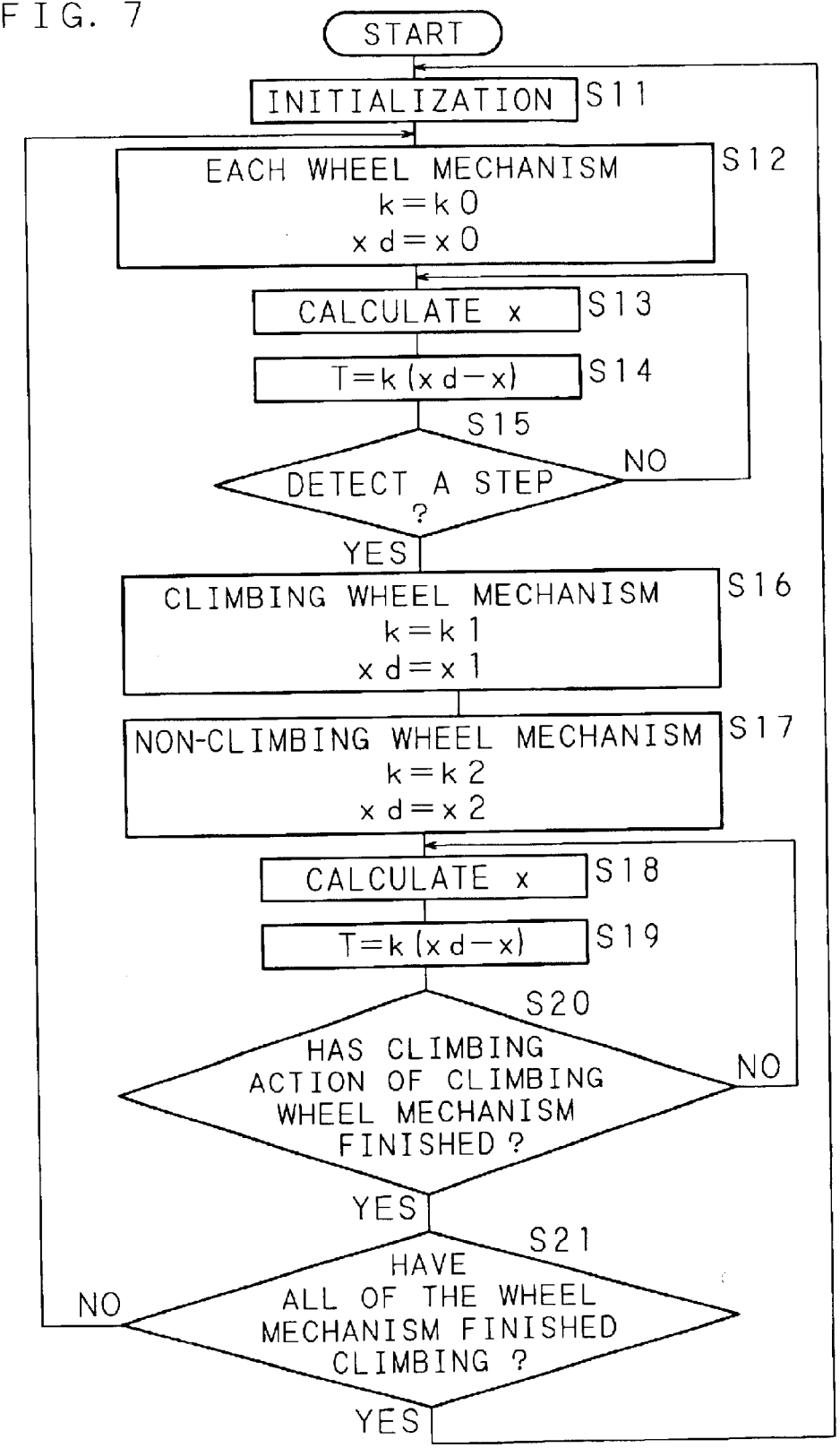
FIG. 7 is a flow chart showing the climbing up/down process of the bogie according to the Embodiment 1 of the invention.

FIG. 7 is a flow chart showing the climbing up/down process of the bogie 1. The following example refers to a case wherein all the wheels of the bogie 1 climb up to an upper surface of the step 41 from the ground 40, or all the wheels climb down to a lower surface of the step 42 from the ground 40.

The control unit 100 executes an initialization of climbing process. In this case, the control unit 100 controls the first vertical motion motor 116 to the fourth vertical motion motor 146 utilizing the first load sensor 112 to the fourth load sensor 142 and the first wheel rotation angle sensor 113 to the fourth wheel rotation angle sensor 143, in such a manner that the position x of the first wheel supporting screw 115 to the fourth wheel supporting screw 145 becomes x=x40 when the load F is the equilibrium load F0. In other words, the plate 15 is horizontally retained at the position of x=x40, and the center of gravity G is matched with the center point of the plate 15 (S11).

The control unit 100 sets a spring coefficient k and target position xd respectively for the first vertical motion motor 116 to the fourth vertical motion motor 146 of the first wheel mechanism 11 to the fourth wheel mechanism 14. In this case the spring coefficient k is set at the ordinary spring coefficient k0, and the target position xd is set at the ordinary target position x0 (S12). As the ordinary target position x0, in case where the control unit 100 determines that the first wheel 110 to the fourth wheel 140 are in contact with the ground 40 (have not finished climbing), x0=x40 is adopted. If the control unit 100 determines that the wheels are in contact with the upper surface of the step 41 (have finished climbing up the step 41), x0=x41 is adopted. If the control unit 100 determines that the wheels are in contact with the lower surface of the step 42 (have finished climbing down the step 42), x0=x42 is adopted.

The control unit 100 calculates the respective positions x of the first wheel supporting screw 115 to the fourth wheel supporting screw 145 utilizing the rotation angles detected by the first screw rotation angle sensor 117 to the fourth screw rotation angle sensor 147 (S13).

The control unit 100 calculates a value of the vertical moving force T=k(xd−x) to be given to the first wheel supporting screw 115 to the fourth wheel supporting screw 145 by the first vertical motion motor 116 to the fourth vertical motion motor 146 respectively. The control unit 100 causes the first vertical motion motor 116 to the fourth vertical motion motor 146 to output the vertical moving force T, through the vertical motion motor control unit 106 (S14). The processing of S13 and S14 is repeatedly executed at every impedance control cycle.

The control unit 100 detects a step utilizing the load F output by the first load sensor 112 to the fourth load sensor 142 (S15). If the load is defined as F2<F<F1, the control unit 100 determines that the step has not been detected (NO at S15), and returns the process to S13.

In case where the load F output by any of the first load sensor 112 to the fourth load sensor 142 is defined as F≧F1 or F≦F2, the control unit 100 determines that one of the first wheel 110 to the fourth wheel 140 has made contact with the step 41 or has entered the step 42. In other words, the control unit 100 determines that the wheel mechanism corresponding to the load sensor that has detected the mentioned load F has detected the step (YES at S15).

At this stage, the control unit 100 stores this wheel mechanism in the memory unit 105 as a climbing wheel mechanism. The control unit 100 also stores the wheel mechanism other than the climbing wheel mechanism as non-climbing wheel mechanism in the memory unit 105. Then, the control unit 100 sets a spring coefficient k and target position xd for the climbing wheel mechanism. In this case a climbing spring coefficient k1 is adopted as the spring coefficient k, and the first target position x1 as target position xd (S16). As the first target position x1, x1=x40 is adopted in case where the control unit 100 has determined that all other wheels except the climbing wheel are in contact with the ground 40 (other wheels have not finished climbing). If the control unit 100 determines that other wheels are in contact with the upper surface of the step 41 (other wheels have finished climbing up the step 41), x1=x41 is adopted. If the control unit 100 determines that other wheels are in contact with the lower surface of the step 42 (other wheels have finished climbing down the step 42), x1=x42 is adopted.

The control unit 100 then sets a spring coefficient k and target position xd for the respective non-climbing wheel mechanism. In this case a non-climbing spring coefficient k2 is adopted as the spring coefficient k, and the second target position x2 is adopted as the target position xd (S17). Here, the control unit 100 refers to the center of gravity table 105b and acquires the inclination β and γ of the plate 15 memorized with relation to the climbing wheel mechanism. The control unit 100 respectively calculates the vertical movement h1 to h4 of the first wheel supporting screw 115 to the fourth wheel supporting screw 145. The control unit 100 then calculates the second target position x2 of each non-climbing wheel mechanism utilizing the vertical movement h1 to h4 and the first target position x1 (the equilibrium point of the wheel supporting screw corresponding to the climbing wheel mechanism).

The control unit 100 calculates the respective positions x of the first wheel supporting screw 115 to the fourth wheel supporting screw 145, based on rotation angles detected by the first screw rotation angle sensor 117 to the fourth screw rotation angle sensor 147 (S18).

The control unit 100 calculates a value of the vertical moving force T=k(xd−x) to be given to the first wheel supporting screw 115 to the fourth wheel supporting screw 145 by the first vertical motion motor 116 to the fourth vertical motion motor 146 respectively. The control unit 100 causes the first vertical motion motor 116 to the fourth vertical motion motor 146 to output the vertical moving force T, through the vertical motion motor control unit 106 (S19). The processing of S18 and S19 is repeatedly executed at every impedance control cycle.

The control unit 100 determines whether the climbing action has finished or not utilizing the load F output by the load sensor of the climbing wheel mechanism (S20). If the load is defined as F<F4 or F>F3, the control unit 100 determines that the climbing has not finished (NO at S20), and returns the process to S18. In case where the load F is defined as F≦F3 or F≧F4, the control unit 100 determines that the climbing has finished (YES at S20), and stores the information that the climbing wheel mechanism has finished climbing in the memory unit 105.

The control unit 100 refers to the memory unit 105 and determines whether all of the first wheel mechanism 11 to the fourth wheel mechanism have finished climbing or not (S21). If the climbing has not finished (NO at S21), the process is returned to S12. If the climbing has finished (YES at S21), the control unit 100 erases the information that all the wheel mechanisms have finished climbing from the memory unit 105, and returns the process to S1. In other words, the control unit 100 recognizes the upper surface of the step 41 or the lower surface of the step 42 as the ground 40, to repeat a renewed climbing processing.

FIGS. 8A and 8B through 17 are explanatory drawings showing the climbing operation of the bogie 1. In each drawing, FIG. A schematically shows a plan view of the bogie 1. FIG. B schematically shows a side view of the bogie 1.

FIGS. 8A and 8B through 13A and 13B are explanatory drawings for a case of climbing up the step 41.

Figure 8A:
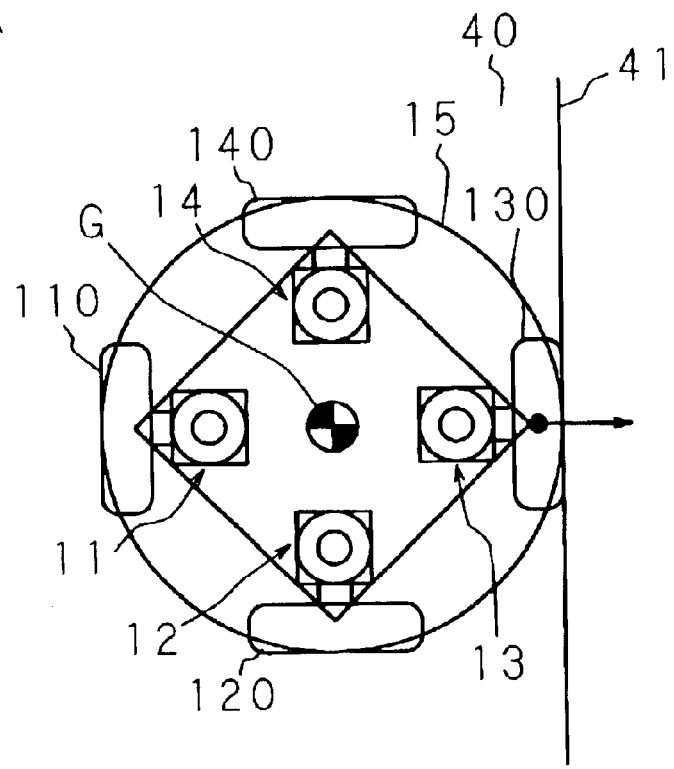
FIGS. 8A and 8B are explanatory drawings to explain a climbing motion of the bogie according to the Embodiment 1 of the invention.
Figure 8B:
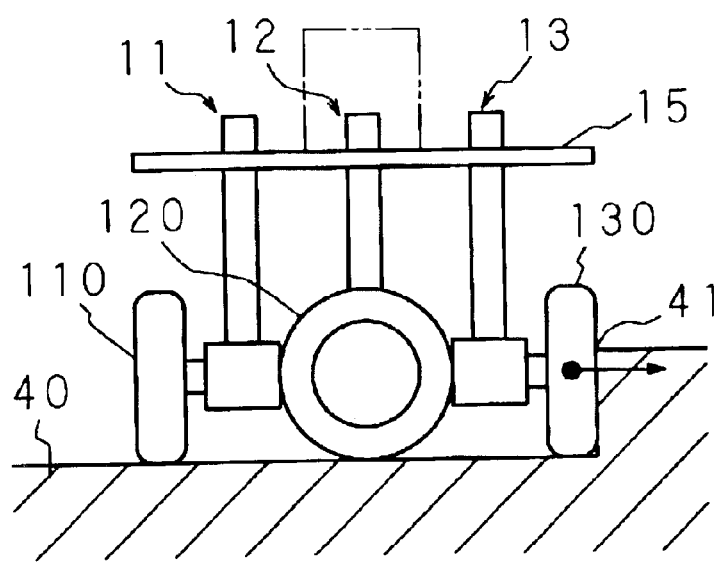

Referring to FIGS. 8A and 8B, the bogie 1 is traveling on the ground 40 until the third wheel 130 makes contact with the step 41. The plate 15 is horizontally retained at the position of x=x40 and its center of gravity is on the center point of the plate 15 (S11 of FIG. 7). Also, the spring coefficient k=ordinary spring coefficient k0 and target position xd=ordinary target position x0=x40 are set for the first wheel mechanism 11 to the fourth wheel mechanism 14 (S12 of FIG. 7).

When the third wheel 130 makes contact with the step 41, the third load sensor 132 detects a load F≧F1. The control unit 100 determines that the third wheel 130 has made contact with the step. In other words, the control unit 100 determines that it has detected a step (YES at S15 of FIG. 7).

The control unit 100 stores the third wheel mechanism 13 as a climbing wheel mechanism in the memory unit 105. The control unit 100 also stores the first wheel mechanism 11, second wheel mechanism 12 and fourth wheel mechanism 14 as non-climbing wheel mechanism in the memory unit 105. The control unit 100 then sets the spring coefficient k=climbing spring coefficient k1 and target position xd=the first target position x1=x40 for the climbing wheel mechanism (S16 of FIG. 7). Also, the control unit 100 sets the spring coefficient k=non-climbing spring coefficient k2 and target position xd=the second target position x2 for the non-climbing wheel mechanism. The second target position x2 is calculated in such a manner that the center of gravity is located within a triangle formed by the first wheel mechanism 11, second wheel mechanism 12 and fourth wheel mechanism 14 as shown in FIG. 9A (S17 of FIG. 7).

Figure 9A:
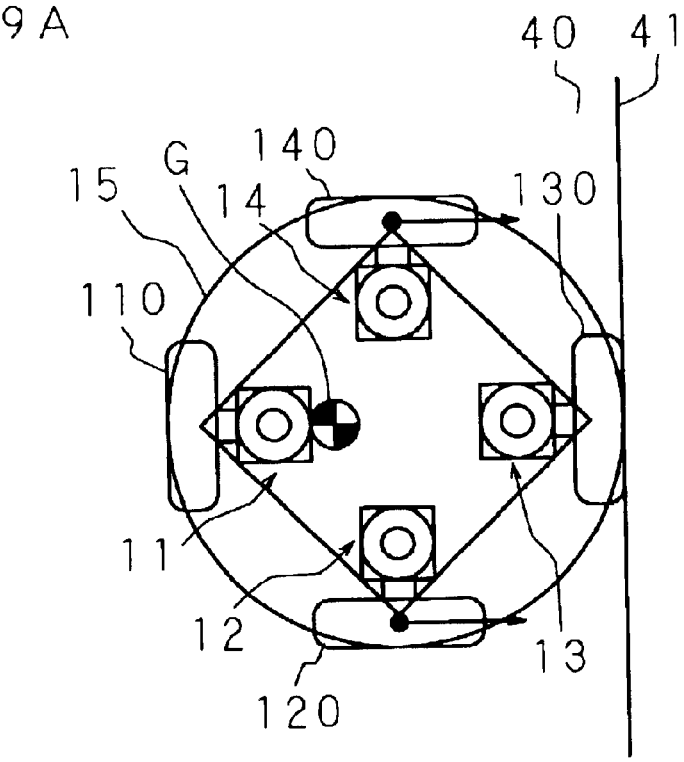
FIGS. 9A and 9B are explanatory drawings to explain a to climbing motion of the bogie according to the Embodiment 1 of the invention.
Figure 9B:
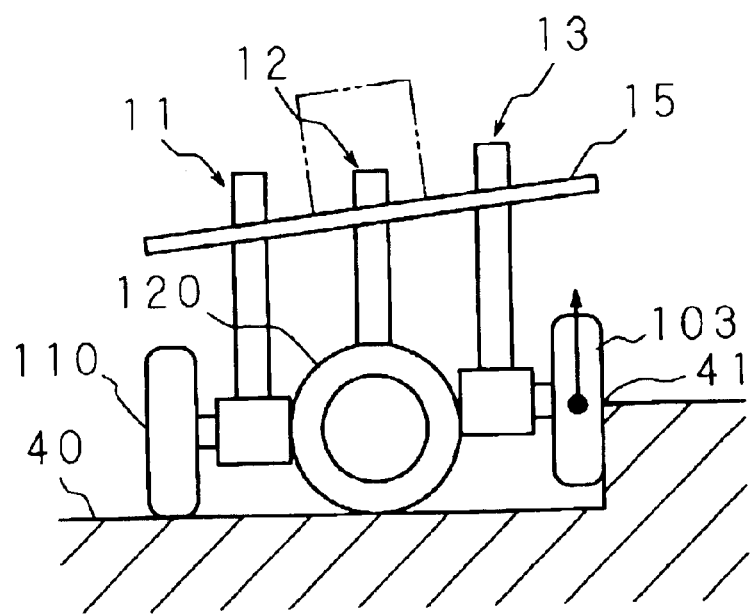

Referring to FIGS. 9A and 9B, the bogie 1 enters the step 41 while the first vertical motion motor 116 to the fourth vertical motion motor 146 are providing the vertical moving force T=k(xd−x) to the first wheel supporting screw 115 to the fourth wheel supporting screw 145 (S19 of FIG. 7) respectively. At this moment the plate 15 inclines backward with respect to the traveling direction. Also, the third wheel 130 makes contact with a wall face of the step 41, and then moves upward climbing up the step 41.

Figure 10A:
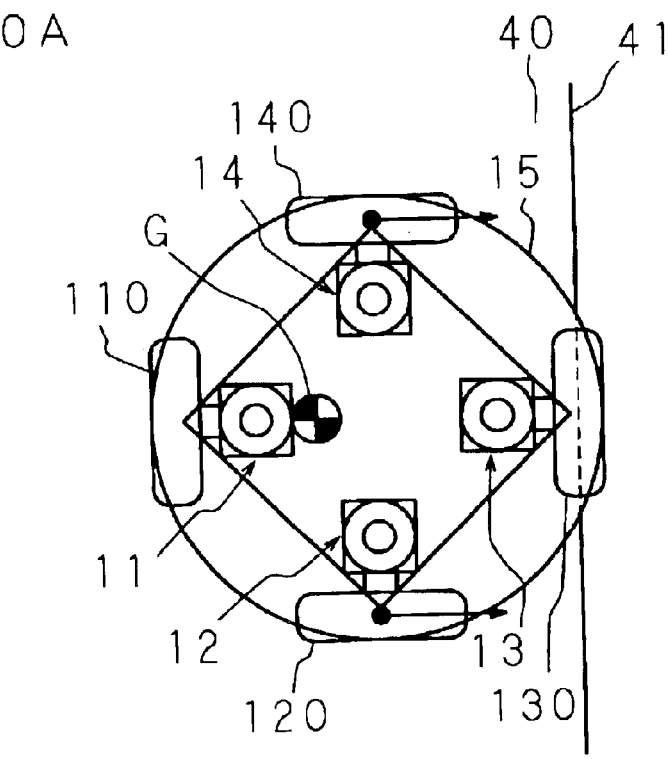
FIGS. 10A and 10B are explanatory drawings to explain a climbing motion of the bogie according to the Embodiment 1 of the invention.
Figure 10B:
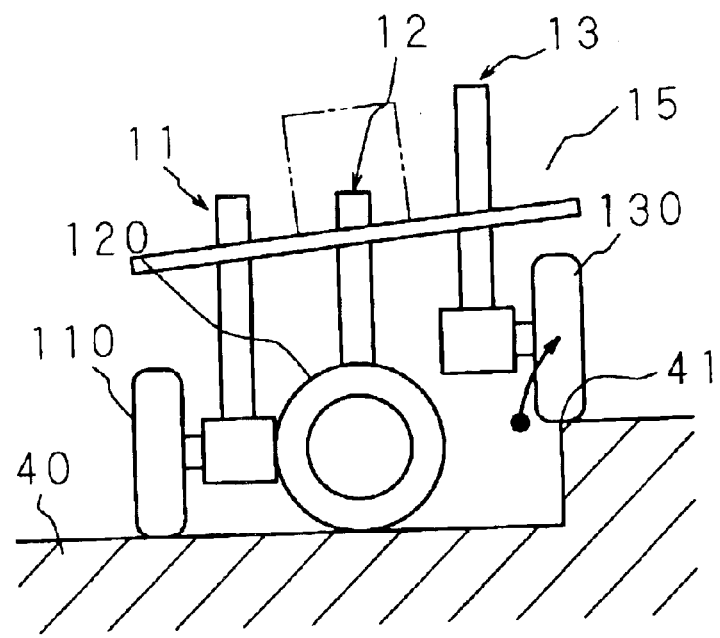

Referring to FIGS. 10A and 10B, when the third wheel 130 has finished climbing up the step 41, the third load sensor 132 detects the load F≦F3. The control unit 100 determines that the third wheel 130 has finished climbing up (YES at S20 of FIG. 7). At this stage, the control unit 100 stores the information that the third wheel mechanism 13 has finished climbing in the memory unit 105. Also, the control unit 100 stores the information of the position x=x41 detected by the third screw rotation angle sensor 137 in the memory unit 105.

Then, the bogie 1 travels toward the step 41 until the second wheel 120 makes contact with the step 41. In this case, the control unit 100 sets the spring coefficient k=ordinary spring coefficient k0 and target position xd=ordinary target position x0=x40 for the first wheel mechanism 11, second wheel mechanism 12 and the fourth wheel mechanism 14 respectively having its wheel in contact with the ground 40. The control unit 100 then sets the spring coefficient k=ordinary spring coefficient k0 and target position xd=ordinary target position x0=x41 for the third wheel mechanism 13 having its wheel on the upper surface of the step 41 (S12 of FIG. 7).

When the second wheel 120 makes contact with the step 41, the second load sensor 122 detects a load F≧F1. The control unit 100 determines that the second wheel 120 has made contact with the step. In other words, the control unit 100 determines that it has detected a step (YES at S15 of FIG. 7).

The control unit 100 stores the second wheel mechanism 12 as a climbing wheel mechanism in the memory unit 105.

The control unit 100 also stores the first wheel mechanism 11, third wheel mechanism 13 and fourth wheel mechanism 14 as non-climbing wheel mechanism in the memory unit 105. The control unit 100 then sets the spring coefficient k=climbing spring coefficient k1 and target position xd=the first target position x1=x41 for the climbing wheel mechanism (S16 of FIG. 7). Also, the control unit 100 sets the spring coefficient k=non-climbing spring coefficient k2 and target position xd=the second target position x2 for the non-climbing wheel mechanism. The second target position x2 is calculated in such a manner that the center of gravity is located within a triangle formed by the first wheel mechanism 11, third wheel mechanism 13 and fourth wheel mechanism 14 as shown in FIG. 11A (S17 of FIG. 7).

Figure 11A:
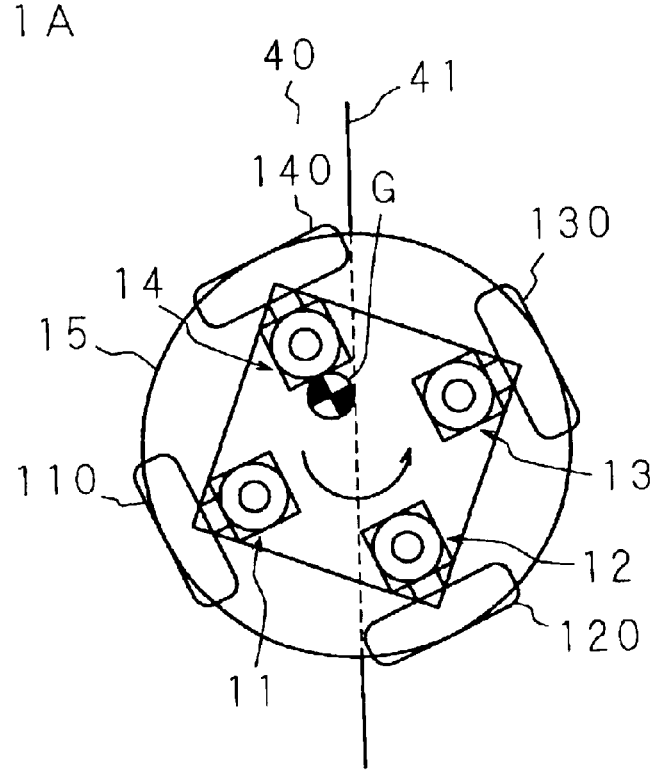
FIGS. 11A and 11B are explanatory drawings to explain a climbing motion of the bogie according to the Embodiment 1 of the invention.
Figure 11B:
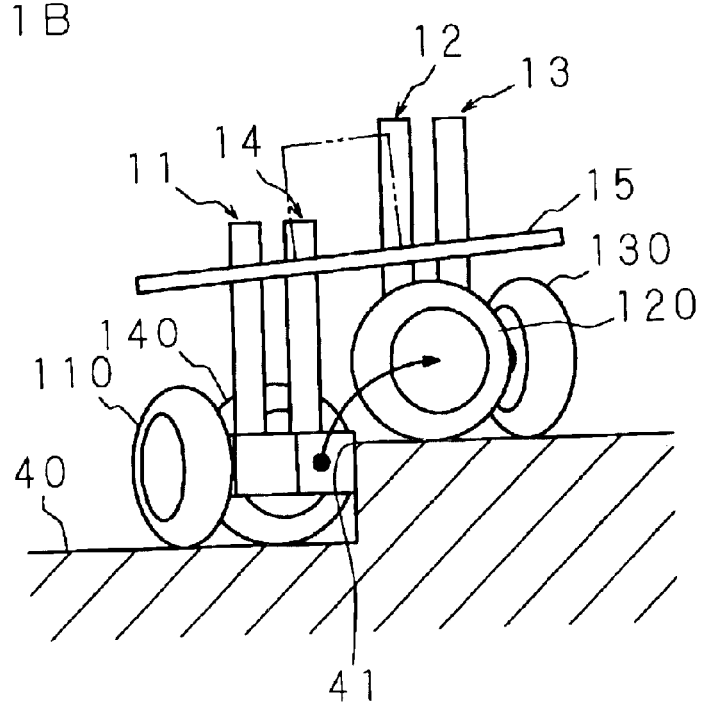

Referring to FIGS. 11A and 11B, the bogie 1 enters the step 41 while the first vertical motion motor 116 to the fourth vertical motion motor 146 are providing the vertical moving force T=k(xd−x) to the first wheel supporting screw 115 to the fourth wheel supporting screw 145 (S19 of FIG. 7) respectively. At this moment the plate 15 inclines backward with respect to the traveling direction. Also, the second wheel 120 makes contact with a wall face of the step 41, and then moves upward climbing up the step 41.

When the second wheel 120 has finished climbing up the step 41, the second load sensor 122 detects the load F≦F3. The control unit 100 determines that the second wheel 120 has finished climbing up (YES at S20 of FIG. 7). At this stage, the control unit 100 stores the information that the second wheel mechanism 12 has finished climbing in the memory unit 105.

Then, the bogie 1 travels toward the step 41 until the fourth wheel 140 makes contact with the step 41. In this case, the control unit 100 sets the spring coefficient k=ordinary spring coefficient k0 and target position xd=ordinary target position x0=x40 for the first wheel mechanism 11 and the fourth wheel mechanism 14 respectively having its wheel in contact with the ground 40. The control unit 100 then sets the spring coefficient k=ordinary spring coefficient k0 and target position xd=ordinary target position x0=x41 for the second wheel mechanism 12 and third wheel mechanism 13 respectively having its wheel on the upper surface of the step 41 (S12 of FIG. 7).

When the fourth wheel 140 makes contact with the step 41, the fourth load sensor 142 detects a load F≧F1. The control unit 100 determines that the fourth wheel 140 has made contact with the step. In other words, the control unit 100 determines that it has detected a step (YES at S15 of FIG. 7).

The control unit 100 stores the fourth wheel mechanism 14 as a climbing wheel mechanism in the memory unit 105. The control unit 100 also stores the first wheel mechanism 11, second wheel mechanism 12 and third wheel mechanism 13 as non-climbing wheel mechanism in the memory unit 105. The control unit 100 then sets the spring coefficient k=climbing spring coefficient k1 and target position xd=the first target position x1=x41 for the climbing wheel mechanism (S16 of FIG. 7). Also, the control unit 100 sets the spring coefficient k=non-climbing spring coefficient k2 and target position xd=the second target position x2 for the non-climbing wheel mechanism. The second target position x2 is calculated in such a manner that the center of gravity is located within a triangle formed by the first wheel mechanism 11, second wheel mechanism 12 and third wheel mechanism 13 as shown in FIG. 12A (S17 of FIG. 7).

Figure 12A:
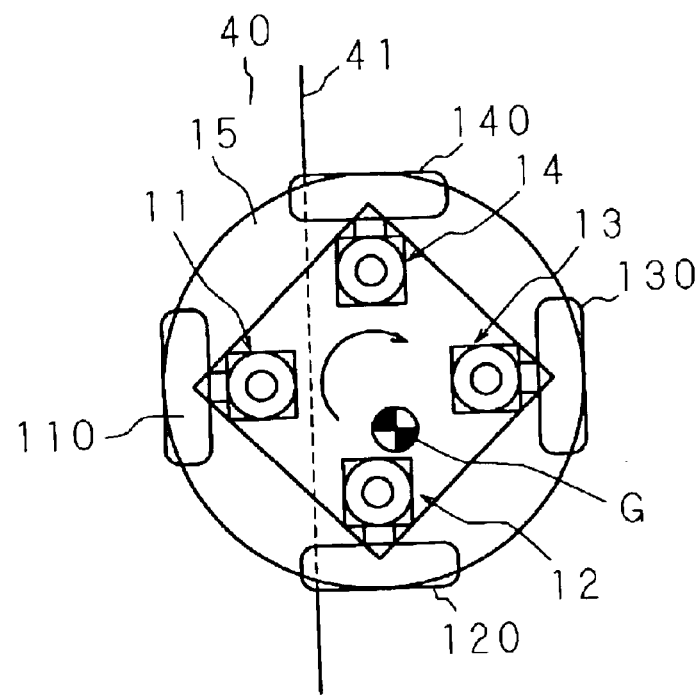
FIGS. 12A and 12B are explanatory drawings to explain a climbing motion of the bogie according to the Embodiment 1 of the invention.
Figure 12B:
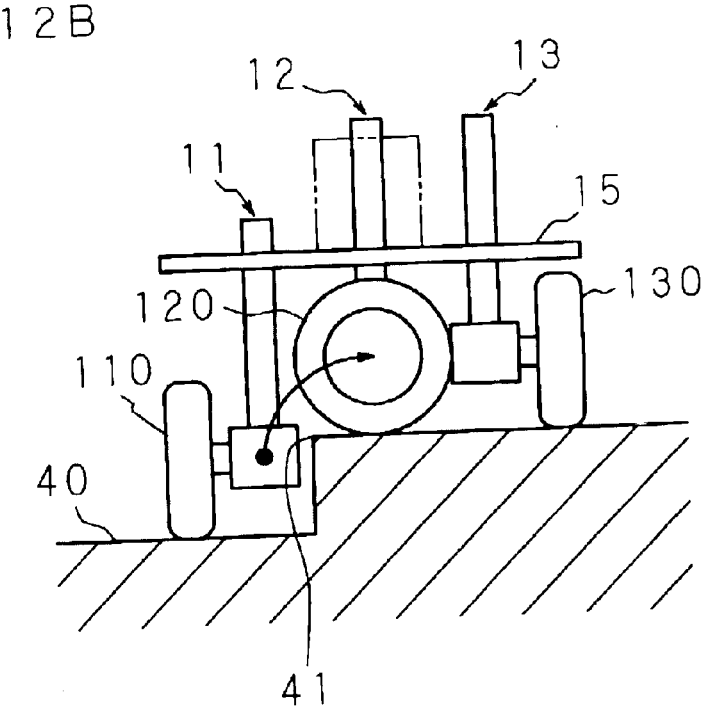

Referring to FIGS. 12A and 12B, the bogie 1 enters the step 41 while the first vertical motion motor 116 to the fourth vertical motion motor 146 are providing the vertical moving force T=k(xd−x) to the first wheel supporting screw 115 to the fourth wheel supporting screw 145 (S19 of FIG. 7) respectively. At this moment the plate 15 inclines backward with respect to the traveling direction. Also, the fourth wheel 140 makes contact with a wall face of the step 41, and then moves upward climbing up the step 41.

When the fourth wheel 140 has finished climbing up the step 41, the fourth load sensor 142 detects the load F≦F3. The control unit 100 determines that the fourth wheel 140 has finished climbing up (YES at S20 of FIG. 7). At this stage, the control unit 100 stores the information that the fourth wheel mechanism 14 has finished climbing in the memory unit 105.

Finally, the bogie 1 travels toward the step 41 until the first wheel 110 makes contact with the step 41. In this case, the control unit 100 sets the spring coefficient k=ordinary spring coefficient k0 and target position xd=ordinary target position x0=x40 for the first wheel mechanism 11 having its wheel in contact with the ground 40. The control unit 100 then sets the spring coefficient k=ordinary spring coefficient k0 and target position xd=ordinary target position x0=x41 for the second wheel mechanism 12, third wheel mechanism 13 and the fourth wheel mechanism 14 respectively having its wheel on the upper surface of the step 41 (S12 of FIG. 7).

When the first wheel 110 makes contact with the step 41, the first load sensor 112 detects a load F≧F1. The control unit 100 determines that the first wheel 110 has made contact with the step. In other words, the control unit 100 determines that it has detected a step (YES at S15 of FIG. 7).

The control unit 100 stores the first wheel mechanism 11 as a climbing wheel mechanism in the memory unit 105. The control unit 100 also stores the second wheel mechanism 12, third wheel mechanism 13 and fourth wheel mechanism 14 as non-climbing wheel mechanism in the memory unit 105. The control unit 100 then sets the spring coefficient k=climbing spring coefficient k1 and target position xd=the first target position x1=x41 for the climbing wheel mechanism (S16 of FIG. 7). Also, the control unit 100 sets the spring coefficient k=non-climbing spring coefficient k2 and target position xd=the second target position x2 for the non-climbing wheel mechanism. The second target position x2 is calculated in such a manner that the center of gravity is located within a triangle formed by the second wheel mechanism 12, third wheel mechanism 13 and fourth wheel mechanism 14 as shown in FIG. 13A (S17 of FIG. 7).

Figure 13A:
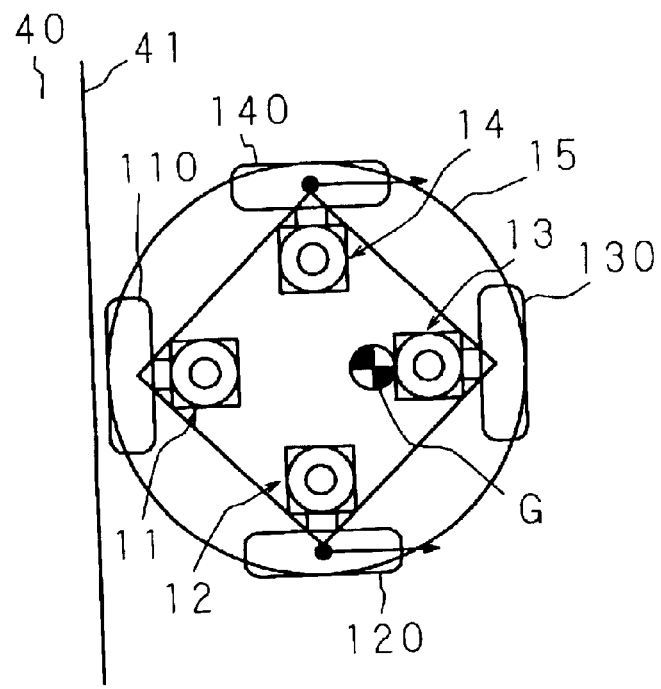
FIGS. 13A and 13B are explanatory drawings to explain a climbing motion of the bogie according to the Embodiment 1 of the invention.
Figure 13B:
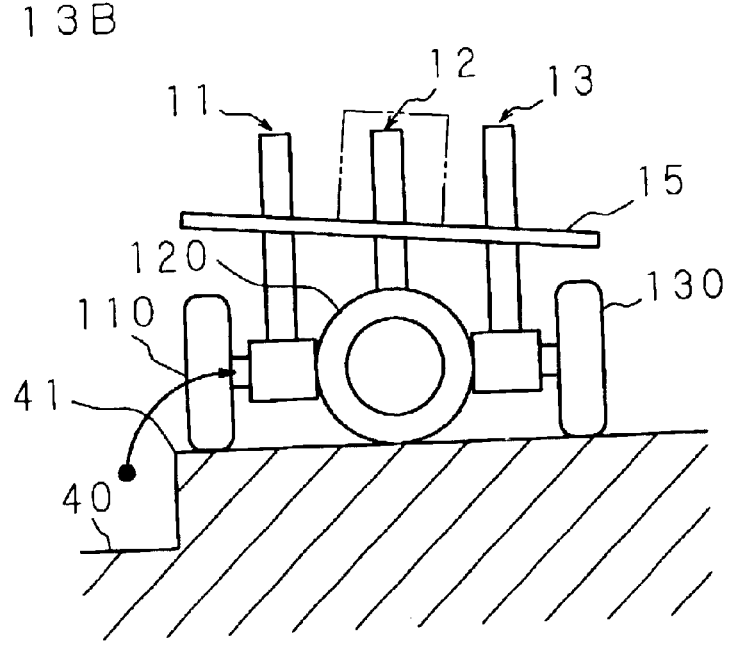

Referring to FIGS. 13A and 13B, the bogie 1 enters the step 41 while the first vertical motion motor 116 to the fourth vertical motion motor 146 are providing the vertical moving force T=k(xd−x) to the first wheel supporting screw 115 to the fourth wheel supporting screw 145 (S19 of FIG. 7) respectively. At this moment the plate 15 inclines backward with respect to the traveling direction. Also, the first wheel 110 makes contact with a wall face of the step 41, and then moves upward climbing up the step 41.

When the first wheel 110 has finished climbing up the step 41, the first load sensor 112 detects the load F≦F3. The control unit 100 determines that the first wheel 110 has finished climbing up (YES at S20 of FIG. 7). At this stage, the control unit 100 stores the information that the first wheel mechanism 11 has finished climbing in the memory unit 105.

When the first wheel 110 to the fourth wheel 140 have all finished climbing (YES at S21 of FIG. 7), the information that each wheel mechanism had finished climbing is erased from the memory unit 105.

The bogie 1 controls the output of the vertical motion motors of the respective wheel mechanism as described above. And the bogie causes each wheel to make contact with a wall face of the step 41, and facilitate the wheel to move upward so that it can climb up the step 41. Therefore, even when the wheel in a climbing motion is irregularly moved in a vertical direction, the other wheels can be immediately made to contact with the ground, so that the bogie remains in a stable posture.

FIGS. 14A and 14B through 17A and 17B are explanatory drawings showing the steps of climbing down the step 42.

Figure 14A:
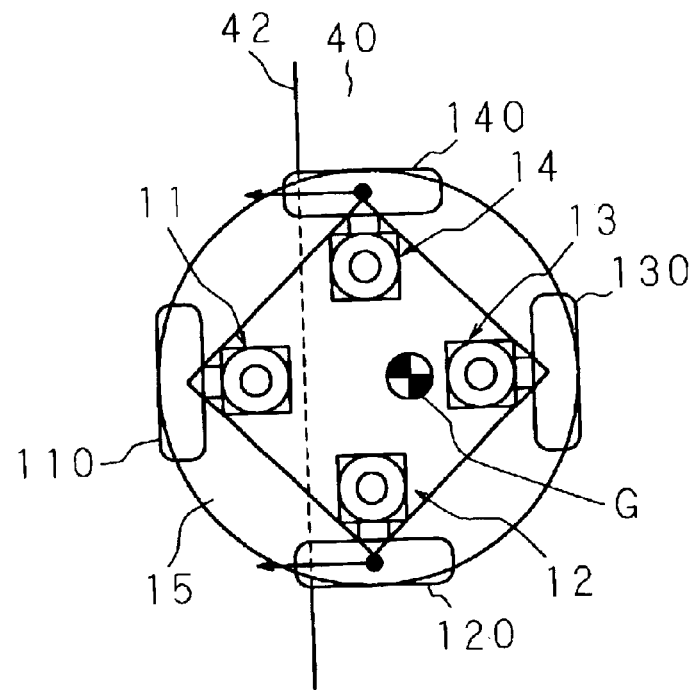
FIGS. 14A and 14B are explanatory drawings to explain a climbing motion of the bogie according to the Embodiment 1 of the invention.
Figure 14B:
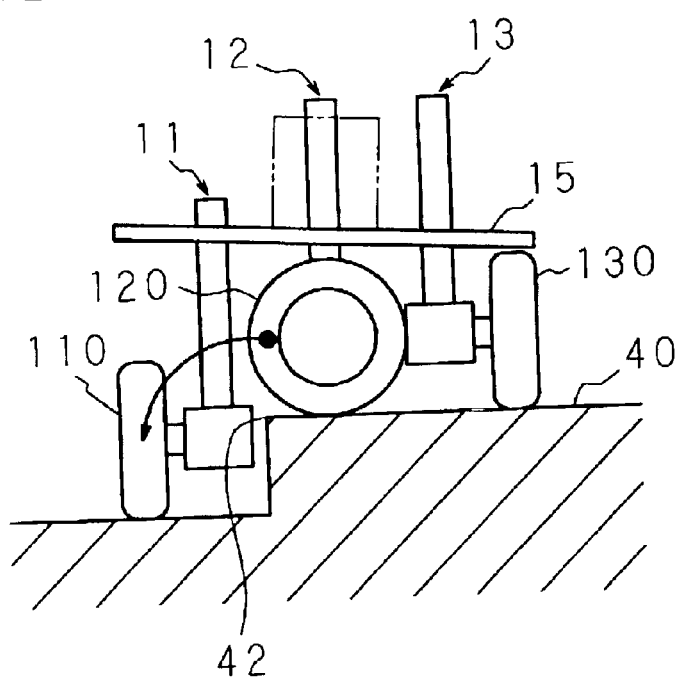

Referring to FIGS. 14A and 14B, the bogie 1 is traveling on the ground 40 until the first wheel 110 enters the step 42. The plate 15 is horizontally retained at the position of x=x40 and its center of gravity is on the center point of the plate 15 (S11 of FIG. 7). Also, the spring coefficient k=ordinary spring coefficient k0 and target position xd=ordinary target position x0=x40 are set for the first wheel mechanism 11 to the fourth wheel mechanism 14 (S12 of FIG. 7).

When the first wheel 110 enters the step 42, the first load sensor 112 detects a load F≦F2. The control unit 100 determines that the first wheel 110 has entered the step. In other words, the control unit 100 determines that it has detected a step (YES at S15 of FIG. 7).

The control unit 100 stores the first wheel mechanism 11 as a climbing wheel mechanism in the memory unit 105. The control unit 100 also stores the second wheel mechanism 12, third wheel mechanism 13 and fourth wheel mechanism 14 as non-climbing wheel mechanism in the memory unit 105. The control unit 100 then sets the spring coefficient k=climbing spring coefficient k1 and target position xd=the first target position x1=x40 for the climbing wheel mechanism (S16 of FIG. 7). Also, the control unit 100 sets the spring coefficient k=non-climbing spring coefficient k2 and target position xd=the second target position x2 for the non-climbing wheel mechanism. The second target position x2 is calculated in such a manner that the center of gravity is located within a triangle formed by the second wheel mechanism 12, third wheel mechanism 13 and fourth wheel mechanism 14 as shown in FIG. 14A (S17 of FIG. 7).

Referring to FIGS. 14A and 14B, the bogie 1 enters the step 42 while the first vertical motion motor 116 to the fourth vertical motion motor 146 are providing the vertical moving force T=k(xd−x) to the first wheel supporting screw 115 to the fourth wheel supporting screw 145 (S19 of FIG. 7) respectively. At this moment the plate 15 inclines forward with respect to the traveling direction. Also, the first wheel 110 makes contact with a wall face of the step 42, and then moves downward climbing down the step 42.

When the first wheel 110 has finished climbing down the step 42, the first load sensor 112 detects the load F≧F4. The control unit 100 determines that the first wheel 110 has finished climbing down (YES at S20 of FIG. 7). At this stage, the control unit 100 stores the information that the first wheel mechanism 11 has finished climbing in the memory unit 105. Also, the control unit 100 stores the information of the position x=x42 detected by the first screw rotation angle sensor 117 in the memory unit 105.

Then, the bogie 1 travels toward the step 42 until the fourth wheel 140 enters the step 42. In this case, the spring coefficient k=ordinary spring coefficient k0 and target position xd=ordinary target position x0=x40 are set for the second wheel mechanism 12, third wheel mechanism 13 and fourth wheel mechanism 14 respectively having its wheel in contact with the ground 40. Also the spring coefficient k=ordinary spring coefficient k0 and target position xd=ordinary target position x0=x42 are set for the first wheel mechanism 11 having its wheel in contact with the lower surface of the step 42 (S12 of FIG. 7).

When the fourth wheel 140 enters the step 42, the fourth load sensor 142 detects a load F≦F2. The control unit 100 determines that the fourth wheel 140 has entered the step. In other words, the control unit 100 determines that it has detected a step (YES at S15 of FIG. 7).

The control unit 100 stores the fourth wheel mechanism 14 as a climbing wheel mechanism in the memory unit 105. The control unit 100 also stores the first wheel mechanism 11, second wheel mechanism 12 and third wheel mechanism 13 as non-climbing wheel mechanism in the memory unit 105. The control unit 100 then sets the spring coefficient k=climbing spring coefficient k1 and target position xd=the first target position x1=x42 for the climbing wheel mechanism (S16 of FIG. 7). Also, the control unit 100 sets the spring coefficient k=non-climbing spring coefficient k2 and target position xd=the second target position x2 for the non-climbing wheel mechanism. The second target position x2 is calculated in such a manner that the center of gravity is located within a triangle formed by the first wheel mechanism 11, second wheel mechanism 12 and third wheel mechanism 13 as shown in FIG. 15A (S17 of FIG. 7).

Figure 15A:
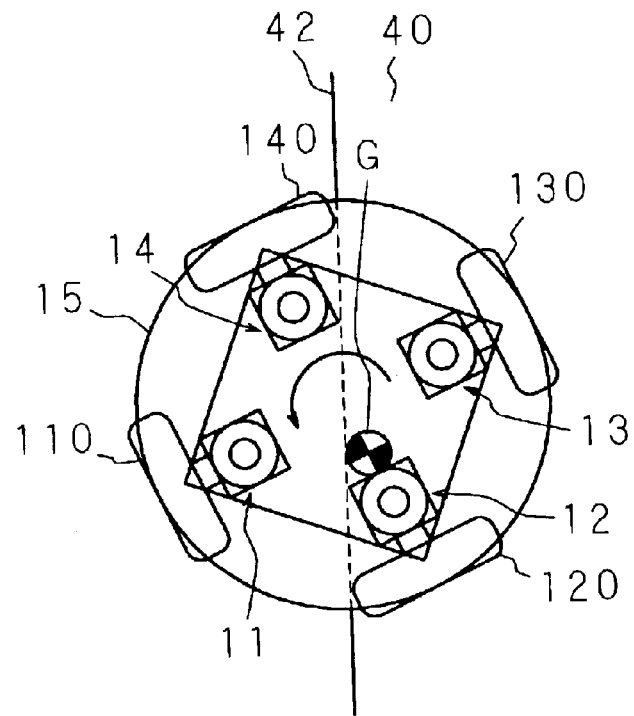
FIGS. 15A and 15B are explanatory drawings to explain a climbing motion of the bogie according to the Embodiment 1 of the invention.
Figure 15B:
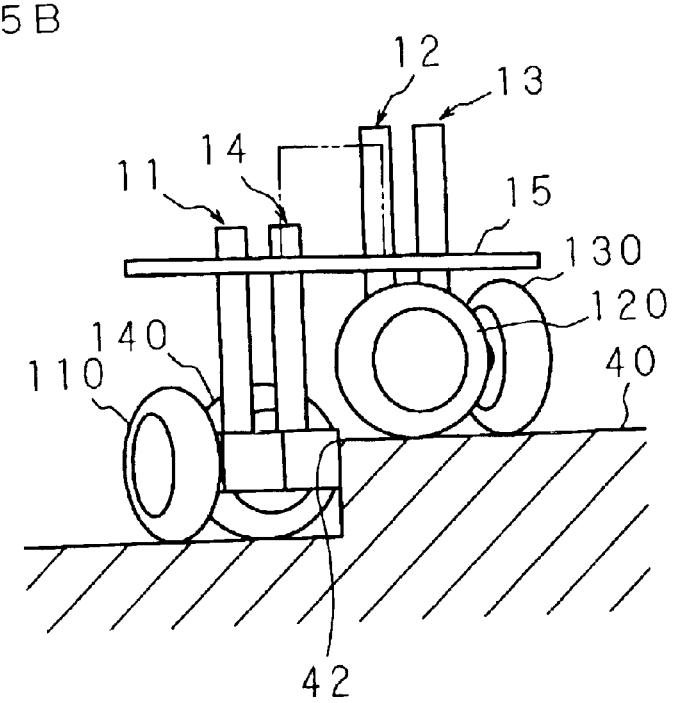

Referring to FIGS. 15A and 15B, the bogie 1 enters the step 42 while the first vertical motion motor 116 to the fourth vertical motion motor 146 are providing the vertical moving force T=k(xd−x) to the first wheel supporting screw 115 to the fourth wheel supporting screw 145 (S19 of FIG. 7) respectively. At this moment the plate 15 inclines forward with respect to the traveling direction. Also, the fourth wheel 140 makes contact with a wall face of the step 42, and then moves downward climbing down the step 42.

When the fourth wheel 140 has finished climbing down the step 42, the fourth load sensor 142 detects the load F≧F4. The control unit 100 determines that the fourth wheel 140 has finished climbing down (YES at S20 of FIG. 7). At this stage, the control unit 100 stores the information that the fourth wheel mechanism 14 has finished climbing in the memory unit 105.

Then, the bogie 1 travels toward the step 42 until the second wheel 120 enters the step 42. In this case, the spring coefficient k=ordinary spring coefficient k0 and target position xd=ordinary target position x0=x40 are set for the second wheel mechanism 12 and third wheel mechanism 13 respectively having its wheel in contact with the ground 40. Also the spring coefficient k=ordinary spring coefficient k0 and target position xd=ordinary target position x0=x42 are set for the first wheel mechanism 11 and fourth wheel mechanism 14 respectively having its wheel in contact with the lower surface of the step 42 (S12 of FIG. 7).

When the second wheel 120 enters the step 42, the second load sensor 122 detects a load F≦F2. The control unit 100 determines that the second wheel 120 has entered the step. In other words, the control unit 100 determines that it has detected a step (YES at S15 of FIG. 7).

The control unit 100 stores the second wheel mechanism 12 as a climbing wheel mechanism in the memory unit 105. The control unit 100 also stores the first wheel mechanism 11, third wheel mechanism 13 and fourth wheel mechanism 14 as non-climbing wheel mechanism in the memory unit 105. The control unit 100 then sets the spring coefficient k=climbing spring coefficient k1 and target position xd=the first target position x1=x42 for the climbing wheel mechanism (S16 of FIG. 7). Also, the control unit 100 sets the spring coefficient k=non-climbing spring coefficient k2 and target position xd=the second target position x2 for the non-climbing wheel mechanism. The second target position x2 is calculated in such a manner that the center of gravity is located within a triangle formed by the first wheel mechanism 11, third wheel mechanism 13 and fourth wheel mechanism 14 as shown in FIG. 16A (S17 of FIG. 7).

Figure 16A:
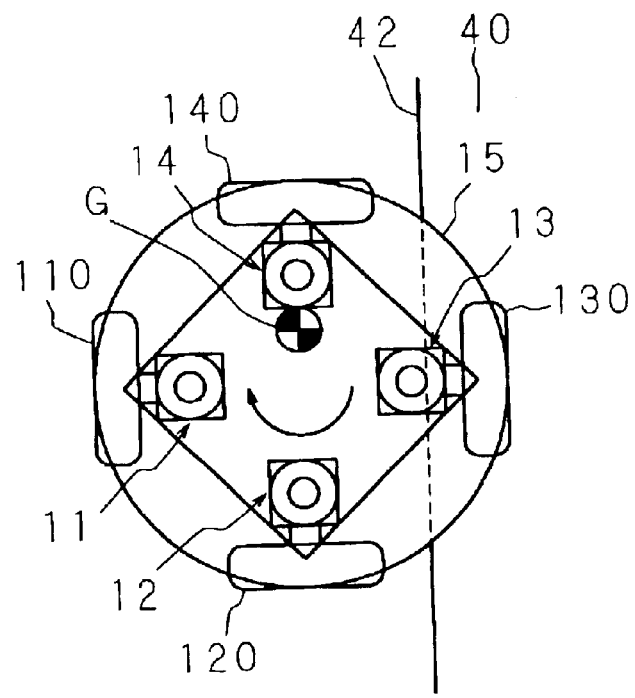
FIGS. 16A and 16B are explanatory drawings to explain a climbing motion of the bogie according to the Embodiment 1 of the invention.
Figure 16B:
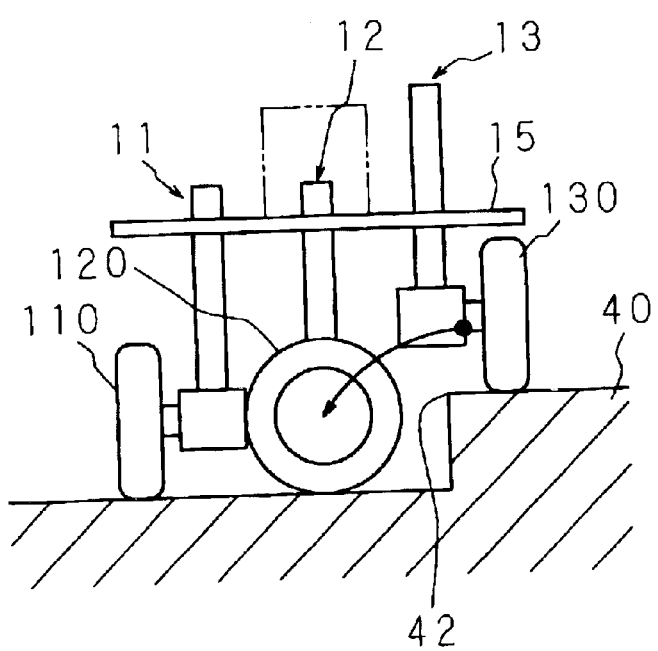

Referring to FIGS. 16A and 16B, the bogie 1 enters the step 42 while the first vertical motion motor 116 to the fourth vertical motion motor 146 are providing the vertical moving force T=k(xd−x) to the first wheel supporting screw 115 to the fourth wheel supporting screw 145 (S19 of FIG. 7) respectively. At this moment the plate 15 inclines forward with respect to the traveling direction. Also, the second wheel 120 makes contact with a wall face of the step 42, and then moves downward climbing down the step 42.

When the second wheel 120 has finished climbing down the step 42, the second load sensor 122 detects the load F≧F4. The control unit 100 determines that the second wheel 120 has finished climbing down (YES at S20 of FIG. 7). At this stage, the control unit 100 stores the information that the second wheel mechanism 12 has finished climbing in the memory unit 105.

Finally, the bogie 1 travels toward the step 42 until the third wheel 130 enters the step 42. In this case, the spring coefficient k=ordinary spring coefficient k0 and target position xd=ordinary target position x0=x40 are set for the third wheel mechanism 13 having its wheel in contact with the ground 40. Also the spring coefficient k=ordinary spring coefficient k0 and target position xd=ordinary target position x0=x42 are set for the first wheel mechanism 11, second wheel mechanism 12 and fourth wheel mechanism 14 respectively having its wheel in contact with the lower surface of the step 42 (S12 of FIG. 7).

When the third wheel 130 enters the step 42, the third load sensor 132 detects a load F≦F2. The control unit 100 determines that the third wheel 130 has entered the step. In other words, the control unit 100 determines that it has detected a step (YES at S15 of FIG. 7).

The control unit 100 stores the third wheel mechanism 13 as a climbing wheel mechanism in the memory unit 105. The control unit 100 also stores the first wheel mechanism 11, second wheel mechanism 12 and fourth wheel mechanism 14 as non-climbing wheel mechanism in the memory unit 105. The control unit 100 then sets the spring coefficient k=climbing spring coefficient k1 and target position xd=the first target position x1=x42 for the climbing wheel mechanism (S16 of FIG. 7). Also, the control unit 100 sets the spring coefficient k=non-climbing spring coefficient k2 and target position xd=the second target position x2 for the non-climbing wheel mechanism. The second target position x2 is calculated in such a manner that the center of gravity is located within a triangle formed by the first wheel mechanism 11, second wheel mechanism 12 and fourth wheel mechanism 14 as shown in FIG. 17A (S17 of FIG. 7).

Figure 17A:
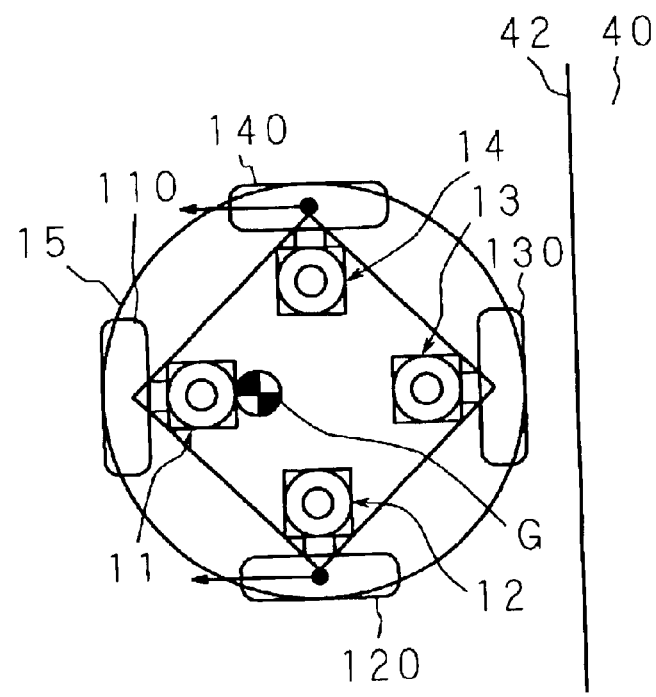
FIGS. 17A and 17B are explanatory drawings to explain a climbing motion of the bogie according to the Embodiment 1 of the invention.
Figure 17B:
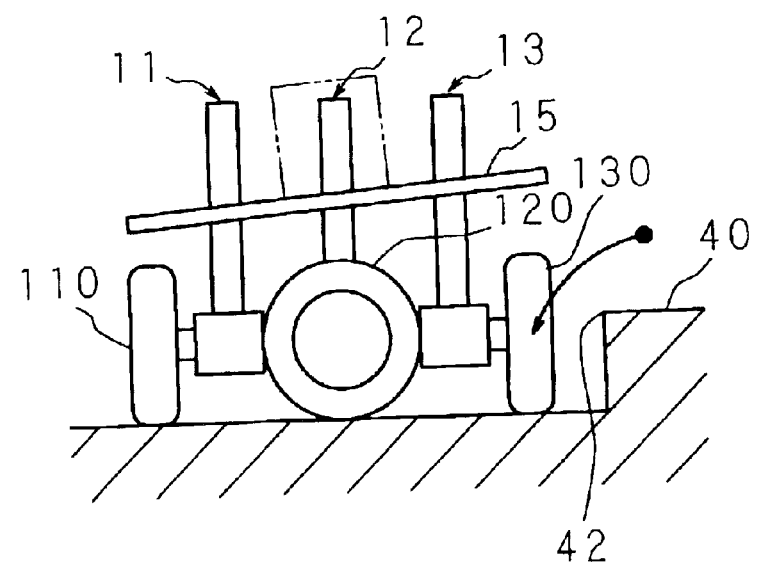

Referring to FIGS. 17A and 17B, the bogie 1 enters the step 42 while the first vertical motion motor 116 to the fourth vertical motion motor 146 are providing the vertical moving force T=k(xd−x) to the first wheel supporting screw 115 to the fourth wheel supporting screw 145 (S19 of FIG. 7) respectively. At this moment the plate 15 inclines forward with respect to the traveling direction. Also, the third wheel 130 makes contact with a wall face of the step 42, and then moves downward climbing down the step 42.

When the third wheel 130 has finished climbing down the step 42, the third load sensor 132 detects the load F≧F4. The control unit 100 determines that the third wheel 130 has finished climbing down (YES at S20 of FIG. 7). At this stage, the control unit 100 stores the information that the third wheel mechanism 13 has finished climbing in the memory unit 105.

When the first wheel 110 to the fourth wheel 140 have all finished climbing (YES at S21 of FIG. 7), the information that each wheel mechanism has finished climbing is erased from the memory unit 105.

The bogie 1 controls the output of the vertical motion motors of the respective wheel mechanism as described above. And the bogie causes each wheel to make contact with a wall face of the step 42, and facilitate the wheel to move downward so that it can climb down the step 42. Therefore, even when the wheel in a climbing motion is irregularly moved in a vertical direction, the other wheels can be immediately made to contact with the ground, so that the bogie remains in a stable posture.

Further, according to FIGS. 8A and 8B to 10A and 10B the wheels are entering the step in parallel thereto, while the wheels may also be made to enter the step diagonally. In this case it becomes easier for the wheels to climb up the step.

Embodiment 2

Figure 18:
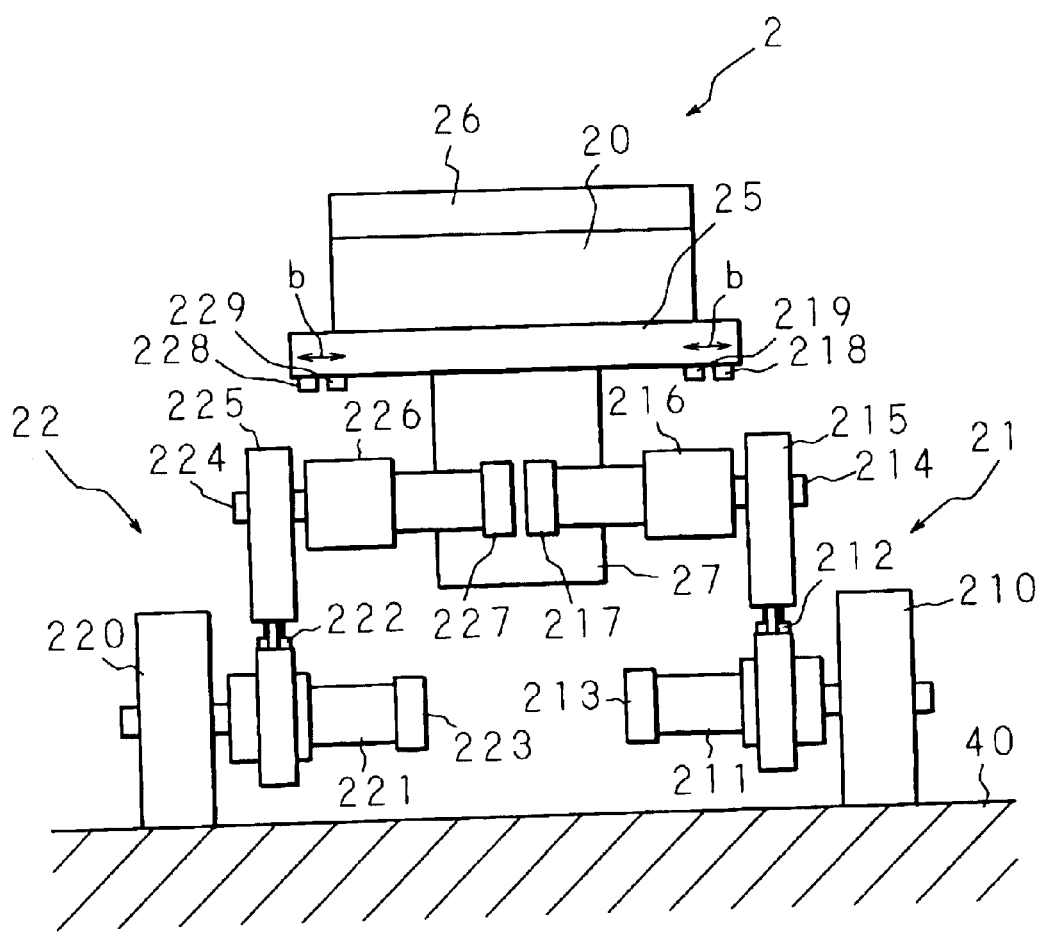
FIG. 18 is a schematic front view of a bogie according to the Embodiment 2 of the invention.
Figure 19:
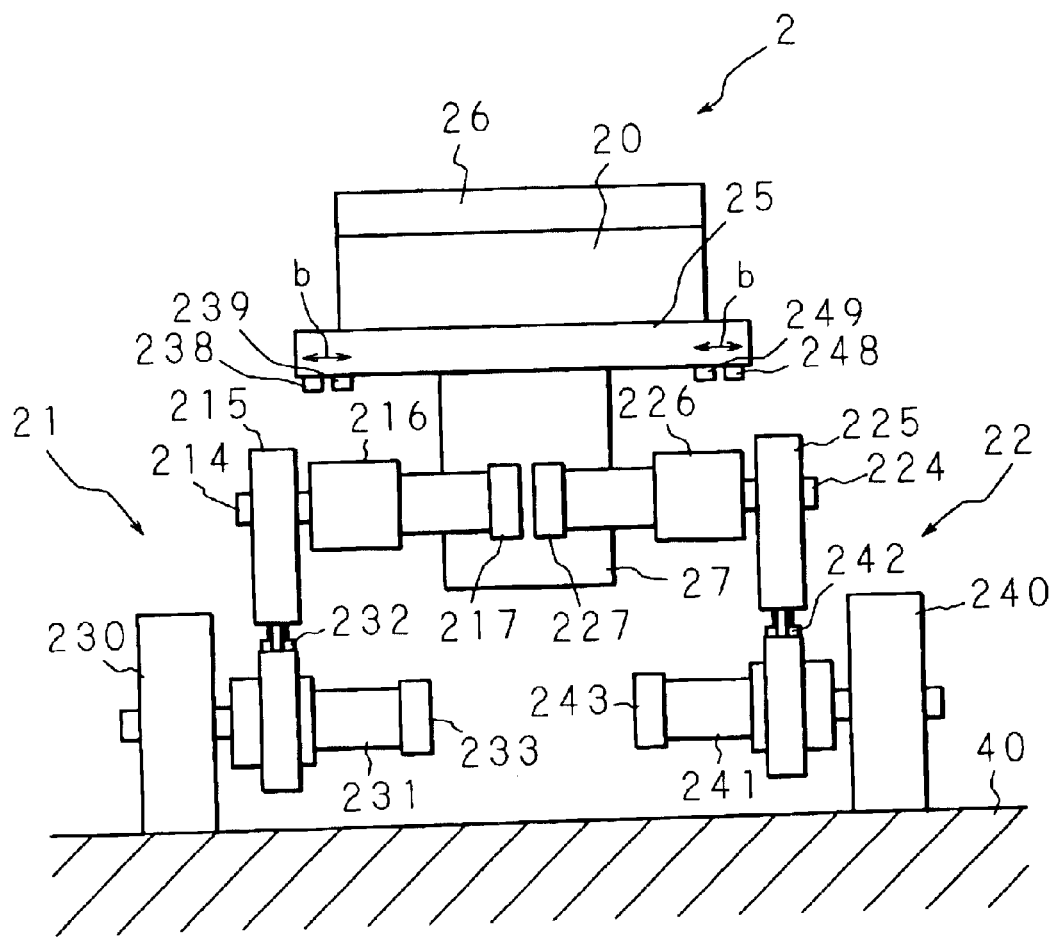
FIG. 19 is a schematic rear view of the bogie according to the Embodiment 2 of the invention.
Figure 20:
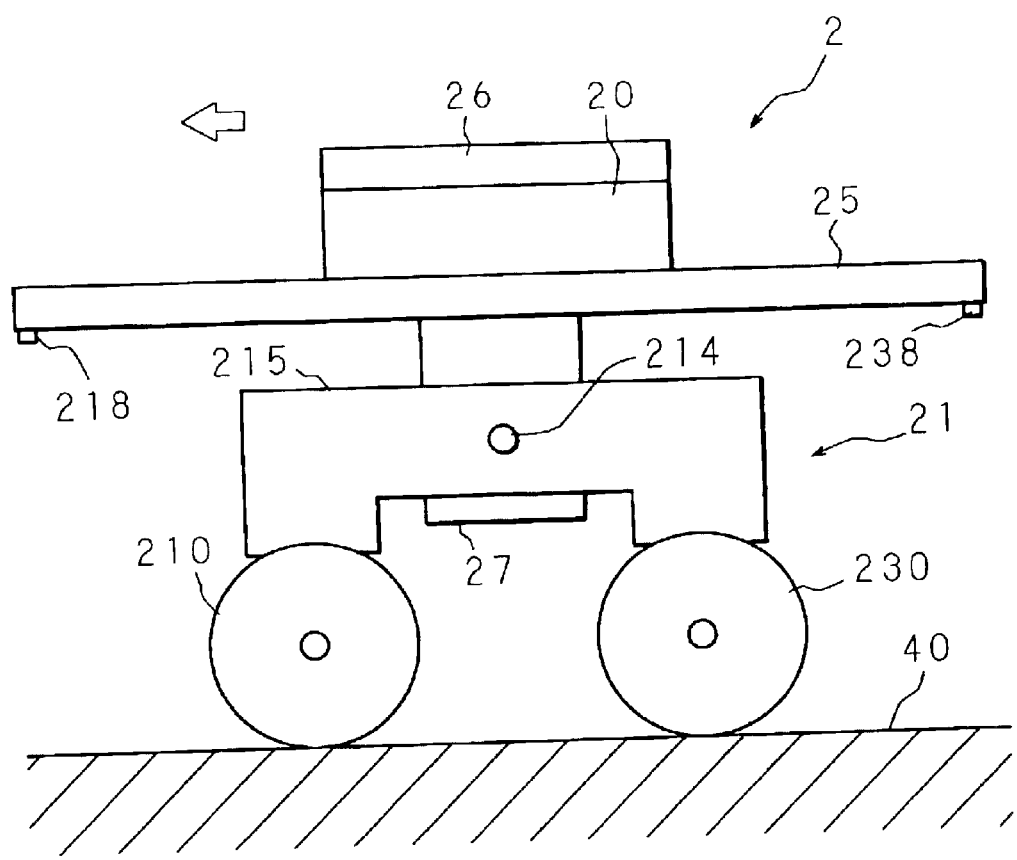
FIG. 20 is a schematic side view of the bogie according to the Embodiment 2 of the invention.
Figure 21:
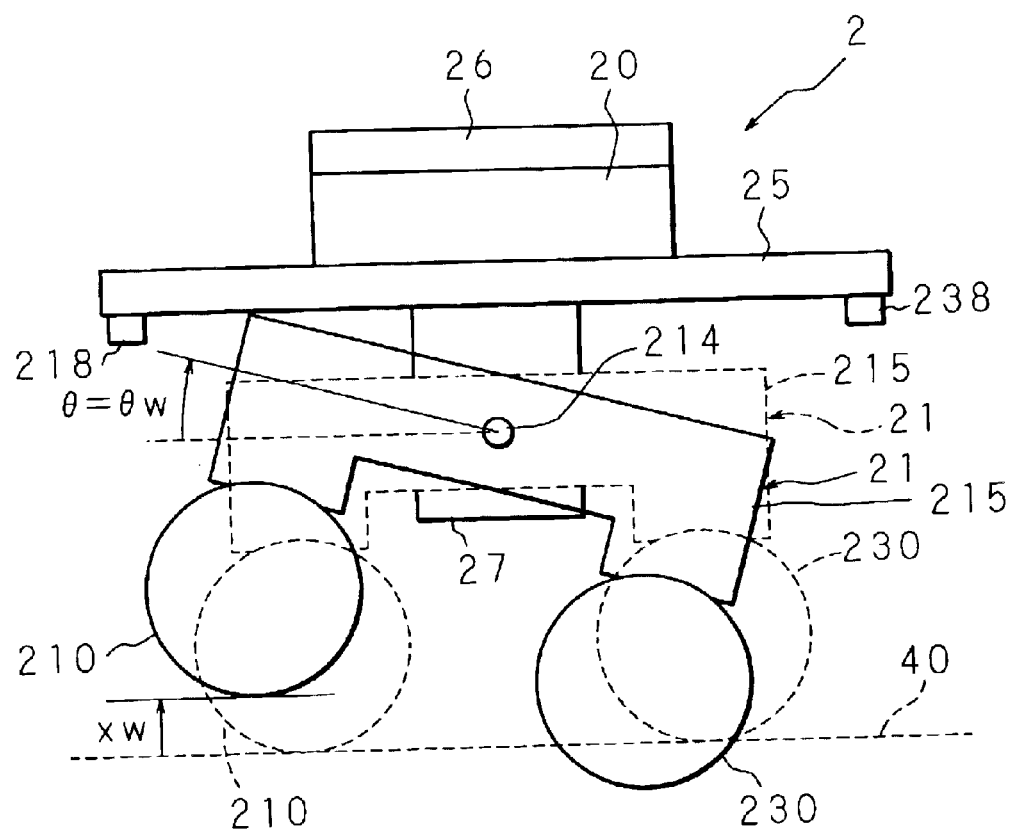
FIG. 21 is an explanatory drawing showing a vertical movement of a wheel provided to the bogie according to the Embodiment 2 of the invention.
Figure 22A:
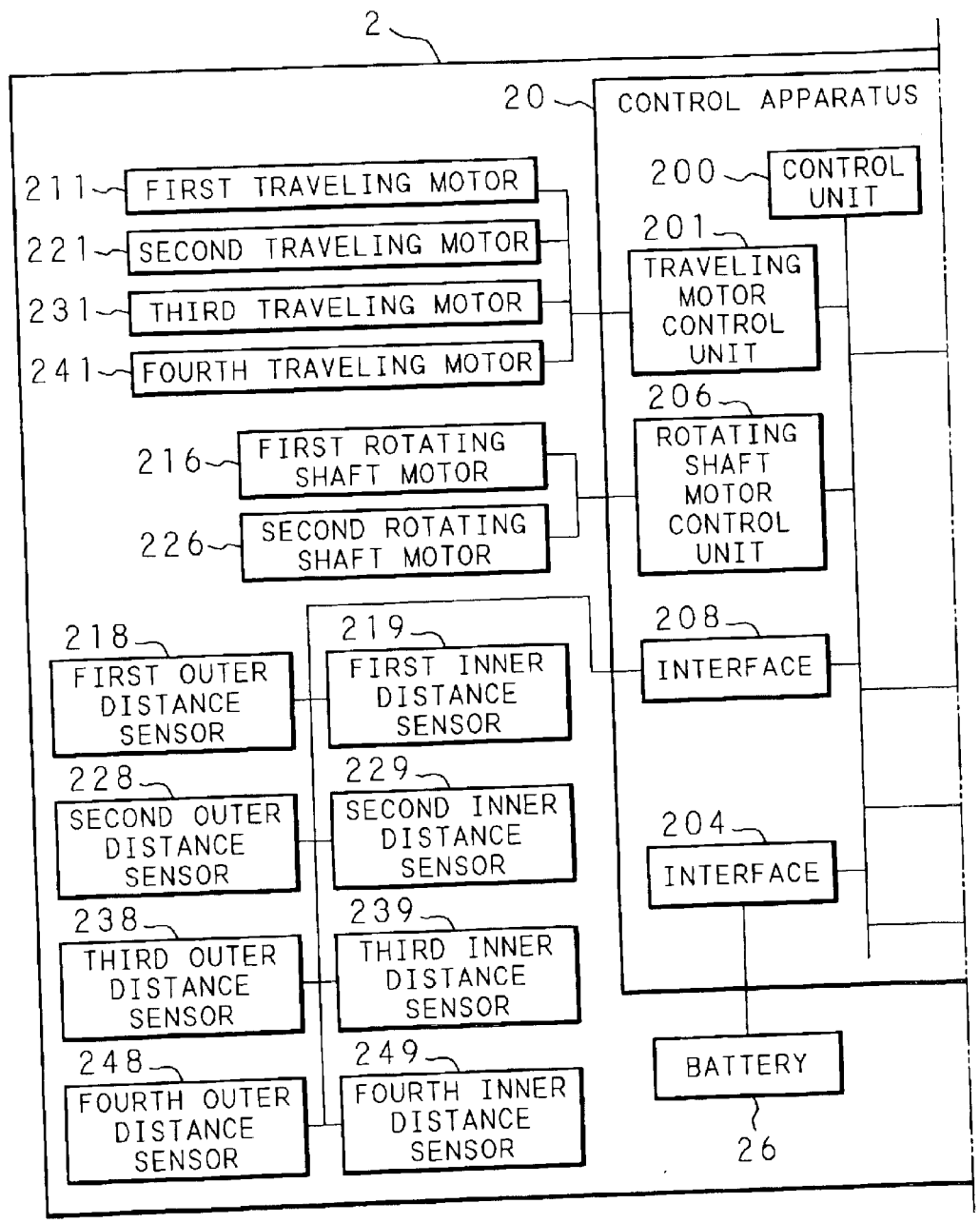
FIGS. 22A and 22B are a block diagram of the bogie according to the Embodiment 2 of the invention.
Figure 22B:
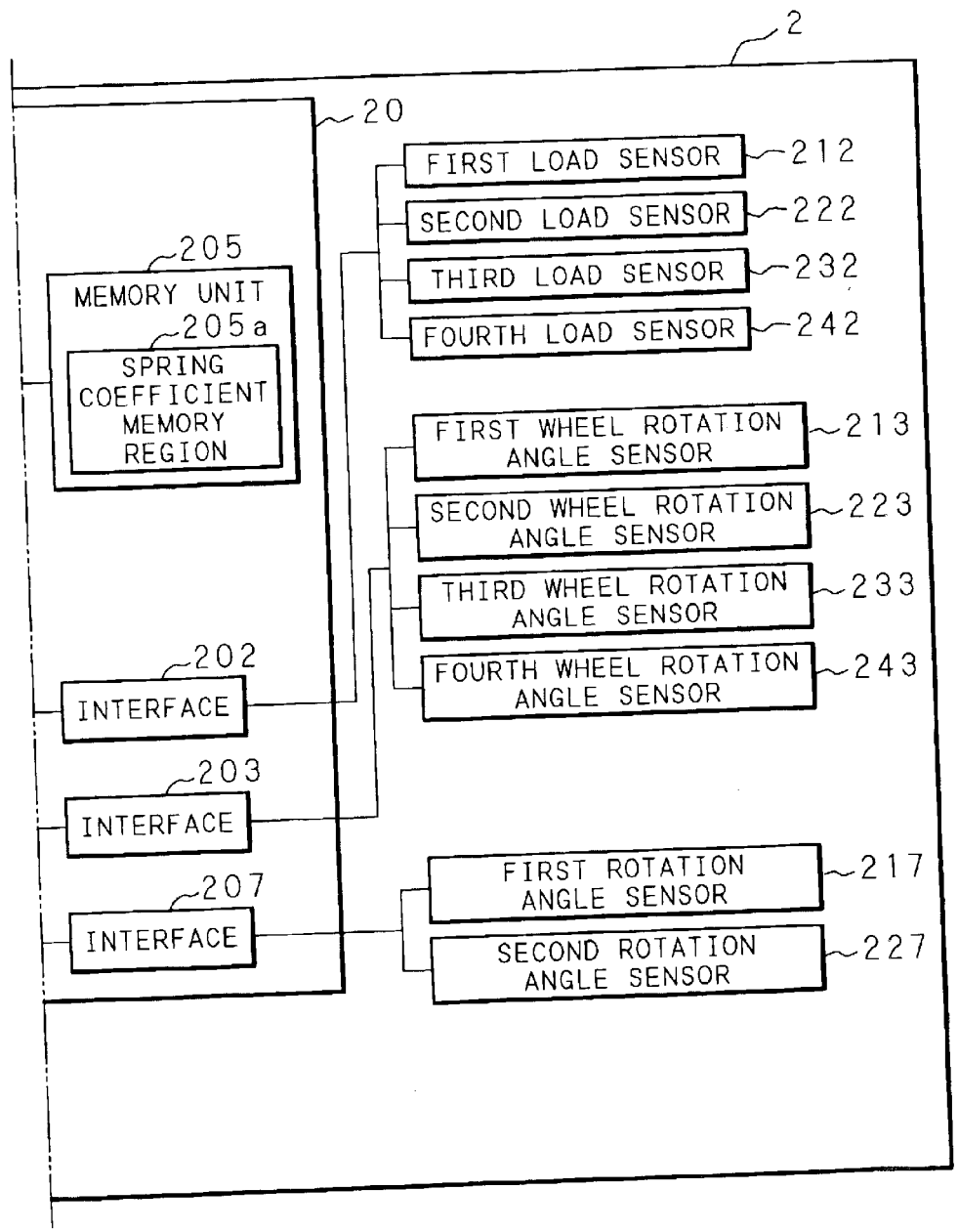

FIG. 18 is a schematic front view of a bogie 2 according to the Embodiment 2 of the invention; FIG. 19 is a schematic rear view of the bogie 2; and FIG. 20 is a schematic side view of the bogie 2. Also, FIG. 21 is an explanatory drawing showing a vertical movement of a wheel provided to the bogie 2. FIGS. 22A & 22B are a block diagram of the bogie 2.

In the drawings, numeral 25 stands for a plate having a rectangular shape in a plan view. The plate 25, a control apparatus 20 installed on a central portion of an upper face of the plate 25, a battery 26 mounted on the control apparatus 20 and a body supporting member 27 fixed to a central portion of a lower face of the plate 25 constitute a main body of the bogie 2.

The bogie 2 is provided with two sets of wheel mechanism (a first wheel mechanism 21 and second wheel mechanism 22) symmetrically mounted on both sides of the body supporting member 27 with a certain interval therebetween. (Refer to FIGS. 18 and 19)

The first wheel mechanism 21 is mounted at a central position of the bogie 2 with respect to its traveling direction. The first wheel mechanism 21 is provided with a motor 216 fixed on the left side of the body supporting member 27 for a first rotating shaft, the first rotating shaft 214 to be driven by the first rotating shaft motor 216 and a first wheel supporting unit 215 insert-fitted with the first rotating shaft 214 so as to rotate along with a rotation of the first rotating shaft 214. The first wheel supporting unit 215 is generally of a symmetrical C-shape. The first wheel supporting unit 215 is provided with a first front wheel 210 mounted at its lower front end portion, and a first rear wheel 230 mounted at its lower rear end portion. In other words, the first front wheel 210 and first rear wheel 230 are disposed so as to correspond to a front corner and rear corner on the left side, among the four corners of the plate 25. The first front wheel 210 and first rear wheel 230 move vertically along with a rotation of the first wheel supporting unit 215 (Refer to FIG. 21).

Also, in the first wheel mechanism 21, the first rotating shaft motor 216 is provided with a first shaft rotation angle sensor 217 for detecting a rotation angle of the first wheel supporting unit 215 by detecting a rotation angle of the first rotating shaft 214. Further, the first wheel mechanism 21 is provided with a first traveling motor 211 with a speed reducer for driving the first front wheel 210, a first wheel rotation angle sensor 213 attached to the first traveling motor 211 for detecting a rotation angle of the first front wheel 210, and a first load sensor 212 for detecting a load imposed on the first front wheel 210. Also, the first wheel mechanism 21 is provided with a third traveling motor 231 with a speed reducer for driving the first rear wheel 230, a third wheel rotation angle sensor 233 attached to the third traveling motor 231 for detecting a rotation angle of the first rear wheel 230, and a third load sensor 232 for detecting a load imposed on the first rear wheel 230.

The second wheel mechanism 22 is provided, as the first wheel mechanism 21, with a second front wheel 220, second traveling motor 221, second load sensor 222, second wheel rotation angle sensor 223, second rotating shaft 224, second wheel supporting unit 225, second rotating shaft motor 226, second shaft rotation angle sensor 227, second front wheel 240, fourth traveling motor 241, fourth load sensor 242 and fourth wheel rotation angle sensor 243.

At the four corners of the lower face of the plate 25, two each of distance sensors made from infrared ray sensors are disposed side by side with an interval b therebetween in a side-to-side direction, so as to respectively correspond to the first front wheel 210, second front wheel 220, first rear wheel 230, second rear wheel 240. The respective distance sensors irradiate infrared ray downward for detecting an uneven portion and height of a step. For the first front wheel 210, a first outer distance sensor 218 disposed at a left side end portion of the plate 25 and a first inner distance sensor 219 disposed at an inner position from the first outer distance sensor 218 are provided. Likewise, for the second front wheel 220 a second outer distance sensor 228 and second inner distance sensor 229 are provided. For the first rear wheel 230, a third outer distance sensor 238 and a third inner distance sensor 239 are provided. For the second rear wheel 240, a fourth outer distance sensor 248 and fourth inner distance sensor 249 are provided.

Each of the corresponding devices in the first wheel mechanism 21 and the second wheel mechanism 22 is constituted of components of generally the same dimensions and shape (Refer to FIGS. 18 to 20).

The control apparatus 20 comprises a control unit 200 in which a CPU is employed (Refer to FIGS. 22A & 22B). The control unit 200 is connected with the respective units in the control apparatus 20 through a bus, and controls the respective mechanical devices and executes various operational processing according to control program and data stored in a memory unit 205, or data to be input from an external source.

A part of the memory unit 205 is a spring coefficient memory region 205a, where spring coefficients k0, k1 and k2 (k1<k0<k2) are stored as data to be utilized for operational processing of the bogie 2. k0 is an ordinary spring coefficient given to the rotating shaft motor in each wheel mechanism in an ordinary situation. k1 is a climbing spring coefficient to be given to the rotating shaft motor in the wheel mechanism corresponding to the wheel in a climbing wheel mechanism. k2 is a non-climbing spring coefficient to be given to the rotating shaft motor of the non-climbing wheel mechanism. Each spring coefficient k is predetermined according to the impedance characteristics of the first wheel mechanism 21 and the second wheel mechanism 22, and to actions to be taken by the bogie 2.

A traveling motor control unit 201 controls the respective output of the first traveling motor 211 to the fourth traveling motor 241, under the control of the control unit 200. Also, a rotating shaft motor control unit 206, which is also under the control of the control unit 200, respectively controls a rotating force of the first rotating shaft 214 and second rotating shaft 224 to be output by the first rotating shaft motor 216 and second rotating shaft motor 226, i.e. a rotating force T to be given to the first wheel supporting unit 215 and second wheel supporting unit 225 respectively. At this moment, the control unit 200 utilizes a calculation formula $T=k(\theta d-\theta)$ to obtain the output T of the rotating shaft motor stored in the memory unit 205 ($\theta d$: target position, $\theta$: position of each wheel supporting unit).

To the control unit 200, data of load imposed on each of the first front wheel 210 to the second rear wheel 240 respectively detected by the first load sensor 212 to the fourth load sensor 242 is input through an interface 202 in a prescribed cycle. Also, data of rotation angle of the first front wheel 210 to the second rear wheel 240 respectively detected by the first wheel rotation angle sensor 213 to the fourth wheel rotation angle sensor 243 is input through an interface 203 in a prescribed cycle. Further, through an interface 207, data of a rotation angle of the first wheel supporting unit 215 and second wheel supporting unit 225 respectively detected by the first shaft rotation angle sensor 217 and second shaft rotation angle sensor 227 is input in a prescribed cycle.

The control unit 200 calculates a travel distance and moving speed of each of the first front wheel 210 to the second rear wheel 240, based on rotation angles of the first front wheel 210 to the second rear wheel 240 detected by the first wheel rotation angle sensor 213 to the fourth wheel rotation angle sensor 243.

Also, a height detected by the first outer distance sensor 218 to the fourth outer distance sensor 248 and by the first inner distance sensor 219 to the fourth inner distance sensor 249 is input to the control unit 200 through an interface 208.

In case where a height detected by the respective distance sensors is higher than a predetermined value, the control unit 200 starts detecting a travel distance of the wheel corresponding to the outer distance sensor (inner distance sensor) that has detected the height, utilizing the corresponding wheel rotation angle sensor of the wheel corresponding to the outer distance sensor (inner distance sensor), from the moment that the height is detected. And the control unit 200 acquires the travel distance a when the inner distance sensor (outer distance sensor) adjacent to the outer distance sensor (inner distance sensor) that detected the height has detected the same height. Also, the control unit 200 converts the height into a position $\theta H$ of the first wheel supporting unit 215 and the second wheel supporting unit 225, utilizing a conversion formula stored in advance in the memory unit 205.

Based on the travel distance a detected as above and the interval of the distance sensors b, the control unit 200 obtains an entrance angle $\alpha$ of the wheel to the step by the formula of $\tan \alpha = a/b$. Then the control unit 200 determines whether the entrance angle $\alpha$ is acceptable to the wheel for climbing up or down the step. A range of the entrance angle is stored in advance in the memory unit 105.

The battery 26 supplies power for driving to each motor and sensor of bogie 2 through a wiring not shown in the drawings. For example, the control apparatus 20 is connected with the battery 26 through the interface 204, so that the driving power to be distributed to each device is supplied from the battery 26.

Now, a load detected by the first load sensor 212 to the fourth load sensor 242 respectively in a state that the first front wheel 210 to the second rear wheel 240 are stably in contact with a flat ground 40 and the plate 25 is horizontally retained shall be referred to as an equilibrium load F0. Also, a load detected by the first load sensor 212 to the fourth load sensor 242 respectively when the first front wheel 210 to the second rear wheel 240 on the ground 40 have respectively made contact with a step to be climbed up 41 (Refer to FIGS. 24A to 24C) shall be referred to as a first load F1. A load detected when the first front wheel 210 to the second rear wheel 240 on the ground 40 have respectively entered a step to be climbed down 42 (Refer to FIG. 24) shall be referred to as a second load F2 (F2<F0<F1). Also, a load detected when the wheel has finished climbing up the step shall be referred to as second load F3 (F3<F1). A load detected when the wheel has finished climbing down the step shall be referred to as F4 (F2<F4). Values respectively corresponding to F0, F1, F2, F3 and F4 measured in advance by the first load sensor 212 to the fourth load sensor 242 are stored in the memory unit 205.

The control unit 200 determines that the first front wheel 210 to the second rear wheel 240 are going to climb up/down in case where the load F respectively detected by the first load sensor 212 to the fourth load sensor 242 is defined as F≧F1 or F≦F2. Also, when the load F respectively detected by the first load sensor 212 to the fourth load sensor 242 is defined as F2<F<F1, the control unit 200 determines that the first front wheel 210 to the second rear wheel 240 are in contact with the ground 40. Also, if a load of F≧F1 is once detected and then a load F of F≦F3 is detected, the control unit 200 determines that the first front wheel 210 to the second rear wheel 240 have climbed from the ground 40 up to an upper surface of the step 41 (now in contact with the upper level ground). Further, in case where a load of F a load of F≦F2 is once detected and then a load F of F≧F4 is detected, the control unit 200 determines that the first front wheel 210 to the second rear wheel 240 have climbed from the ground 40 down to a lower surface of the step 42 (now in contact with the lower level ground).

Positions of the first wheel supporting unit 215 to the second wheel supporting unit 225 in a state that the first front wheel 210 to the second rear wheel 240 are stably in contact with a flat ground 40 and the plate 25 is horizontally retained at a prescribed position shall be referred to as θ40. Positions of the first front wheel 210 and second front wheel 220 of the first wheel supporting unit 215 and the second wheel supporting unit 225 when the first front wheel 210 to the second rear wheel 240 have ascended by θW from the ground 40 shall be referred to as θW (>θ40) (Refer to FIG. 19). Positions of the first front wheel supporting unit 215 and the second wheel supporting unit 225 when the first front wheel 210 and the second front wheel 220 have descended by θW from the ground 40 shall be referred to as −θW (<θ40). Accordingly, positions θ of the first wheel supporting unit 215 and the second wheel supporting unit 225 in a state that the first front wheel 210 to the second rear wheel 240 are in contact with the ground 40 can be defined as θ=θ40. When the first front wheel 210 to the second rear wheel 240 have ascended from the ground 40 (for example when the wheels have climbed up a step), θ is defined as θ>θ40, and when the first front wheel 210 to the second rear wheel 240 have descended from the ground 40 (for example when the wheels have climbed down a step), θ is defined as θ<θ40.

The control unit 200 calculates an output T of the rotating shaft motor, when rotation angles of the first front wheel supporting unit 215 and the second wheel supporting unit 225 respectively detected by the first shaft rotation angle sensor 217 and the second shaft rotation angle sensor 227 are input in a predetermined cycle (for example, the impedance control cycle). Also, the control unit 200 controls so that the first rotating shaft motor 216 and second rotating shaft motor 226 respectively supply the output T to the first wheel supporting unit 215 and the second wheel supporting unit 225, through the rotating shaft motor control unit 206.

The control unit 200 determines that the first front wheel 210 to the second rear wheel 240 are stably in contact with the ground 40 and that the plate 25 is horizontally retained, in case where the first shaft rotation angle sensor 217 and second shaft rotation angle sensor 227 have detected θ=θ40, and the first load sensor 212 to the fourth load sensor 242 have detected F=F0. Therefore, θ40 is the equilibrium point of the first wheel supporting unit 215 and second wheel supporting unit 225 with respect to the ground 40.

Also, when the bogie 2 is traveling forward (in a direction of the white arrow in FIG. 20) the control unit 200 detects a load of F≧F1 at the first front wheel 210 or second front wheel 220. In case where the control unit 200 then detects a load of F≦F3, it determines that the position θ detected by the first shaft rotation angle sensor 217 or second shaft rotation angle sensor 227 is the equilibrium point θ41 of the first wheel supporting unit 215 or second wheel supporting unit 225 with respect to the upper surface of the step 41. Likewise, assuming that the control unit 200 has detected a load of F≦F2, in case where the control unit 200 then detects a load of F≧F4, it determines that the position θ detected by the first shaft rotation angle sensor 217 or second shaft rotation angle sensor 227 is the equilibrium point θ42 of the first wheel supporting unit 215 or second wheel supporting unit 225 with respect to the lower surface of the step 42.

Figure 23A:
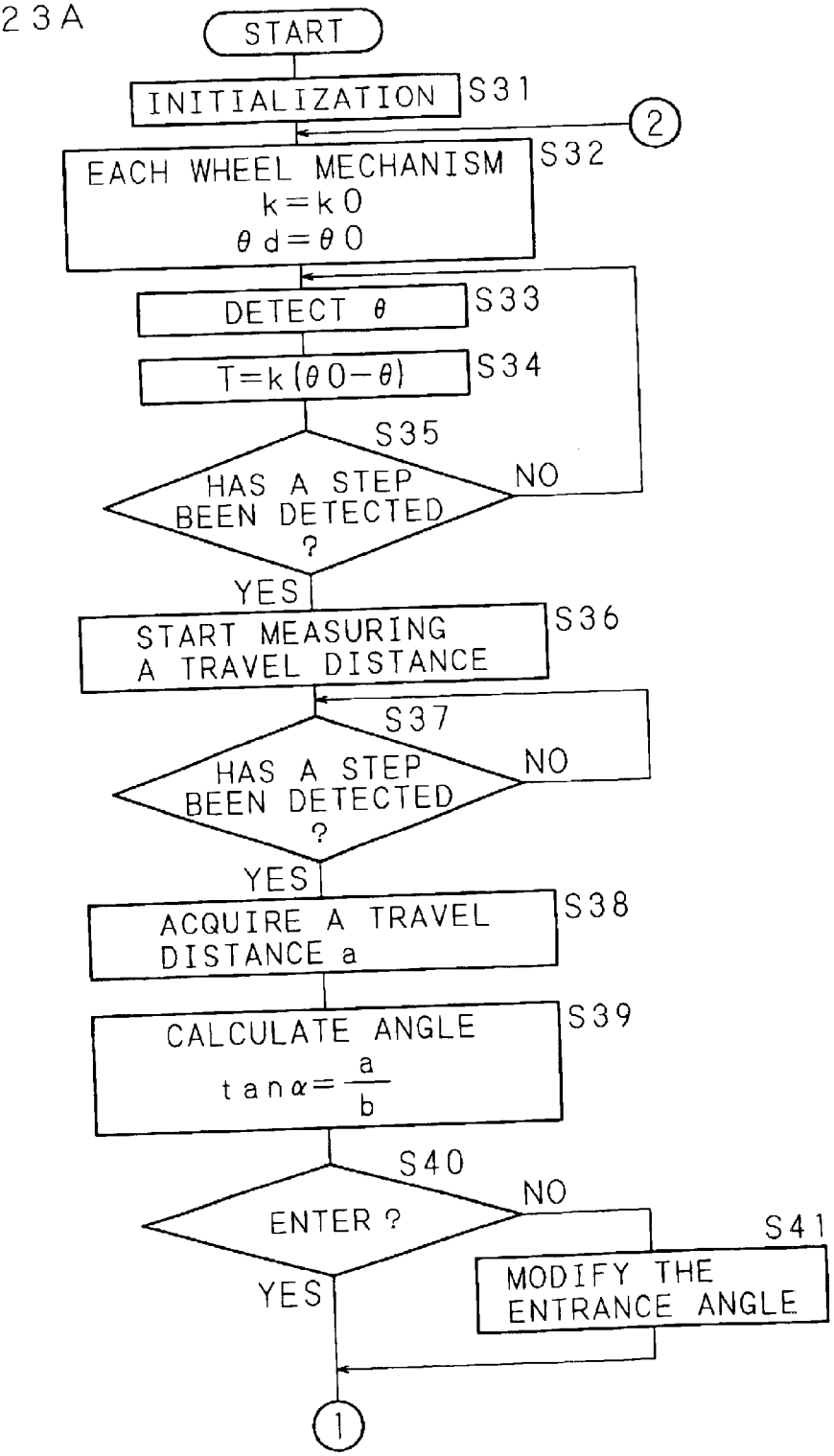
FIGS. 23A and 23B are flow charts showing the steps of climbing up/down processing of the bogie according to the Embodiment 2 of the invention.
Figure 23B:
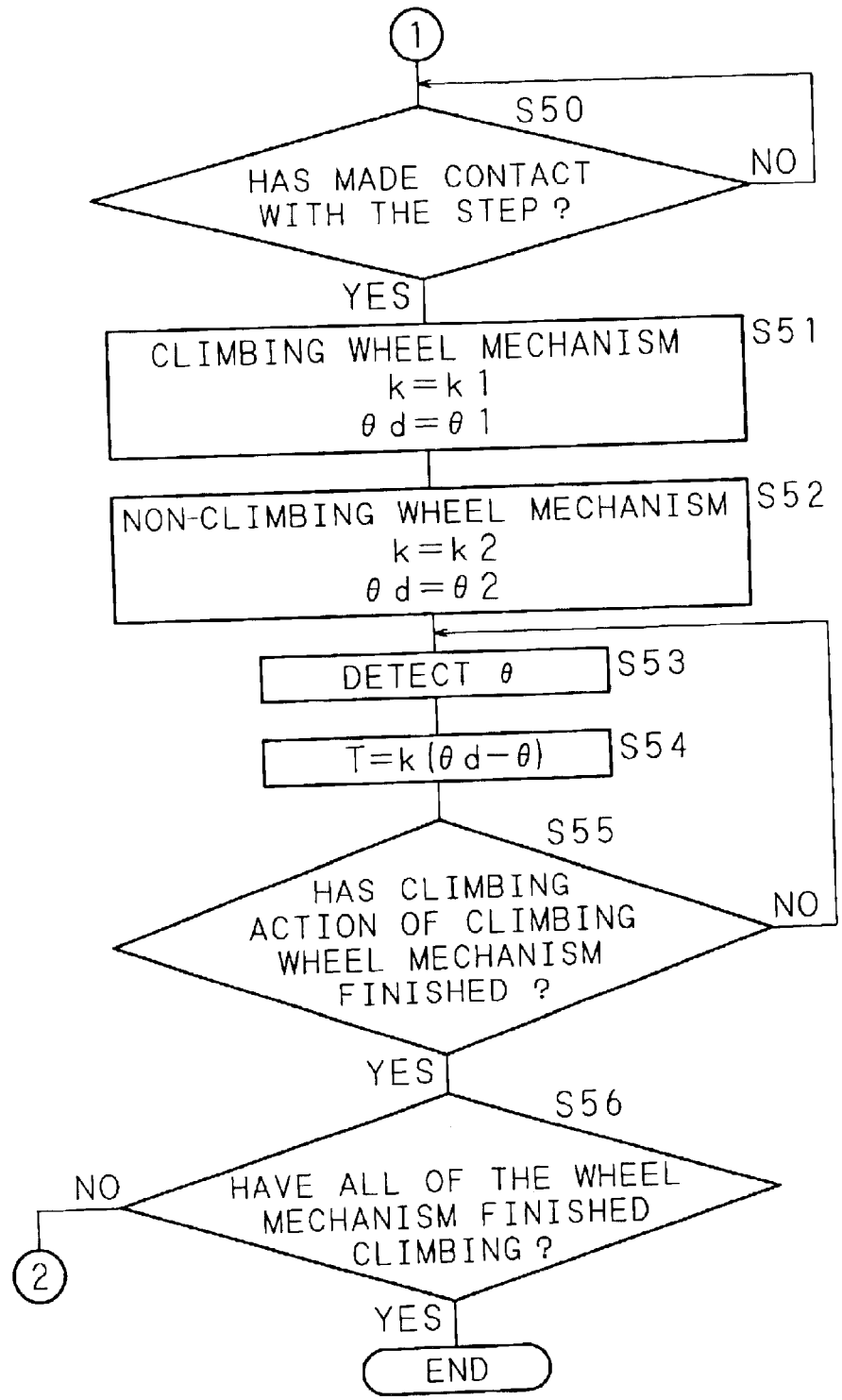

FIGS. 23A and 23B are flow charts showing the climbing up/down process of the bogie 2. The following example refers to a case wherein the two front wheels of the bogie 2 which traveling forward climb up to an upper surface of the step 41 from the ground 40, or the two front wheels climb down to a lower surface of the step 42 from the ground 40.

The control unit 200 executes an initialization of climbing process. In this case, the control unit 200 controls the first rotating shaft motor 216 and second rotating shaft motor 226 utilizing the first load sensor 212 to the fourth load sensor 242 and the first wheel rotation angle sensor 213 to the fourth wheel rotation angle sensor 243, in such a manner that the position θ of the first wheel supporting unit 215 and second wheel supporting unit 225 becomes θ=θ40 when the load F is the equilibrium load F0. In other words, the plate 25 is horizontally retained (S31).

The control unit 200 sets a spring coefficient k and target position θd respectively for the first rotating shaft motor 216 and second rotating shaft motor 226 of the first wheel mechanism 21 and second wheel mechanism 22. In this case the spring coefficient k is set at the ordinary spring coefficient k0, and the target position θd is set at the ordinary target position θ0 (S32). As the ordinary target position θ0, in case where the control unit 200 determines that both the front wheel and rear wheel of the first wheel mechanism 21 and second wheel mechanism 22 are respectively in contact with the ground 40 (have not finished climbing), θ0=θ40 is adopted. If the control unit 200 determines that the wheels are in contact with the upper surface of the step 41 (have finished climbing up the step 41), θ0=θ41 is adopted. If the control unit 200 determines that the wheels are in contact with the lower surface of the step 42 (have finished climbing down the step 42), θ0=θ42 is adopted.

The control unit 200 detects the respective positions θ of the first wheel supporting unit 215 and second wheel supporting unit 225 utilizing the rotation angles detected by the first shaft rotation angle sensor 217 and second shaft rotation angle sensor 227 (S33).

The control unit 200 calculates a value of the rotating force T=k(θd−θ) to be given to the first wheel supporting unit 215 and second wheel supporting unit 225 by the first rotating shaft motor 216 and second rotating shaft motor 226 respectively. The control unit 200 causes the first rotating shaft motor 216 and second rotating shaft motor 226 to output the rotating force T, through the rotating shaft motor control unit 206 (S34). The processing of S33 and S34 is repeatedly executed at every impedance control cycle.

The control unit 200 determines whether a step has been detected, depending on whether a height detected by the first outer distance sensor 218 and second outer distance sensor 228 as well as first inner distance sensor 219 and second inner distance sensor 229 is higher than a predetermined value or not(S35). In case where the detected height is less than a predetermined height (NO at S35), the control unit 200 determines that a step has not been detected, and returns the process to S33. In case where the detected height is not less than a predetermined height (YES at S35), the control unit 200 determines that a step has been detected, and starts measuring a travel distance (S36). Also, the control unit 200 utilizes a conversion formula stored in advance in the memory unit 205, to convert the height into a position θH of the first wheel supporting unit 215 and second wheel supporting unit 225.

Then, the control unit 200 determines whether the inner distance sensor (outer distance sensor) adjacent to the outer distance sensor (inner distance sensor) that detected the height H has detected the same height H (S37). In the negative case (NO at S37) the bogie 2 continues to travel until the height is detected. In the affirmative case (YES at S37), the control unit 200 acquires a travel distance a at this moment (S38).

The control unit 200 calculates an entrance angle α (S39), to determine whether it is possible for the wheel corresponding to the distance sensor that has detected the step to enter the step without difficulty at the calculated entrance angle (S40). In the negative case (NO at S40), the control unit 200 controls an output of the traveling motor corresponding to the wheel in question so that a steering direction of the wheel is shifted and the entrance angle is modified (S41).

The control unit 200 determines whether the wheel corresponding to the distance sensor that detected the step has made contact with the step (made contact or entered), based on a load F output by the first load sensor 212 or second load sensor 222 (S50). In case of F2<F<F1, the control unit 200 determines that the wheel has not made contact with the step (NO at S50), and continues to travel.

In case where the load F is defined as F≧F1 or F≦F2, the control unit 200 determines that the wheel has made contact with the step 41 (YES at S50).

At this stage, the control unit 200 stores the wheel mechanism corresponding to the above wheel in the memory unit 205 as a climbing wheel mechanism. The control unit 200 also stores the other wheel mechanism as non-climbing wheel mechanism in the memory unit 205. Then, the control unit 200 sets a spring coefficient k and target position θd for the climbing wheel mechanism. In this case a climbing spring coefficient k1 is adopted as the spring coefficient k, and the first target position θ1 as target position θd (S51). As the first target position θ1, the position θH converted from the height H of the step detected at S35 into a position of the wheel supporting unit of the climbing wheel mechanism.

The control unit 200 then sets a spring coefficient k and target position θd for the respective non-climbing wheel mechanism. In this case a non-climbing spring coefficient k2 is adopted as the spring coefficient k, and the second target position θ2 as target position θd (S52). As the second target position θ2, θ2=θ40 is adopted in case where the control unit 200 has determined that the front wheel of the non-climbing wheel mechanism is in contact with the ground 40 (the front wheel has not finished climbing). If the control unit 200 determines that the wheel is in contact with the upper surface of the step 41 (the wheel has finished climbing up the step 41), θ2=θ41 is adopted. If the control unit 200 determines that the wheel is in contact with the lower surface of the step 42 (the wheel has finished climbing down the step 42), θ2=θ42 is adopted.

The control unit 200 detects a position θ of the first wheel supporting unit 215 and second wheel supporting unit 225 respectively, utilizing a rotation angle detected by the first shaft rotation angle sensor 217 and second shaft rotation angle sensor 227 (S53).

The control unit 200 calculates a value of the rotating force T=k(θd−θ) to be given to the first wheel supporting unit 215 and second wheel supporting unit 225 by the first rotating shaft motor 216 and second rotating shaft motor 226 respectively. The control unit 200 causes the first rotating shaft motor 216 and second rotating shaft motor 226 to output the rotating force T, through the rotating shaft motor control unit 206 (S54). The processing of S53 and S54 is repeatedly executed at every impedance control cycle.

The control unit 200 determines whether the climbing action has finished or not utilizing the load F output by the load sensor of the climbing wheel mechanism (S55). If the load is defined as F<F4 or F>F3, the control unit 200 determines that the climbing has not finished (NO at S55), and returns the process to S53. In case where the load F is defined as F≦F3 or F≧F4, the control unit 200 determines that the climbing has finished (YES at S55), and stores the information that the front wheel of the climbing wheel mechanism has finished climbing, in the memory unit 205.

The control unit 200 refers to the memory unit 205 and determines whether both front wheels of the first wheel mechanism 21 and second wheel mechanism 22 have finished climbing or not (S56). If the climbing has not finished (NO at S56), the process is returned to S32. If the climbing has finished (YES at S56), the control unit 200 finishes the climbing processing.

Also, climbing operation of the rear wheels may be executed following the climbing processing of the front wheels. In this case, since the position θH used as the first target position θ1 has already been acquired in the climbing processing of the front wheel, the same climbing processing as the front wheel can be executed omitting the step of detecting the step height by the distance sensor.

FIGS. 24A to 24C and 25A to 25C are explanatory drawings showing the climbing operation of the bogie 2. The drawings show an example of climbing operation of the first front wheel 210 in case where the entrance angle α is acceptable to the wheel for entering the step.

Figure 24A:
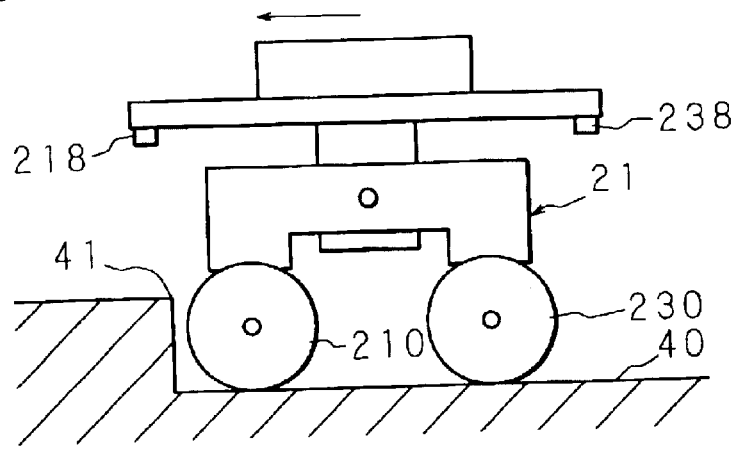
FIGS. 24A to 24C are explanatory drawings showing a climbing motion of the bogie according to the Embodiment 2 of the invention.
Figure 24B:
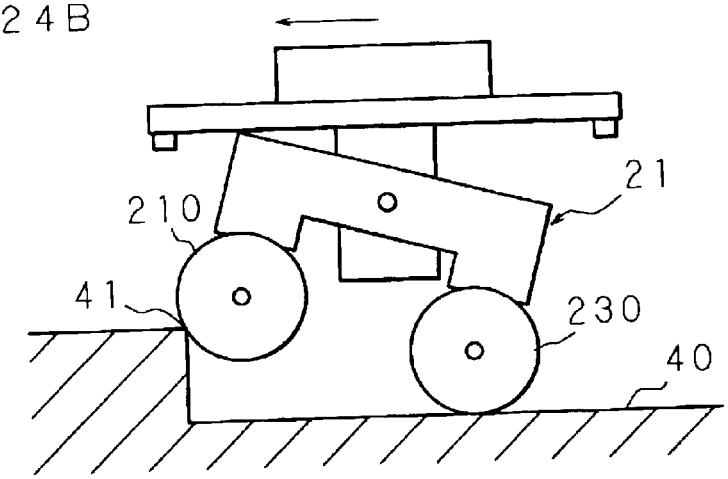
Figure 24C:
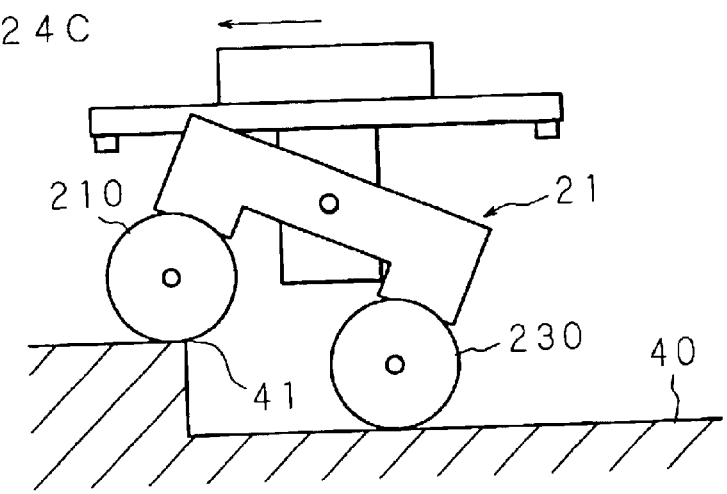

FIGS. 24A to 24C are for explaining the operation of climbing up the step 41.

Referring to FIG. 24A, the bogie 2 is traveling on the ground 40 with the plate 25 horizontally retained (S31 of FIG. 23A). Also, the spring coefficient k=ordinary spring coefficient k0 and target position θd=ordinary target position θ0=θ40 are set for the first wheel mechanism 21 and second wheel mechanism 22 (S32 of FIG. 23A). Further, the first outer distance sensor 218 (and the first inner distance sensor 219) detects the step 41, and also detects a height H of the step 41 (YES at S35).

When the first front wheel 210 enters the step 41, the first load sensor 212 detects a load F≧F1. The control unit 200 determines that the first front wheel 210 has made contact with the step. In other words, the control unit 200 determines that it has detected a step (YES at S50 of FIG. 23B).

The control unit 200 stores the first wheel mechanism 21 as a climbing wheel mechanism in the memory unit 205. The control unit 200 stores the second wheel mechanism 22 as non-climbing wheel mechanism in the memory unit 205. The control unit 200 then sets the spring coefficient k=climbing spring coefficient k1 and target position θd=the first target position θ1=θH for the climbing wheel mechanism (S51 of FIG. 23B). Also, the control unit 200 sets the spring coefficient k=non-climbing spring coefficient k2 and target position θd=the second target position θ2=θ40 for the non-climbing wheel mechanism (S52 of FIG. 23B).

Referring to FIG. 24B, the bogie 2 enters the step 41 while the first rotating shaft motor 216 and second rotating shaft motor 226 are providing the rotating force T=k(θd−θ) to the first wheel supporting unit 215 and second wheel supporting unit 225 (S54 of FIGS. 22A & 22B) respectively. At this moment the first front wheel 210 makes contact with a wall face of the step 41, and then moves upward climbing up the step 41.

Referring to FIG. 24C, when the first front wheel 210 has finished climbing up the step 41, the first load sensor 212 detects the load F≦F3. The control unit 200 determines that the first front wheel 210 has finished climbing up (YES at S55 of FIGS. 22A & 22B).

The bogie 2 controls the output of the first rotating shaft motor 216 and second rotating shaft motor 226 as described above. And the bogie 2 causes the first front wheel 210 to make contact with a wall face of the step 41, and facilitate the wheel to move upward so that it can climb up the step 41. Therefore, even when the wheel in a climbing motion is irregularly moved in a vertical direction, the first rear wheel 230 and the front and rear wheels of the second wheel mechanism 22 can be immediately made to contact with the ground, so that the bogie remains in a stable posture.

Figure 25A:
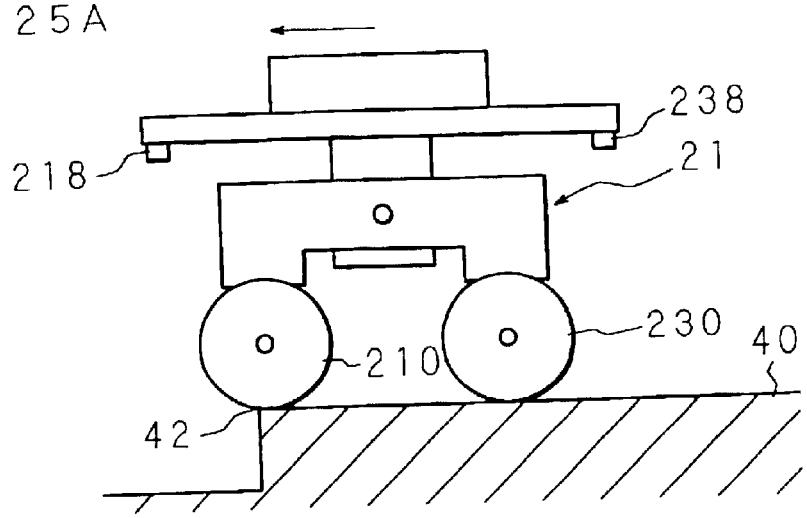
FIGS. 25A to 25C are explanatory drawings showing a climbing motion of the bogie according to the Embodiment 2 of the invention.
Figure 25B:
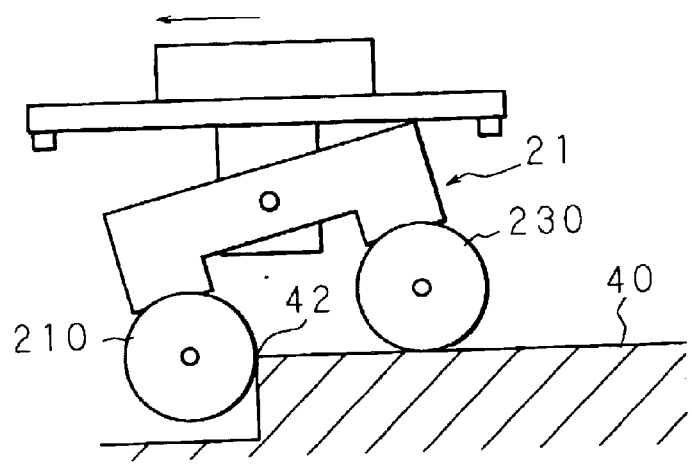
Figure 25C:
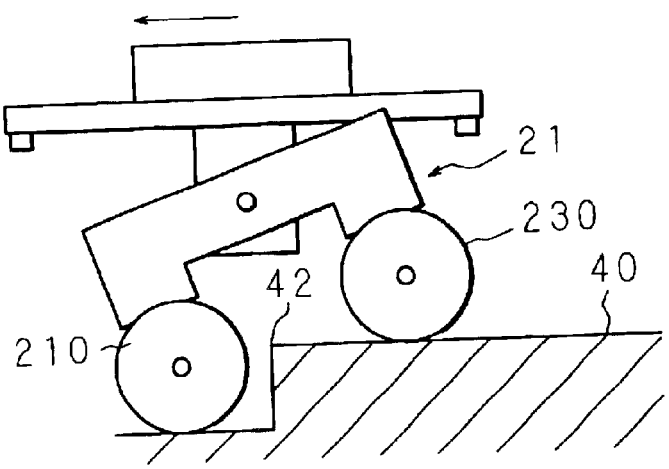

FIGS. 25A to 25C are for explaining the operation of climbing down the step 42.

Referring to FIG. 25A, the bogie 2 is traveling on the ground 40 with the plate 25 horizontally retained (S31 of FIG. 23A). Also, the spring coefficient k=ordinary spring coefficient k0 and target position θd=ordinary target position θ0=θ40 are set for the first wheel mechanism 21 and second wheel mechanism 22 (S32 of FIG. 23A). Further, the first outer distance sensor 218 (and the first inner distance sensor 219) detects the step 42, and also detects a height H of the step 42 (YES at S35).

When the first front wheel 210 makes contact with the step 42, the first load sensor 212 detects a load F≦F2. The control unit 200 determines that the first front wheel 210 has entered the step. In other words, the control unit 200 determines that it has detected a step (YES at S50 of FIG. 23B).

The control unit 200 stores the first wheel mechanism 21 as a climbing wheel mechanism in the memory unit 205. The control unit 200 also stores the second wheel mechanism 22 as a non-climbing wheel mechanism in the memory unit 205. The control unit 200 then sets the spring coefficient k=climbing spring coefficient k1 and target position θd=the first target position θ1=θH for the climbing wheel mechanism (S51 of FIG. 23B). Also, the control unit 200 sets the spring coefficient k=non-climbing spring coefficient k2 and target position θd=the second target position θ2=θ40 for the non-climbing wheel mechanism (S52 of FIG. 23B).

Referring to FIG. 25B, the bogie 2 enters the step 42 while the first rotating shaft motor 216 and second rotating shaft motor 226 are providing the rotating force T=k(θd−θ) to the first wheel supporting unit 215 and second wheel supporting unit 225 (S54 of FIG. 23B) respectively. At this moment the first front wheel 210 makes contact with a wall face of the step 42, and then moves downward climbing down the step 42.

Referring to FIG. 25C, when the first front wheel 210 has finished climbing down the step 42, the first load sensor 212 detects the load F≧F4. The control unit 200 determines that the first front wheel 210 has finished climbing down (YES at S55 of FIG. 23B).

The bogie 2 controls the output of the first rotating shaft motor 216 and second rotating shaft motor 226 as described above. And the bogie 2 causes the first front wheel 210 to make contact with a wall face of the step 42, and facilitate the wheel to move downward so that it can climb down the step 42. Therefore, even when the wheel in a climbing motion is irregularly moved in a vertical direction, the first rear wheel 230 and the front and rear wheels of the second wheel mechanism 22 can be immediately made to contact with the ground, so that the bogie remains in a stable posture.

Embodiment 3

Figure 26:
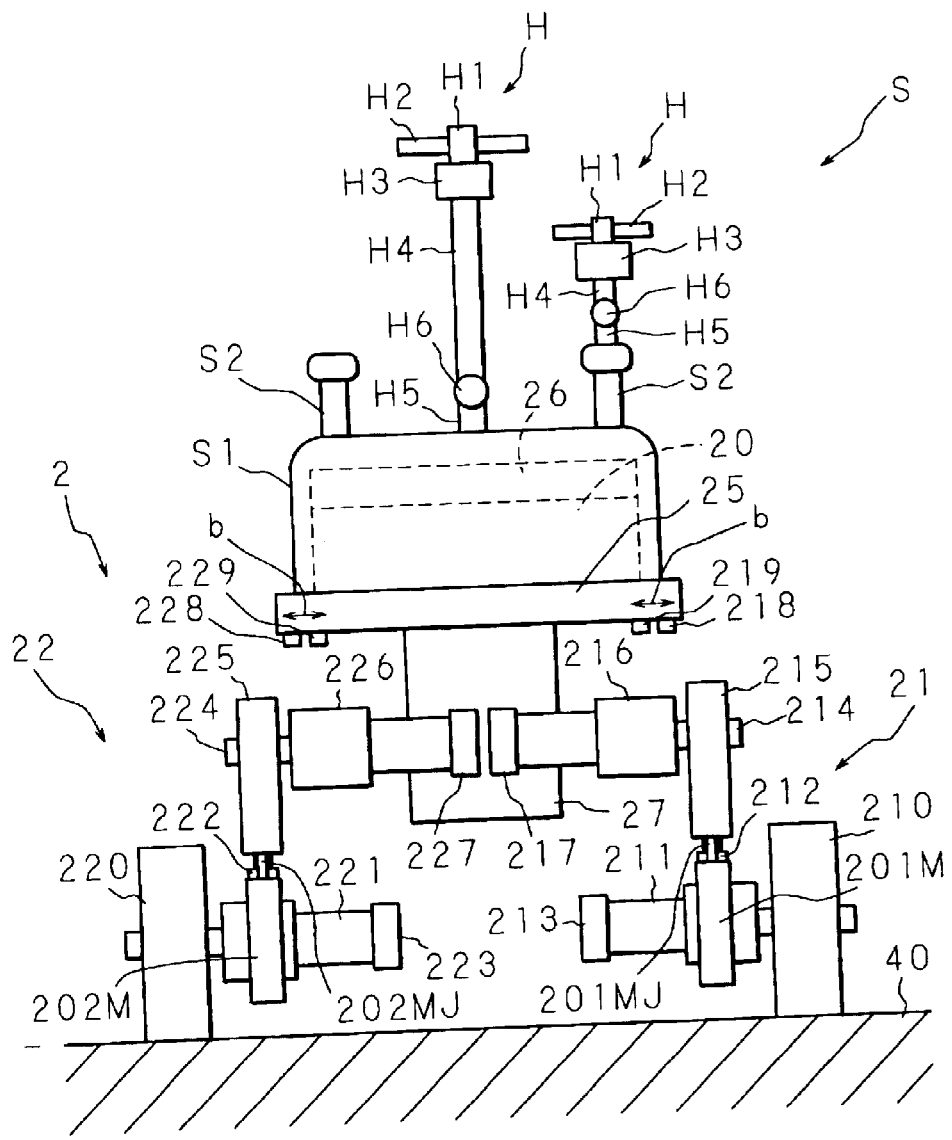
FIG. 26 is a schematic front view of a wheelchair.
Figure 27:
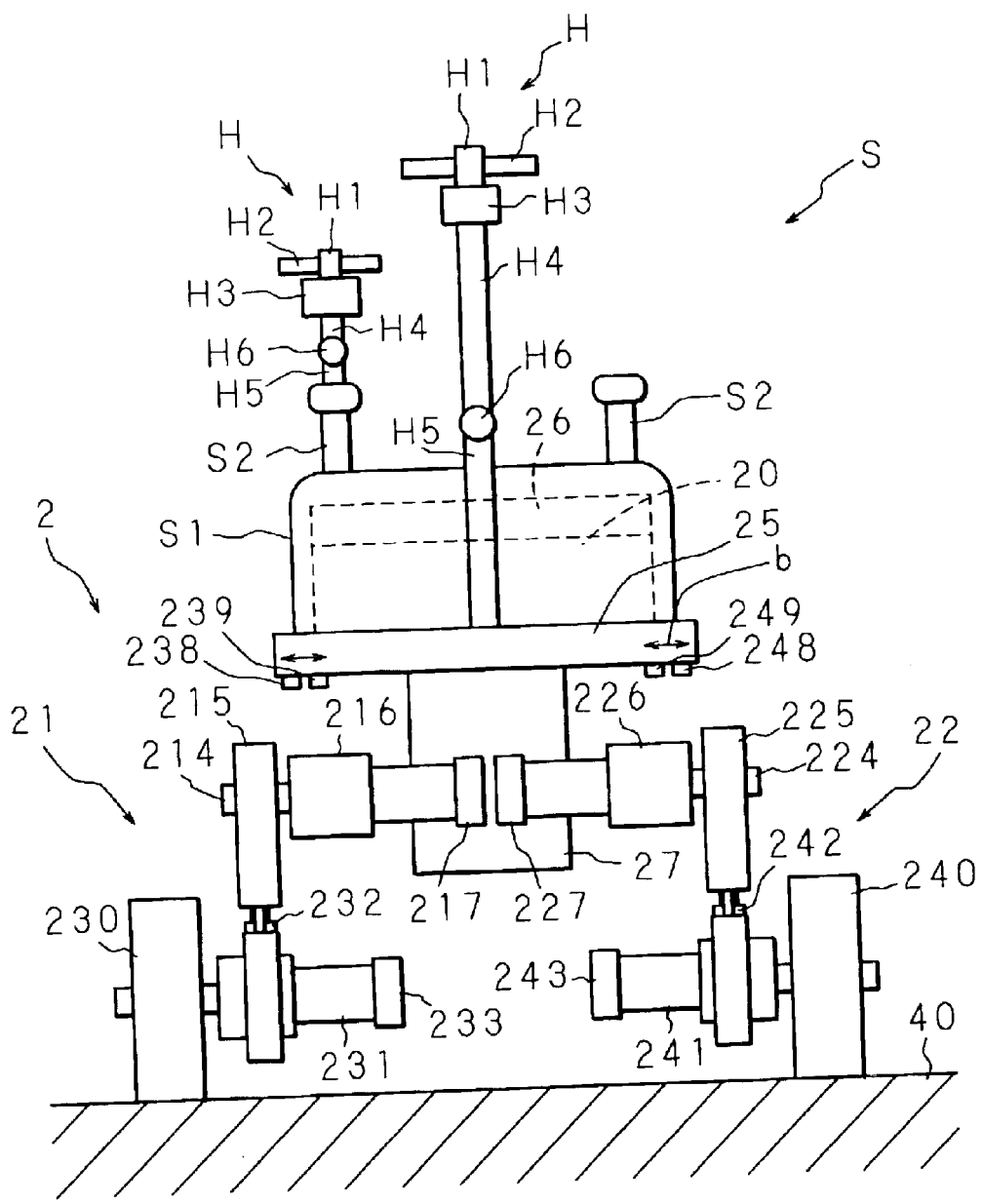
FIG. 27 is a schematic rear view of the wheelchair.
Figure 28:
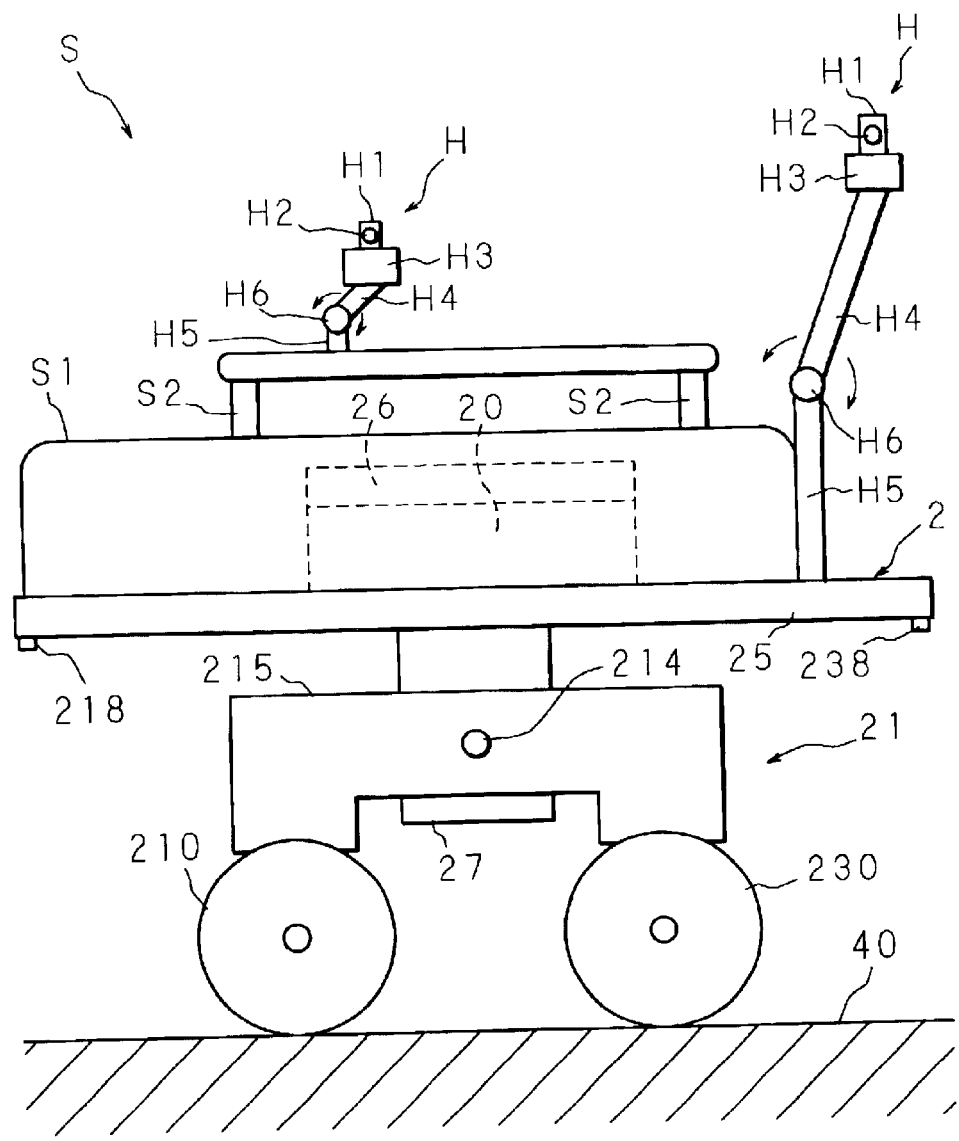
FIG. 28 is a schematic side view of the wheelchair.
Figure 29A:
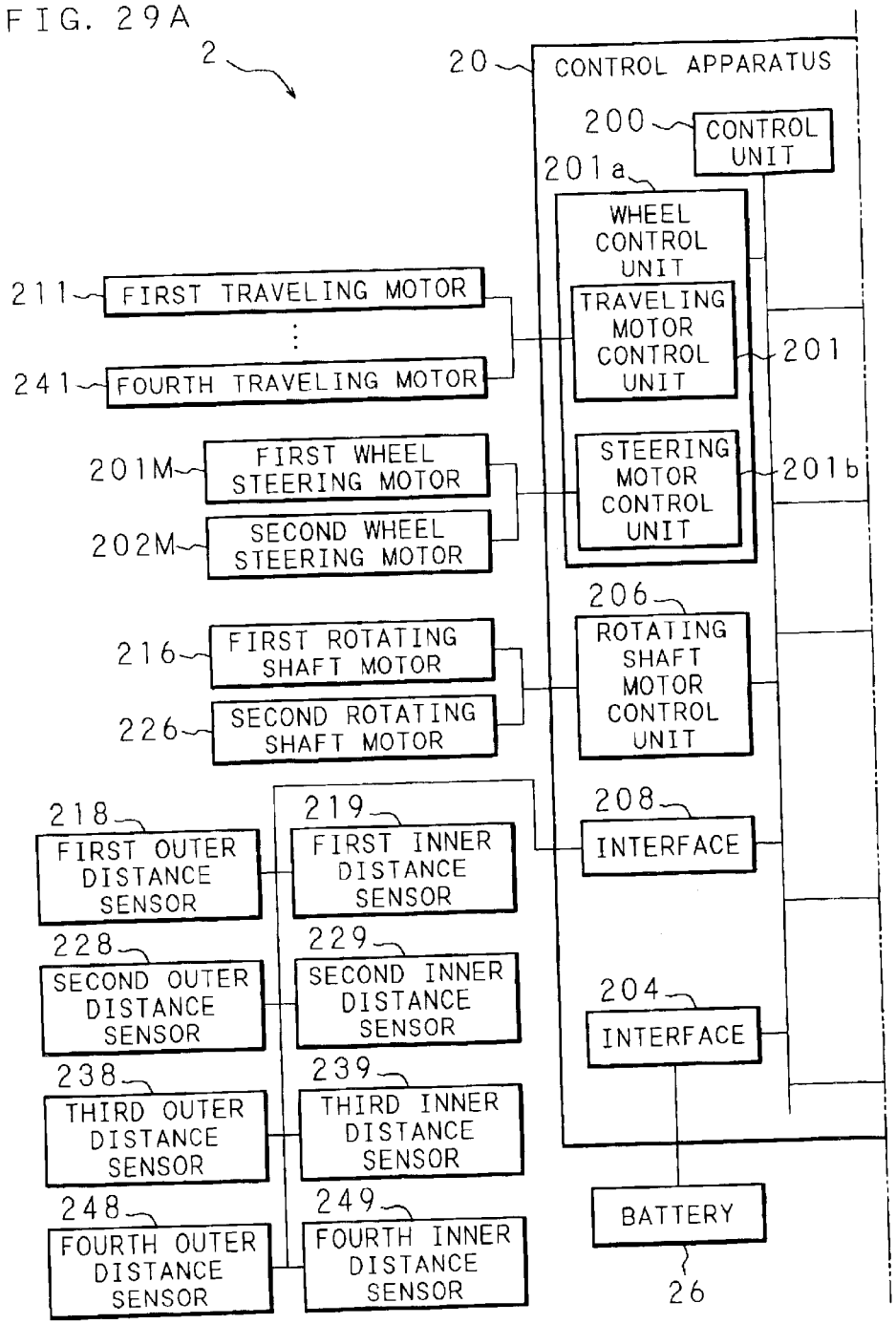
FIGS. 29A and 29B are a block diagram of a bogie 2 according to the Embodiment 3 of the invention.
Figure 29B:
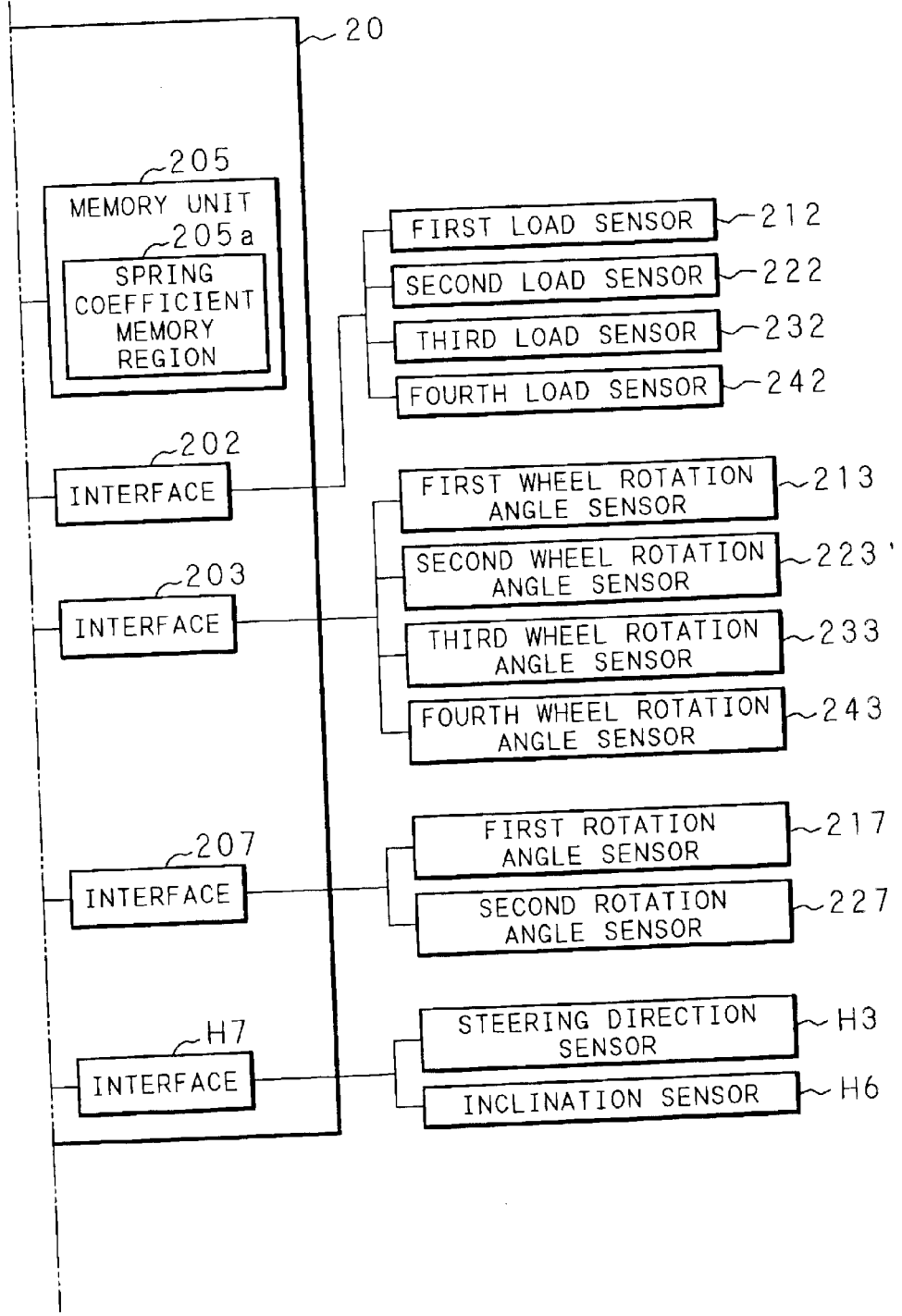

The embodiment 3 relates to a wheelchair in which the bogie described in the foregoing embodiments 1 and 2 is incorporated. Hereunder, an example of a wheelchair wherein the bogie of the embodiment 2 is incorporated shall be described. FIG. 26 is a front view of the wheelchair, FIG. 27 is a rear view and FIG. 28 is a side view thereof. Also, FIGS. 29A and 29B are a block diagram of the bogie 2 according to the embodiment 3, and FIG. 30 is a perspective view of means for inputting.

As shown in these drawings, a seat S1 on which a rider of the wheelchair S is to be seated is mounted on the plate 25 of the bogie 2 in such a manner that the control apparatus 20 and battery 26 are enclosed therein. Also, armrests S2 for supporting the rider are provided at the right and left on the plate 25. On the armrest S2 an operating lever H that serves as inputting means is provided. Through operation by the rider, information of desired traveling speed and direction is output to the control apparatus 20, so that the wheelchair is driven. Also, an operating lever H is provided on the rear wheel side (the first rear wheel 230 and second rear wheel 240) of the plate 25, so that a carer can also operate the wheelchair S.

Figure 30:
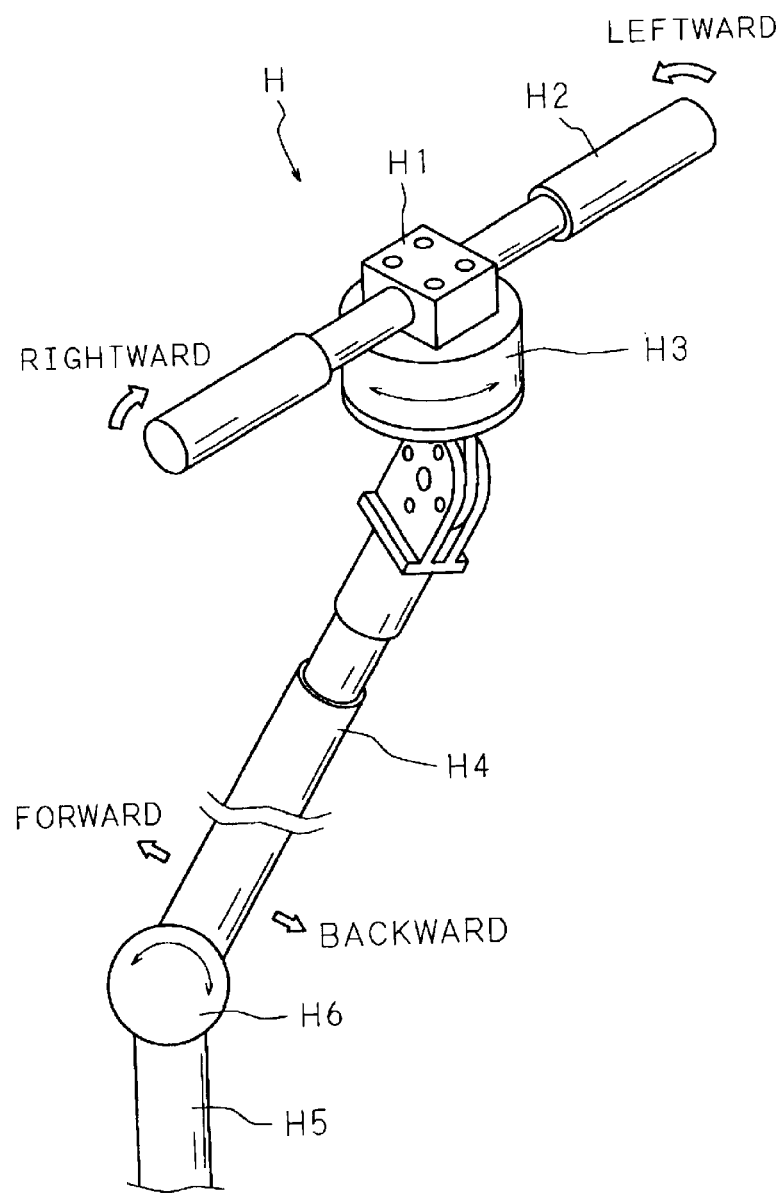
FIG. 30 is a perspective view of an input unit.

As shown in FIG. 30, the operating lever H comprises a handlebar H2, handlebar fixing unit H1, steering direction sensor H3, arm H4, inclination sensor H6 and supporting column H5. On the plate 25 or armrest S2, an end portion of the supporting column H5 is fixed, from where the supporting column is extending upward. The other end portion of the supporting column H5 is connected with the arm H4 through the inclination sensor H6, in such a manner that the arm H4 can rotate forward or backward of the wheelchair S. When the rider or carer inclines the handlebar H2 forward or backward, the arm H4 is inclined forward or backward around the inclination sensor H6 which is an end portion of the arm H4. The inclination sensor H6 constituted of for example a potentiometer etc. detects the rotation angle and outputs the rotation angle as information of traveling speed and direction (forward or backward) to the control apparatus 20.

The handlebar H2 of a straight pillar shape is fixed by the handlebar fixing unit H1 at its central portion in a lengthwise direction. The handlebar H2 can rotate rightward or leftward around the handlebar fixing unit H2. When the handlebar H2 is rotated, the steering angle sensor H3 connected to the handlebar fixing unit H1 detects an azimuthal speed. Information of the detected azimuthal speed is output to the control apparatus 20.

Accordingly, by moving the handlebarH2 forward or backward to incline the arm H4 forward or backward, information of forward or backward traveling direction and traveling speed is transmitted to the control apparatus 20 through the inclination sensor H6. Also, by rotating the handlebar H2 rightward or leftward around the handlebar fixing unit H1, information of rightward or leftward traveling direction is output to the control apparatus 20. Further, in this embodiment two dual-axis sensors are employed for detecting a rotation angle in a back and forth direction and right and left direction, while without limitation to such constitution other sensors such as a six-axis sensor may be employed. Also, the operating lever H serving as inputting means, which is provided on the armrest S2 for the rider as well as on the plate 25 for the carer, may be disposed only on one location.

Other embodiments are given hereunder. Instead of the inclination sensor H6 and steering angle sensor H3 in FIG. 31, a six-axis sensor H3 may be disposed at the position of H3, for detecting a torque in a back and forth direction, right and left direction and around a vertical axis. In this case, back and forth direction and right and left direction as well as magnitude of the torque detected by the six-axis sensor H3 is output to the control apparatus as information of traveling direction and speed. Also, the operating lever H on the armrest S2 for the rider may be constituted of a joystick capable of detecting an angle in a back and forth direction and right and left direction by a potentiometer.

As shown in FIG. 29, the inclination sensor H6 and steering angle sensor H3 are connected with the control unit 200 through an interface H7. Further, the control unit 200 is connected with a wheel control unit 201a as wheel controlling means for controlling the first front wheel 210, second front wheel 220, first rear wheel 230 and second rear wheel 240 through a bus. The wheel control unit 201a includes a traveling motor control unit 201 and steering motor 201b. The traveling motor control unit 201 controls an output (rotating speed) of the first traveling motor 211 and second traveling motor 221, based on the input of information of back and forth direction and speed output by the inclination sensor H6. Also, for the sake of simplicity in explanation, the bogie 2 according to this embodiment is assumed to be of front-wheel drive.

The steering motor control unit 201b outputs a steering angle of the first rotating shaft motor 216 for steering the first front wheel 210 and the second rotating shaft motor 226 for steering the second front wheel 220 respectively, according to information of azimuthal speed output by the steering sensor H4. Also, in this embodiment it is assumed that only the front wheels are steered for the sake of simplicity in explanation, however it is a matter of course that the rear wheels may also be steered. A first wheel steering motor 201M is rotatably connected with the first wheel supporting unit 215 through a first joint 201MJ, as shown in FIG. 26. The first wheel steering motor 201M rotates around the first wheel supporting unit 215 to steer the first front wheel 210 which is coaxially mounted in a right and left direction, according to instruction of the steering motor control unit 201b. Likewise a second wheel steering motor 202M and second joint 202MJ are provided on the side of the second front wheel 220.

Figure 31:
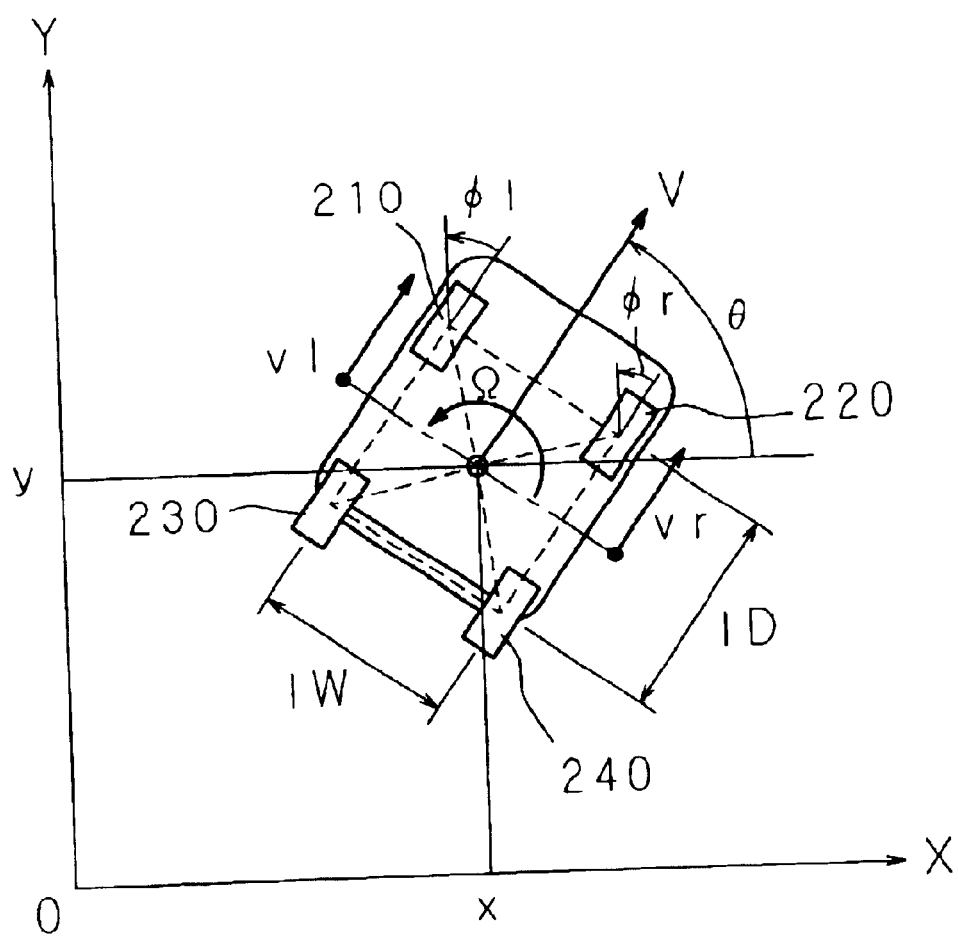
FIG. 31 is an explanatory drawing showing a coordinate system of a wheel moving unit.

FIG. 31 is an explanatory drawing of a coordinate system of a wheel moving unit. In the drawing V is traveling speed of the wheelchair S input through the arm H4 of the operating lever H and inclination sensor H6. Also, $\Omega$ is azimuthal speed around a center placed on a generally central portion of the wheelchair S input through the handlebar H2 and steering angle sensor H3. Traveling speed V is decided at a value according to an inclination detected by the inclination sensor H6, and azimuthal speed $\Omega$ is decided at a value according to a steering angle detected by the steering angle sensor H3. Here, the traveling speed V and azimuthal speed $\Omega$ can be obtained in the following formula 1, wherein rotation speed of the first front wheel is denoted by vl, rotation speed of the second front wheel by vr, interval between the center of the first front wheel and that of the first rear wheel by 1D and interval between the first front wheel and second front wheel by 1w:

$$\begin{bmatrix} V \\ \Omega \end{bmatrix} = \begin{bmatrix} 1/2 & 1/2 \\ 1/lw & -1/lw \end{bmatrix} \begin{bmatrix} vr \\ vl \end{bmatrix} \quad \text{Formula 1}$$

Further, rearranging the above, rotation speed of the first front wheel vl and rotation speed of the second front wheel vr can be expressed as the following formula 2:

$$\begin{bmatrix} vr \\ vl \end{bmatrix} = \begin{bmatrix} 1 & lw/2 \\ 1 & -lw/2 \end{bmatrix} \begin{bmatrix} V \\ \Omega \end{bmatrix} \quad \text{Formula 2}$$

Utilizing the formula 2, an output amount (rotation speed) to the first traveling motor 211 and second traveling motor can be calculated in case where a desired traveling speed V is input through the operating lever H, which is the inputting means. Also, when azimuthal speed $\Omega$ is input, a steering angle $\phi$l of the first front wheel 210 (left wheel) and steering angle $\phi$r of the second front wheel 220 (right wheel) can be obtained through the following formula 3.

$$\begin{bmatrix} \phi r \\ \phi l \end{bmatrix} = \begin{bmatrix} \arctan\ (lD/2Rr) \\ \arctan\ (lD/2Rl) \end{bmatrix},\ Rr = \frac{V}{\Omega} + \frac{lw}{2},\ Rl = \frac{V}{\Omega} - \frac{lw}{2} \quad \text{Formula 3}$$

Rr: turning radius of the right wheel during a turning motion in an arbitrary body speed Rl: turning radius of the left wheel during a turning motion in an arbitrary body speed Utilizing the formula 3, the steering motor control unit 201b computes the steering angle $\phi$l of the first front wheel 210 (left wheel) and steering angle $\phi$r of the second front wheel 220 (right wheel) when a desired azimuthal speed $\theta$ and traveling speed V is input from the operation lever H which is the inputting means. Then, the steering motor control unit 201b controls the output of the first wheel steering motor 201M and second wheel steering motor 202M respectively. By such steps, the control unit 200 acquires information of traveling speed V and azimuthal speed $\Omega$ from the operating lever H, after the initialization of the step S31 of FIG. 23A and setting the ordinary target position $\theta$0 of the step S32, as described in the embodiment 2. Acquiring such information time after time (for example in a cycle of 10 ms), the control unit 200 calculates rotating speed vl of the first front wheel and rotating speed vr of the second front wheel, and the steering angle $\phi$l of the first front wheel 210 (left wheel) and steering angle $\phi$r of the second front wheel 220 (right wheel), according to the formulas 2 and 3. The control unit 200 controls the wheel control unit 201a, to thereby drive the wheelchair S. Processing to be performed in case where a step is detected while traveling is already described in the embodiment 2 (after the step S35), therefore detailed description is omitted.

According to method of climbing up/down a step and the bogie of the invention, the wheels provided to the bogie remain in stable contact with the ground or a wall face of a step, and sufficient grip force required for traveling can be secured. Consequently, the bogie can smoothly climb up/down a step even if it is higher than a radius of its wheel, and alleviates an impact to a main body of the bogie due to an uneven portion of the ground or step, to achieve stabilized traveling.

As this invention may be embodied in several forms without departing from the spirit of essential characteristics thereof, present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. Method of climbing up/down a step for a bogie provided with a plurality of wheel supporting units provided under the main body of the bogie for supporting one or a plurality of wheels and actuators for moving said wheel supporting units so that said wheel supported by said wheel supporting units moves upward or downward, comprising the steps of:

adjusting mass characteristic, rigidity characteristic and damping characteristic generated by an output of said actuators between said wheel supporting units and said main body of said bogie when said wheels climb up/down a step; and controlling an output of moving force of said actuators applied to said wheel supporting units.

2. Method of climbing up/down a step as set forth in claim 1, further comprising the steps of:

detecting an external force applied to each wheel;

determining that said wheel is climbing up/down a step in case where said external force is not smaller than a first predetermined external force, or not greater than a second external force that is smaller than said first external force; and determining that said wheel is either in contact with the ground or has finished climbing up/down the step in the case where said detected external force is in a predetermined range greater than said second external force and smaller than said first external force.

3. Method for climbing up/down a step as set forth in claim 1, further comprising the steps of:

determining whether each wheel is climbing up/down a step; and obtaining an output of each actuator based on rigidity characteristic predetermined according to whether said wheels are climbing up/down a step or not.

4. Method for climbing up/down a step as set forth in claim 3, further comprising the steps of:

obtaining an output of an actuator corresponding to a wheel supporting unit that is supporting a wheel climbing up/down a step based on rigidity characteristic K1, and obtaining an output of said actuators corresponding to all wheel supporting units other than the above-mentioned supporting unit based on rigidity characteristic K2, when each wheel is to climb up/down said step, wherein K1 is less than K2; and obtaining an output of an actuator corresponding to each wheel supporting unit based on rigidity characteristic K0, when said wheels are not climbing up/down a step wherein K1 is less than or equal to K0, and K0 is less than or equal to K2.

5. Method of climbing up/down a step as set forth in claim 3, further comprising the steps of:

detecting a position of each of said wheel supporting units; and obtaining an output of an actuator corresponding to said wheel supporting unit based on said detected position.

6. Method of climbing up/down a step as set forth in claim 5, further comprising the steps of:

detecting a position of each of said wheel supporting units when said wheels supported by said wheel supporting unit are in contact with the ground; and obtaining an output of an actuator corresponding to said wheel supporting unit based on said detected position.

7. Method of climbing up/down a step as set forth in claim 5, further comprising the steps of:

detecting a position of a wheel supporting unit of a wheel that has finished climbing up/down a step; and in the case where it is determined that another wheel is climbing up/down the step, obtaining an output of an actuator corresponding to a wheel supporting unit that is supporting another wheel climbing up/down said step based on said detected position.

8. Method of climbing up/down a step as set forth in claim 5, further comprising the steps of:

detecting a height of a step to be climbed up/down; and in the case where it is determined that the wheel is climbing up/down the step, obtaining an output of an actuator corresponding to a wheel supporting unit that supports a wheel climbing up/down the step based on said detected height.

9. Method of climbing up/down a step as set forth in claim 5, further comprising the steps of:

obtaining an output of an actuator corresponding to a wheel supporting unit other than those supporting said wheels climbing up/down the step based on a position or inclination of said main body of said bogie when said bogie is moved or inclined forward, backward, rightward or leftward with respect to a traveling direction, in the case where it is determined that the wheel is climbing up/down the step.

10. Method of climbing up/down a step as set forth in claim 1, further comprising the steps of:

detecting a step at two points respectively corresponding to each wheel and disposed with a predetermined interval therebetween; and obtaining an entrance angle to said step based on a travel distance of said wheel during a time since one of said points detected said step until the other point detected said step and said interval between said points.

11. A bogie having a plurality of wheel supporting units for supporting one or a plurality of wheels provided under the main body of the bogie, comprising:

actuators for moving said wheel supporting unit so that said wheel supported by said wheel supporting unit moves upward or downward, and a control unit, wherein said control unit performs the following operations of:

adjusting mass characteristic, rigidity characteristic and damping characteristic generated by an output of said actuators between said wheel supporting units and said main body of said bogie; and controlling an output of moving force of said actuators applied to said wheel supporting units.

12. The bogie as set forth in claim 11, further comprising:

an external force detecting unit for detecting an external force applied to each wheel, wherein said control unit is further capable of performing the operations of:

determining that said wheel corresponding to said external force detecting unit is climbing up/down a step in case where said external force is not smaller than a first predetermined external force or not greater than a second external force that is smaller than said first external force, and determining that said wheel is either in contact with the ground or has finished climbing up/down said step in case where said detected external force is in a predetermined range greater than said second external force and smaller than said first external force.

13. The bogie as set forth in claim 11, wherein said control unit is further capable of performing the operations of:

determining whether each wheel is climbing up/down a step, and obtaining an output of each actuator based on rigidity characteristic predetermined according to whether said wheels are climbing up/down a step or not.

14. The bogie as set forth in claim 13, further comprising:

a memory unit in which said rigidity characteristics K0, K1 and K2 are stored, wherein said control unit is further capable of performing the operations of:

obtaining an output of an actuator corresponding to a wheel supporting unit that supports a wheel climbing up/down a step based on said rigidity characteristic K1, and obtaining an output of said actuators corresponding to all other wheel supporting units other than the above-mentioned supporting unit based on said rigidity characteristic K2 in the case where it is determined that each wheel is to climb up/down said step; and obtaining an output of an actuator corresponding to each wheel supporting unit based on rigidity characteristic K0, when said wheels are not climbing up/down said step, wherein K1 is less than or equal to K0, and KO is less than or equal to K2.

15. The bogie as set forth in claim 13, further comprising:

a position detecting unit for detecting a position of each of said wheel supporting units, wherein said control unit is further capable of performing the operation of obtaining an output of an actuator corresponding to each wheel supporting unit based on said position of said wheel supporting unit detected by said position detecting unit.

16. The bogie as set forth in claim 15, wherein said control unit is further capable of performing the operation of obtaining an output of said actuators corresponding to each wheel supporting unit based on a position of said wheel supporting unit detected by said position detecting unit when said wheel supported by said wheel supporting unit is in contact with the ground.

17. The bogie as set forth in claim 15, wherein said control unit is further capable of performing the operations of:

detecting a position of a wheel supporting unit of a wheel that has finished climbing up/down a step through said position detecting unit; and obtaining an output of an actuator corresponding to a wheel supporting unit that supports another wheel climbing up/down said step based on said detected position, in the case where it is determined that another wheel is climbing up/down the step.

18. The bogie as set forth in claim 15, further comprising:

a step height detecting unit for detecting a height of a step to be climbed up/down, wherein said control unit is further capable of performing the operation of in the case where it is determined that the wheel is climbing up/down the step, obtaining an output of an actuator corresponding to a wheel supporting unit that supports a wheel climbing up/down said step based on said detected height.

19. The bogie as set forth in claim 15, wherein said control unit is further capable of performing the operation of obtaining an output of an actuator corresponding to a wheel supporting unit other than those supporting said wheels climbing up/down a step based on a position or inclination of said main body of said bogie when said bogie is moved or inclined forward, backward, rightward or leftward with respect to a traveling direction in the case where it is determined that the wheel is climbing up/down the step.

20. The bogie as set forth in claim 11, further comprising:

a pair of step detecting units disposed side by side with a predetermined interval therebetween for detecting a step, wherein said control unit is further capable of performing the operations of:

detecting a travel distance of said wheel, and obtaining an entrance angle to said step based on a travel distance of said wheel during a time since one of said step detecting units detected said step until the other step detecting unit detected said step and said interval between said step detecting units.

21. The bogie as set forth in claim 11, wherein four wheel supporting units capable of moving vertically with respect to the ground respectively support a wheel, and said actuators move the respective wheel supporting units vertically.

22. The bogie as set forth in claim 11, further comprising:

rotational shafts disposed in a direction of side to side under the main body of the bogie; and two wheel supporting units disposed side by side on the right and left side that rotate around said rotational shaft, for respectively supporting a front wheel and a rear wheel, wherein said actuator rotates the respective wheel supporting unit around said rotational shaft.

23. A wheelchair comprising:

a bogie as set forth in claim 11;

an inputting unit for inputting information on speed and traveling direction of said bogie; and a wheel control unit for controlling said wheels of said bogie based on said information on speed and traveling direction input by said inputting unit.

24. A bogie having a plurality of wheel supporting units for supporting one or a plurality of wheels provided under the main body of the bogie, comprising:

actuators for moving said wheel supporting units so that said wheel supported by said wheel supporting units moves upward or downward; and means for controlling for adjusting mass characteristic, rigidity characteristic and damping characteristic generated by an output of said actuators between said wheel supporting units and said main body of said bogie and controlling an output of moving force of said actuators applied to said wheel supporting units.

25. The bogie as set forth in claim 24, further comprising:

means for detecting external force for detecting an external force applied to each wheel, wherein said controlling means further comprises means for determining that said wheel corresponding to said external force detecting means is climbing up/down a step in the case where said external force detected by said external force detecting means is not smaller than a first predetermined external force or not greater than a second external force that is smaller than said first external force, and determining that said wheel is either in contact with the ground or has finished climbing up/down said step in the case where said detected external force is in a predetermined range greater than said second external force and smaller than said first external force.

26. The bogie as set forth in claim 24, wherein said controlling means further comprises means for determining whether each wheel is climbing up/down a step, and means for obtaining an output of each actuator based on rigidity characteristic predetermined according to whether said wheels are climbing up/down a step or not.

27. The bogie as set forth in claim 26, further comprising:

means for storing memory in which said rigidity characteristics K0, K1 and K2 are stored; wherein said controlling means further comprises means for obtaining an output of an actuator corresponding to a wheel supporting unit that supports a wheel climbing up/down a step based on said rigidity characteristic K1, and obtaining an output of said actuators corresponding to all wheel supporting units other than the above-mentioned supporting unit based on said rigidity characteristic K2 in the case when it is determined that each wheel is to climb up/down said step; and obtaining an output of an actuator corresponding to each wheel supporting unit based on rigidity characteristic K0, when said wheels are not climbing up/down said steps wherein K1 is less than or equal to K0, and K0 is less than or equal to K2.

28. The bogie as set forth in claim 26, further comprising:

position detecting means for detecting a position of each of said wheel supporting units, wherein said controlling means further comprises means for obtaining an output of an actuator corresponding to said wheel supporting unit based on said position of said wheel supporting unit detected by said position detecting means.

29. The bogie as set forth in claim 28, wherein said controlling means further comprises means for obtaining an output of said actuators corresponding to each wheel supporting unit based on a position of said wheel supporting unit detected by said position detecting means when said wheel supported by said wheel supporting unit is in contact with the ground.

30. The bogie as set forth in claim 28, wherein said controlling means further comprises means for detecting a position of a wheel supporting unit of a wheel that has finished climbing up/down a step through said position detecting means; and means for obtaining an output of an actuator corresponding to a wheel supporting unit that supports another wheel climbing up/down said step based on said detected position, in the case where it is determined that another wheel is climbing up/down said step.

31. The bogie as set forth in claim 28, further comprising:

step height detecting means for detecting a height of a step to be climbed up/down, wherein said controlling means further comprises means for obtaining an output of an actuator corresponding to a wheel supporting unit that supports a wheel climbing up/down said step based on said detected height, in the case where it is determined that the wheel is climbing up/down the step.

32. The bogie as set forth in claim 28, wherein said controlling means further comprises means for obtaining an output of an actuator corresponding to a wheel supporting unit other than those supporting said wheels climbing up/down a step based on a position or inclination of said main body of said bogie when said bogie is moved or inclined forward, backward, rightward or leftward with respect to a traveling direction in the case where it is determined that the wheel is climbing up/down the step.

33. The bogie as set forth in claim 24, further comprising:

a pair of step detecting means disposed side by side with a predetermined interval therebetween for detecting a step;

means for detecting a travel distance of said wheel; and means for obtaining an entrance angle to said step based on a travel distance of said wheel during a time since one of said step detecting units detected said step until the other step detecting unit detected said step and said interval between said step detecting means.

34. The bogie as set forth in claim 24, wherein four wheel supporting units capable of moving vertically to the ground are respectively supporting a wheel, and said actuators move the respective wheel supporting units vertically.

35. The bogie as set forth in claim 24, further comprising:

rotational shafts disposed in a direction of side to side under the main body of the bogie; and two wheel supporting units disposed side by side on its right and left side that rotate around said rotational shaft, for respectively supporting a front wheel and a rear wheel, wherein said actuators rotate the respective wheel supporting unit around said rotational shaft.

36. A wheelchair comprising:

a bogie as set forth in claim 24;

inputting means for inputting information on speed and traveling direction of said bogie; and wheel controlling means for controlling said wheels of said bogie based on said information on speed and traveling direction input by said inputting means.

* * * * *